(12) United States Patent
Hendren et al.

(10) Patent No.: US 11,397,449 B2
(45) Date of Patent: Jul. 26, 2022

(54) ELECTRONIC DEVICE WITH GLASS HOUSING MEMBER

(71) Applicant: Apple Inc., Cupertino, CA (US)

(72) Inventors: Keith J. Hendren, San Francisco, CA (US); Paul X. Wang, Cupertino, CA (US); Adam T. Garelli, Santa Clara, CA (US); Brett W. Degner, Menlo Park, CA (US); Christiaan A. Ligtenberg, San Carlos, CA (US); Dinesh C. Mathew, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/463,167

(22) Filed: Aug. 31, 2021

(65) Prior Publication Data

US 2021/0397220 A1    Dec. 23, 2021

Related U.S. Application Data

(63) Continuation of application No. 16/401,004, filed on May 1, 2019, now Pat. No. 11,112,827.

(Continued)

(51) Int. Cl.
  *G09G 3/3258*     (2016.01)
  *H01L 27/32*      (2006.01)
  (Continued)

(52) U.S. Cl.
  CPC ......... *G06F 1/1626* (2013.01); *G06F 1/1643* (2013.01); *G06F 1/1652* (2013.01); *G06F 1/1662* (2013.01); *G06F 3/0412* (2013.01)

(58) Field of Classification Search
  CPC .... G06F 1/1626; G06F 1/1643; G06F 1/1652; G06F 1/1662; G06F 3/0412;
  (Continued)

(56) References Cited

U.S. PATENT DOCUMENTS

| 4,633,323 A | 12/1986 | Haberkern et al. |
| 6,068,891 A | 5/2000 | O'Dell et al. |

(Continued)

FOREIGN PATENT DOCUMENTS

| CN | 101712102 | 5/2010 |
| CN | 203013800 | 6/2013 |

(Continued)

OTHER PUBLICATIONS

Author Unknown, "LG's Future Display Technology Will Blow You Away," Techno Source, https://www.youtube.com/watch?v=qlRjytgNuhM, 2 pages, May 2, 2017.

(Continued)

*Primary Examiner* — Andrew Sasinowski
(74) *Attorney, Agent, or Firm* — Brownstein Hyatt Farber Schreck, LLP

(57) ABSTRACT

An electronic device may include a glass housing member that includes an upper portion defining a display area, a lower portion defining an input area, and a transition portion joining the upper portion and the lower portion and defining a continuous, curved surface between the upper portion and the lower portion. The electronic device may include a display coupled to the glass housing member and configured to provide a visual output at the display area. The electronic device may include an input device coupled to the glass housing member and configured to detect inputs at the input area. The electronic device may include a support structure coupled to the glass housing member and configured to support the computing device.

20 Claims, 35 Drawing Sheets

Related U.S. Application Data

(60) Provisional application No. 62/701,507, filed on Jul. 20, 2018.

(51) Int. Cl.
*H01L 27/088* (2006.01)
*G09G 3/3208* (2016.01)
*H01L 27/06* (2006.01)
*H01L 21/822* (2006.01)
*G06F 1/16* (2006.01)
*G06F 3/041* (2006.01)

(58) Field of Classification Search
CPC .............. G06F 1/1632; G06F 1/1669; G06F 2200/1631; G06F 1/1601; G06F 1/1637; G06F 1/1628
See application file for complete search history.

(56) References Cited

U.S. PATENT DOCUMENTS

| | | |
|---|---|---|
| 6,677,703 B2 | 1/2004 | Ito et al. |
| 7,297,386 B2 | 11/2007 | Suzuki et al. |
| 7,646,143 B2 | 1/2010 | Kimura et al. |
| 8,092,911 B2 | 1/2012 | Sakoske et al. |
| 8,106,787 B2 | 1/2012 | Nurmi |
| 8,184,373 B2 | 5/2012 | Tanaka et al. |
| 8,213,085 B2 | 7/2012 | Liu et al. |
| 8,553,333 B2 | 10/2013 | Chang et al. |
| 8,576,561 B2 | 11/2013 | Myers et al. |
| 8,603,372 B2 | 12/2013 | Tanaka et al. |
| 8,681,113 B1 | 3/2014 | Wu et al. |
| 8,771,532 B2 | 7/2014 | Carlson et al. |
| 8,872,295 B2 | 10/2014 | Hermans et al. |
| 8,896,802 B2 | 11/2014 | Yoneyama et al. |
| 8,953,083 B2 | 2/2015 | Hedge |
| 9,017,566 B2 | 4/2015 | Lander et al. |
| 9,034,166 B2 | 5/2015 | Tatebe et al. |
| 9,154,678 B2 | 10/2015 | Kwong et al. |
| 9,239,594 B2 | 1/2016 | Lee et al. |
| 9,240,498 B2 | 1/2016 | Fujita et al. |
| 9,262,002 B2 | 2/2016 | Momeyer et al. |
| 9,377,603 B1 | 6/2016 | Cheng et al. |
| 9,448,713 B2 | 9/2016 | Cruz-Hernandez et al. |
| 9,554,482 B2 | 1/2017 | Wilson et al. |
| 9,644,281 B2 | 5/2017 | Tatebe et al. |
| 9,658,500 B2 | 5/2017 | Iwamoto |
| 9,720,141 B1 | 8/2017 | Cheng et al. |
| 9,732,237 B2 | 8/2017 | Sugamoto et al. |
| 9,745,221 B2 | 8/2017 | Ehrensperger et al. |
| 9,862,124 B2 | 1/2018 | Radcliffe et al. |
| 9,880,327 B2 | 1/2018 | Park et al. |
| 9,938,186 B2 | 4/2018 | Moll et al. |
| 9,961,337 B2 | 5/2018 | Stroetmann |
| 10,013,020 B2 | 7/2018 | Hong et al. |
| 10,043,052 B2 | 8/2018 | Wickboldt et al. |
| 10,101,583 B2 | 10/2018 | Saenger Nayver et al. |
| 10,171,636 B2 | 1/2019 | Yeo et al. |
| 10,214,445 B2 | 2/2019 | Hart et al. |
| 10,298,824 B2 | 5/2019 | Lee et al. |
| 10,442,151 B2 | 10/2019 | Ozeki et al. |
| 10,647,032 B2 | 5/2020 | Radcliffe et al. |
| 10,676,393 B2 | 6/2020 | Weber et al. |
| 10,690,818 B2 | 6/2020 | Chen et al. |
| 10,694,010 B2 | 6/2020 | Jones |
| 10,781,135 B2 | 9/2020 | Weber et al. |
| 10,827,635 B1 | 11/2020 | Limarga et al. |
| 10,843,439 B2 | 11/2020 | Gulati et al. |
| 10,866,616 B2 | 12/2020 | Seo et al. |
| 10,917,505 B2 | 2/2021 | Jones |
| 10,948,633 B2 | 3/2021 | Murakami et al. |
| 2002/0127565 A1 | 9/2002 | Cunningham |
| 2003/0011315 A1 | 1/2003 | Ito et al. |
| 2005/0266250 A1 | 12/2005 | Hayakawa |
| 2006/0024508 A1 | 2/2006 | D'Urso et al. |
| 2006/0034042 A1 | 2/2006 | Hisano et al. |
| 2007/0195419 A1 | 8/2007 | Tsuda et al. |
| 2009/0257207 A1 | 10/2009 | Wang et al. |
| 2012/0127755 A1 | 5/2012 | Shiau et al. |
| 2012/0194974 A1 | 8/2012 | Weber et al. |
| 2012/0218640 A1 | 8/2012 | Gollier et al. |
| 2012/0274565 A1 | 11/2012 | Moser et al. |
| 2013/0026593 A1 | 1/2013 | Hermans et al. |
| 2013/0235462 A1 | 9/2013 | Haas |
| 2013/0273324 A1 | 10/2013 | Moll et al. |
| 2014/0035869 A1 | 2/2014 | Yun et al. |
| 2014/0063609 A1 | 3/2014 | Iwata et al. |
| 2014/0098075 A1 | 4/2014 | Kwak et al. |
| 2014/0106127 A1 | 4/2014 | Lyons et al. |
| 2014/0327643 A1 | 11/2014 | Sun et al. |
| 2015/0090689 A1 | 4/2015 | Guilfoyle et al. |
| 2016/0154435 A1* | 6/2016 | Yanagisawa ........... A61B 3/005 348/47 |
| 2016/0188181 A1* | 6/2016 | Smith ................... G06F 3/048 715/765 |
| 2016/0224822 A1 | 8/2016 | Hasegawa et al. |
| 2016/0283014 A1* | 9/2016 | Rider ................... G06F 1/163 |
| 2016/0306390 A1* | 10/2016 | Vertegaal ............. G06F 1/1643 |
| 2017/0026553 A1 | 1/2017 | Lee et al. |
| 2017/0058130 A1 | 3/2017 | Addleman et al. |
| 2017/0276618 A1 | 9/2017 | Takagi |
| 2017/0308234 A1 | 10/2017 | Li et al. |
| 2018/0042131 A1 | 2/2018 | Liu et al. |
| 2018/0086662 A1 | 3/2018 | Luzzato et al. |
| 2018/0162091 A1 | 6/2018 | Takeda et al. |
| 2018/0162768 A1 | 6/2018 | Boek et al. |
| 2018/0215657 A1 | 8/2018 | Jin et al. |
| 2018/0282201 A1 | 10/2018 | Hancock et al. |
| 2019/0032237 A1 | 1/2019 | Kim et al. |
| 2019/0037690 A1 | 1/2019 | Wilson et al. |
| 2019/0155339 A1 | 5/2019 | Fenton et al. |
| 2019/0230204 A1 | 7/2019 | Zhang |
| 2019/0236887 A1 | 8/2019 | Rich et al. |
| 2019/0241455 A1 | 8/2019 | Sweney et al. |
| 2019/0246018 A1 | 8/2019 | Rho et al. |
| 2019/0256410 A1 | 8/2019 | Isshiki et al. |
| 2019/0331940 A1 | 10/2019 | Poole et al. |
| 2020/0026327 A1 | 1/2020 | Hendren et al. |
| 2020/0189966 A1 | 6/2020 | Lee et al. |
| 2020/0199020 A1 | 6/2020 | Hatano et al. |
| 2020/0301527 A1 | 9/2020 | Poole et al. |
| 2020/0379143 A1 | 12/2020 | Gu et al. |
| 2020/0385307 A1 | 12/2020 | Li et al. |
| 2020/0389991 A1 | 12/2020 | Shannon et al. |
| 2021/0014992 A1 | 1/2021 | Limarga et al. |
| 2022/0071039 A1 | 3/2022 | Limarga et al. |

FOREIGN PATENT DOCUMENTS

| | | |
|---|---|---|
| CN | 103502166 | 1/2014 |
| CN | 203406929 | 1/2014 |
| CN | 104024929 | 9/2014 |
| CN | 104583147 | 4/2015 |
| CN | 105283322 | 1/2016 |
| CN | 107438494 | 12/2017 |
| CN | 107683055 | 2/2018 |
| CN | 207070526 | 3/2018 |
| CN | 107911964 | 4/2018 |
| CN | 107924002 | 4/2018 |
| CN | 10832510 | 10/2018 |
| CN | 207992872 | 10/2018 |
| CN | 109202296 | 1/2019 |
| CN | 208433428 | 1/2019 |
| CN | 208461858 | 2/2019 |
| CN | 109547679 | 3/2019 |
| CN | 109640557 | 4/2019 |
| DE | 10223165 | 12/2003 |
| EP | 3454541 | 3/2019 |
| JP | 2011510904 | 4/2011 |
| JP | 2013242725 | 12/2013 |
| JP | 2016045824 | 4/2016 |
| JP | 2017508178 | 3/2017 |
| JP | 2018506851 | 3/2018 |
| KR | 20130127842 | 11/2013 |

(56) References Cited

FOREIGN PATENT DOCUMENTS

| KR | 20160145081 | 12/2016 |
|---|---|---|
| KR | 20170076779 | 7/2017 |
| KR | 20180018782 | 2/2018 |
| TW | 201910882 | 3/2019 |
| WO | WO2014/011328 | 1/2014 |
| WO | WO2014/012003 | 1/2014 |
| WO | WO2015/191949 | 12/2015 |
| WO | WO2016/088983 | 6/2016 |
| WO | WO2016/196615 | 12/2016 |
| WO | WO2017/038868 | 3/2017 |
| WO | WO2019/027675 | 2/2019 |

OTHER PUBLICATIONS

Ben-Yakar et al., "Femtosecond laser ablation properties of borosilicate glass," Journal of Applied Physics, vol. 96, No. 9, 8 pages, Nov. 1, 2004.

Hedayati et al., Antireflective Coatings: Conventional Stacking Layers and Ultrathin Plasmonic Metasurfaces, A Mini-Review, Materials, vol. 9, No. 497, 2016.

Qi et al., "Simple Approach to Wafer-Scale Self-Cleaning Antireflective Silicon Surfaces," American Chemical Society, State Key Laboratory of Supramolecular Structure and Materials, College of Chemistry, Jilin University, Changchun 130012, P.R. China, 2009.

Seth, Radhika, "A Fresh New Look at the Computer," https://www.yankodesign.com/2009/02/06/a-fresh-new-look-at-the-computer, 1 page, Feb. 6, 2009.

Tan et al., "Broadband antireflection film with moth-eye-like structure for flexible display applications," Optica, vol. 4, No. 7, pp. 678-683, Jul. 2017.

Wimmer, "Curve: Revisiting the Digital Desk," NordiCHI '10: Proceedings of the 6th Nordic Conference on Human-Computer Interaction: Extending Boundaries, https://doi.org/10.1145/1868914.1868977, http://www.mmi.ifi.lmu.de/pubdb/publications/pub/wimmer2010Curve/wimmer2010Curve.pdf, https://dl.acm.org/doi/10.1145/1868914.1868977, pp. 561-570, Oct. 2010.

* cited by examiner

ELECTRONIC DEVICE WITH GLASS HOUSING MEMBER

CROSS-REFERENCE TO RELATED APPLICATION(S)

This application is a continuation patent application of U.S. patent application Ser. No. 16/401,004, filed May 1, 2019 and titled "Electronic Device with Glass Housing Member," which is a nonprovisional patent application of and claims the benefit of U.S. Provisional Patent Application No. 62/701,507, filed Jul. 20, 2018, and titled "Electronic Device with Glass Housing Member," the disclosures of which are hereby incorporated herein by reference in their entireties.

FIELD

The described embodiments relate generally to an electronic device. More particularly, the present embodiments relate to an electronic device that includes a glass housing member.

BACKGROUND

Many electronic devices include multiple distinct components in which input and output devices are provided. For example, a display enclosure may be separate from an input device or keyboard enclosure. Additionally, the enclosure(s) of some traditional electronic devices may be formed from materials that are easily scratched or that provide an inferior tactile feel or visual appearance.

SUMMARY

An electronic device may include a glass housing member that includes an upper portion defining a display area, a lower portion defining an input area, and a transition portion extending between the upper portion and the lower portion and defining part of a continuous surface defined by the upper portion, the lower portion, and the transition portion. The electronic device may include a display coupled to the glass housing member and configured to provide a visual output at the display area. The electronic device may include an input device coupled to the glass housing member and configured to detect an input at the input area. The electronic device may include a support structure coupled to the glass housing member and configured to support the glass housing member.

A desktop computer may include a display, an input device operably coupled to the display, and a glass sheet. The glass sheet may include a first portion defining a planar display area, a second portion defining a planar input area, and a curved portion between the planar display area and the planar input area. The desktop computer may include a support structure coupled to the glass sheet and configured to support the glass sheet.

An electronic device may include a slumped glass housing member defining a continuous exterior surface of the electronic device and an opening extending through the slumped glass housing member. The electronic device may include a support structure coupled to the slumped glass housing member and configured to support the slumped glass housing member. The electronic device may include a display coupled to an upper portion of the slumped glass housing member. The electronic device may include a keyboard having a storage configuration in which the keyboard is positioned at least partially within the opening and a use configuration in which the keyboard is extended from the opening.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
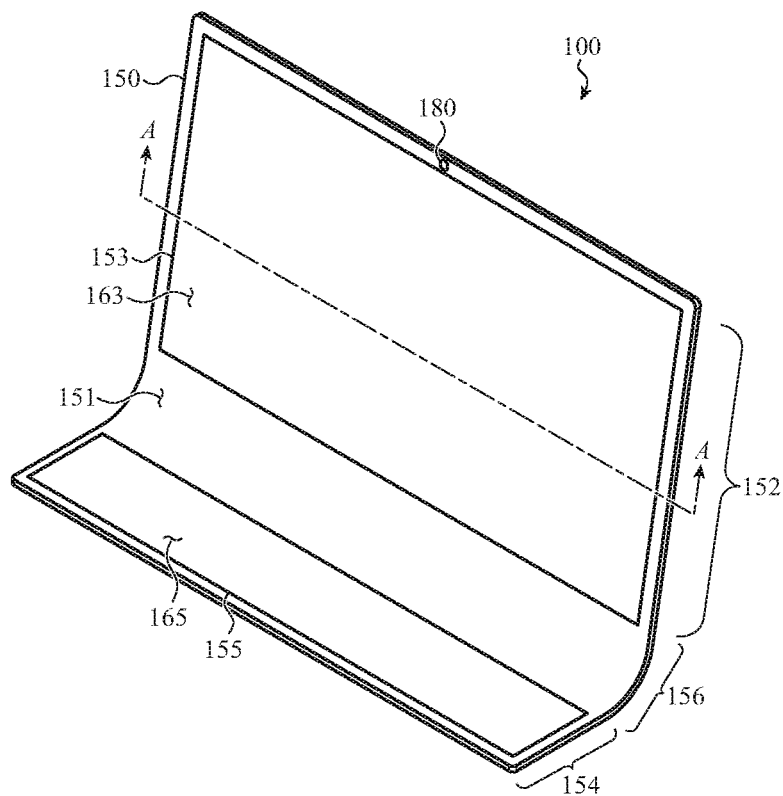
FIG. 1A illustrates an example electronic device that includes a housing member.

Reference will now be made in detail to representative embodiments illustrated in the accompanying drawings. It should be understood that the following descriptions are not intended to limit the embodiments to one preferred embodiment. To the contrary, they are intended to cover alternatives, modifications, and equivalents as can be included within the spirit and scope of the described embodiments as defined by the appended claims.

Traditional desktop computers typically include discrete displays and input devices (e.g., keyboards, mice, and the like). The following disclosure relates to computing systems, such as desktop computers, that include a single member that defines a surface that includes one or more interface areas, such as an output area (e.g., a display area) and an input area. In various embodiments, a housing or structure of an electronic device may be formed from a housing member (e.g., an optically transmissive member) that encompasses both a display area and an input area of the electronic device. One or more display components (e.g., OLED displays, LED displays, and the like) may be coupled to the housing member and configured to provide a graphical output at the display area. Similarly, one or more input components (e.g., touch sensors, force sensors, biometric sensors, and the like) may be coupled to the housing member and configured to detect inputs at the input area. Additional input and output components are envisioned and discussed in more detail below.

In some embodiments, the housing member defines a continuous exterior surface of the electronic device. The exterior surface may include one or more interface areas for providing outputs, receiving inputs, or some combination thereof. In some embodiments, the housing member includes a first portion (e.g., an upper portion) that defines a planar display area, a second portion (e.g., a lower portion) that defines a planar input area, and a curved portion (e.g., a transition portion) extending between the first and second portions. In some embodiments, the upper portion, the lower portion, and the transition portion cooperate to form a continuous exterior surface of the electronic device. In various embodiments, interface areas may overlap and/or provide multiple types of functionality (e.g., receiving inputs and providing outputs).

The housing member may be formed from any suitable material, such as plastic, ceramic, glass, composites, or combinations thereof. For example, the housing member may be a single piece of glass that has been molded (e.g., slumped) to form the various portions of the housing member. The electronic device may take the form of or be included in any suitable computing device, including a desktop computer, a laptop, a tablet, a smartphone, an automobile, a wearable audio device, an appliance, an accessory device, or the like.

In various embodiments, output components (e.g., display components) and/or input components may be coupled to and/or integrated with the housing member or other portions of the electronic device. The output and/or input components may be positioned at various locations relative to the surface of the housing member, such as within the housing member, coupled to a surface of the housing member, or some combination thereof.

In various embodiments, one or more interface areas (e.g., display areas, input areas, and the like) may be defined by the housing member and/or one or more components of the electronic device. Interface areas may be defined at a portion of the housing member (e.g., an upper portion, a lower portion, or a transition portion), or extend across multiple portions of the housing member. An electronic device may include multiple interface areas. In various embodiments, interface areas may provide both input and output functionality. Interface areas may be planar, curved, or some combination thereof. The interface areas, as well as corresponding display components and input components, may have a curvature that corresponds to a curvature of the housing member.

As discussed above, the interface areas described herein may include one or more of display areas where graphical outputs are provided or input areas where inputs are detected and/or received. The electronic devices may additionally or alternatively include one or more additional areas for providing device functionality. For example, the electronic devices may include one or more output areas for providing outputs (e.g., visual outputs, audio outputs, haptic outputs, and the like), charging areas for charging electronic devices, data transfer areas for exchanging data and/or communicating with other devices, and the like. The electronic devices may include various components, as appropriate, to facilitate providing device functionality at the additional areas.

In some embodiments, the electronic device includes a support structure. In various embodiments, the housing member and/or the support structure house, carry, or are otherwise coupled to the various components of the electronic device. The support structure and/or the housing member may provide support to the electronic device. For example, in an operating configuration of the electronic device, the electronic device may be positioned on a support surface, such as a table, desk, or other surface. The support structure may contact the support surface to at least partially support the housing member and/or the electronic device in a position or configuration that facilitates use of the device. For example, the support structure may be configured to support the housing member in a position that allows the display and keyboard to be easily accessed by a user. The support structure may cooperate with one or more additional components or portions of the electronic device to support the device in this manner. For example, a portion of the housing member may also contact the support surface to support the device in a desired position.

As noted above, a housing member may be formed from a continuous and/or seamless member (e.g., a sheet) of a material, such as glass, plastic, or ceramic (e.g., it may be a single glass member). The housing member may be formed from an optically transmissive material to allow images or light to be visible therethrough. As used herein, "optically transmissive" or "light-transmissive" may be used to refer to something that is transparent or translucent, or otherwise allows light or other electromagnetic radiation to propagate therethrough. In some cases, transparent materials or components may introduce some diffusion, lensing effects, distortions, or the like (e.g., due to surface textures) while still allowing objects or images to be seen through the materials or components, and such deviations are understood to be within the scope of the meaning of transparent. Also, materials that are transparent may be coated, painted, or otherwise treated to produce a non-transparent (e.g., opaque) component; in such cases the material may still be referred to as transparent, even though the material may be part of an opaque component. Translucent components may be formed by producing a textured or frosted surface on an otherwise transparent material (e.g., clear glass). Translucent materials may also be used, such as translucent polymers, translucent ceramics, or the like.

The housing member may have properties that enable the diverse input and output functions described herein. For example, the housing member (e.g., the optically transmissive member) may be strong and may have a high resistance to scratching, and may provide a surface finish having a superior appearance and/or tactile feel as compared with other materials or components. The housing member may also be a dielectric and/or substantially nonconductive, allowing touch and force inputs to be detected through the sheet, and allowing electromagnetic waves and/or fields (e.g., radio frequency signals, inductive power, inductive signals, and other wireless communications or electromagnetic energy transfer) to pass through without substantial attenuation. The housing member may be continuous or seamless, which may help prevent the ingress of liquid or other foreign debris.

These and other embodiments are discussed below with reference to FIGS. 1A-15. However, those skilled in the art will readily appreciate that the detailed description given herein with respect to these Figures is for explanatory purposes only and should not be construed as limiting.

FIG. 1A illustrates an example electronic device 100 that includes a housing member 150. In some embodiments, the housing member 150 forms at least part of a structure, such as a housing or chassis, of the electronic device 100, which houses, contains, carries, or is otherwise coupled to various components of the electronic device 100. As discussed above, the housing member 150 defines a continuous front exterior surface 151 of the electronic device 100 that includes one or more interface areas for providing outputs, receiving inputs, or some combination thereof. In the embodiment shown in FIG. 1A, the housing member 150 includes an upper portion 152 that defines a planar region of the front exterior surface 151, a lower portion 154 that defines a planar region of the front exterior surface 151, and a transition portion 156 that defines a curved region of the front exterior surface 151 and extends between the upper portion 152 and the lower portion 154. For example, the transition portion 156 may be curved about a horizontal axis as shown in FIG. 1A. In some embodiments, the curvature of the transition portion 156 is concave about a horizontal axis with respect to the front exterior surface 151, as shown in FIG. 1A. The upper portion 152, the lower portion 154, and the transition portion 156 cooperate to form the continuous front exterior surface 151 of the electronic device.

In some embodiments, the housing member 150 and/or one or more device components define one or more interface areas. For example, as shown in FIG. 1A, the upper portion 152 may define a display area 153 and the lower portion 154 may define an input area 155. A display 163 may be coupled to and/or integrated with the display area 153 and may define the display area 153 on the front exterior surface 151 of the electronic device 100. An input device 165 may be coupled to and/or integrated with the input area 155, as discussed in more detail below. The display area 153 may primarily provide display functionality and the input area 155 may primarily provide input functionality, but both areas 153, 155 may include input and output functionality. For example, either or both areas 153, 155 may be a touchscreen-style display. In various embodiments, the display area 153 may be planar or curved. In some embodiments, the display area 153 includes a planar region and a curved region. Similarly, the input area 155 may be planar or curved. In some embodiments, the input area 155 includes a planar region and a curved region.

In various embodiments, the portions of the housing member 150 may be coupled to or otherwise integrated with one another. As used herein, "integrated with" refers to forming a unitary member. In some embodiments, the portions of the housing member 150 may be formed from a single component. For example, the housing member 150 may be formed from a single member (e.g., a glass member, a glass sheet, or the like) that includes various curved and/or planar portions.

Figure 1B:
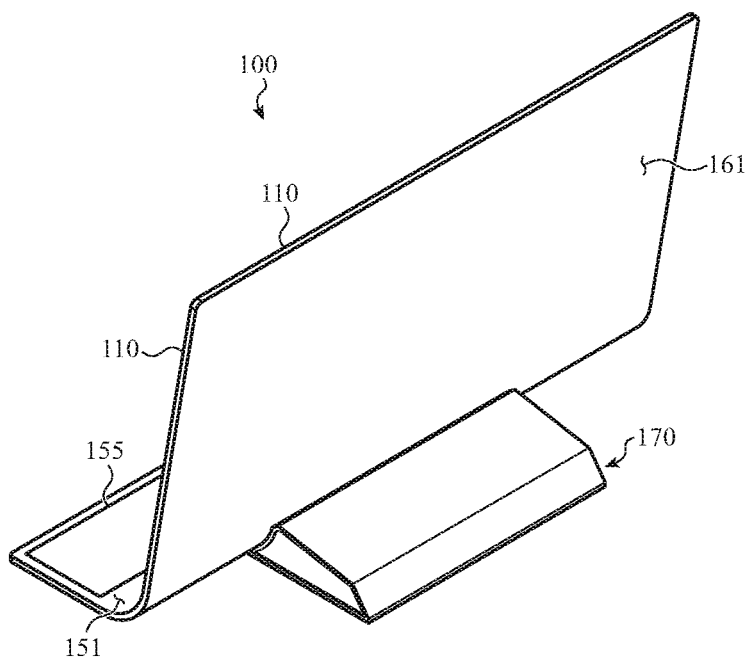
FIG. 1B illustrates an alternate view of the electronic device of FIG. 1A.

FIG. 1B illustrates a rear perspective view of the electronic device 100. The electronic device defines a rear surface 161 (e.g., a rear surface) opposite the front exterior surface 151 and includes a support structure 170. In various embodiments, the portions of the housing member 150 may cooperate to form a continuous rear surface 161. For example, the upper portion 152, the lower portion 154, and the transition portion 156 may define a continuous rear surface between the upper portion and the lower portion in addition to the continuous exterior front surface 151. In some embodiments, the electronic device 100 further defines one or more side surfaces 110 between the front exterior surface 151 and the rear surface 161. In some embodiments, the side surface(s) 110 may be shaped such that they form a continuous surface with the front exterior surface 151 and/or the rear surface 161. For example, the side surface(s) 110 may be rounded such that a continuous contour exists between the front exterior surface 151 and the rear surface 161.

In some cases, the support structure 170 supports the electronic device 100. For example, in an operating configuration of the electronic device 100, the electronic device may be positioned on a support surface, such as a table, desk, or other surface. The support structure 170 may contact the support surface to at least partially support the electronic device 100. The support structure 170 may cooperate with one or more additional components of the electronic device 100 to provide support (e.g., to maintain the electronic device 100 in an upright position). For example in some cases, the support structure 170 cooperates with the housing member 150 to provide support. In various embodiments, the support structure 170, the housing member 150, or both may contact a support surface to support the electronic device 100.

Various components of the electronic device 100 may be coupled to and/or positioned within the housing member 150 and/or the support structure 170. For example, a processing unit of the electronic device 100 may be housed or positioned within the support structure 170. Additional components of the electronic device 100 are discussed in more detail below with respect to FIG. 15.

Information and/or data may be transferred between the support structure 170 and the housing member 150 and associated components. For example, display data, such as data or signals that cause the display 163 to display images, user interfaces, application data, or the like, may be sent to the housing member 150 (and, more particularly, to the display that is coupled to the housing member 150) from the support structure 170. Similarly, input data may be sent from the housing member 150 (e.g., from a keyboard or other input device coupled to or defined by the housing member 150) to the support structure 170. Input data may include data relating to touch inputs applied to a touchscreen coupled to the housing member 150, sensor data (e.g., from sensors coupled to the housing member 150, such as light sensors, accelerometers, etc.), camera data (e.g., from a camera in the housing member 150), or the like. The electronic device 100 may include any appropriate communication system for transferring data between the components coupled to the housing member 150 and the support structure 170, such as wired or wireless communications systems. Wireless communications systems may include a first transmitter/receiver coupled to the housing member 150, and a second transmitter/receiver in the support structure 170 that communicates with the first transmitter/receiver. The first and second transmitter/receiver may communicate in any suitable way and use any suitable wireless frequency or frequencies (e.g., 2.4 GHz, 60 GHz), communication protocol(s), etc. The first and second transmitter/receiver may also communicate via an optical communication link.

Figure 2:
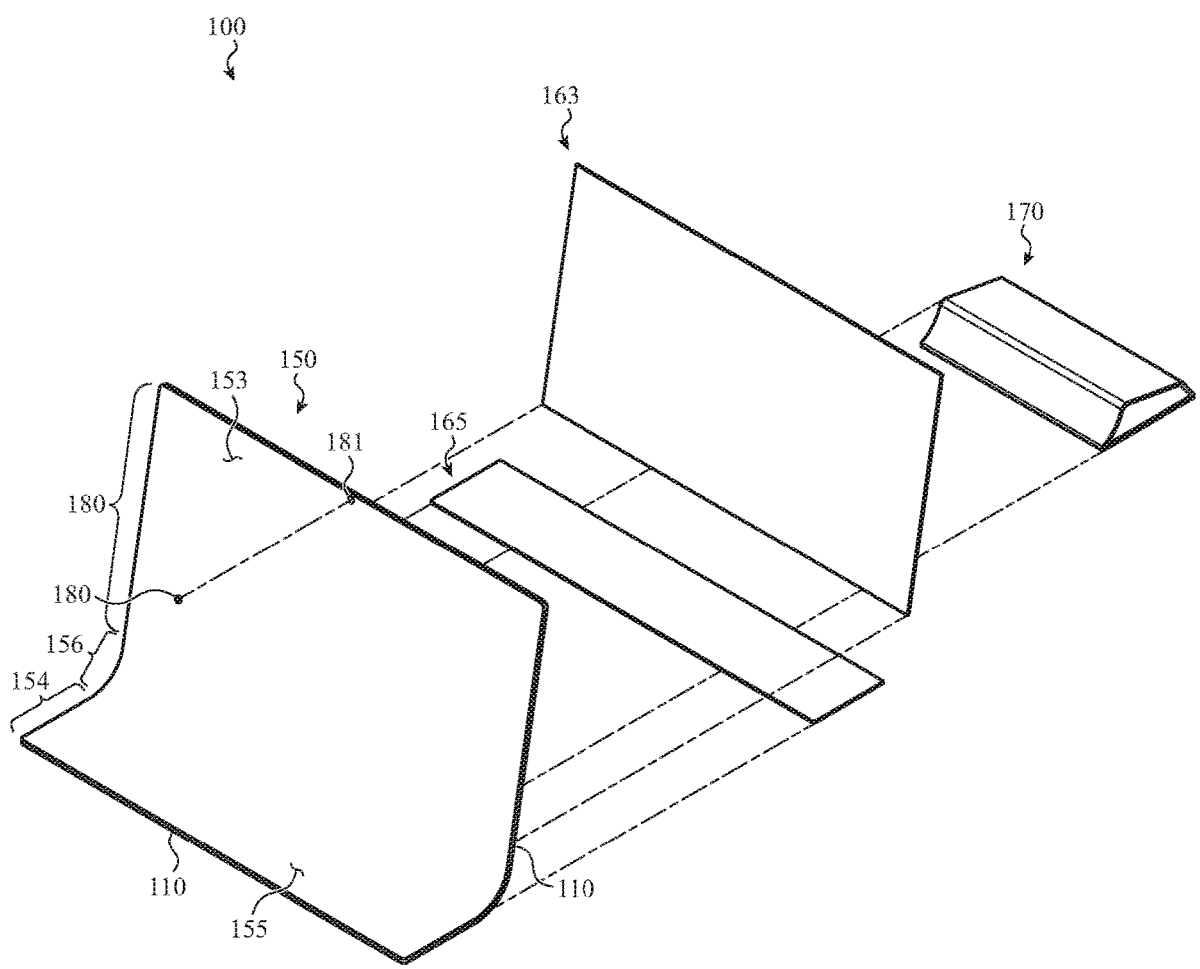
FIG. 2 illustrates an exploded view of the electronic device of FIGS. 1A and 1B.

FIG. 2 illustrates an exploded view of the electronic device 100 of FIGS. 1A and 1B. The housing member 150 may be formed from any suitable material, such as plastic, ceramic, glass, composites, or combinations thereof. For example, the housing member 150 may be a single piece of glass that has been molded (e.g., slumped) to form the various portions of the housing member 150. For example, in the embodiment shown in FIG. 1A, the upper portion 152, the lower portion 154, and the transition portion 156 are formed from a single glass member. As discussed above, the portions of the housing member 150 may cooperate to form a single continuous housing member with a shared front exterior surface 151.

In some embodiments, the housing member 150 is rigid such that the portions do not move relative to one another and/or are not capable of doing so under normal operating or use conditions. In some embodiments, the housing member 150 is flexible such that the portions are movable relative to one another and the angles therebetween may be changed. In some embodiments, one or more portions of the housing member 150 are flexible. For example, the transition portion 156 may be flexible to allow an angle between the lower portion 154 and the upper portion 152 to be adjusted. In some embodiments, the housing member 150 is at least partially formed from a flexible glass material. For example, the transition portion 156 may be formed from flexible glass, and may cooperate with the upper portion 152 and the lower portion 154 to form a continuous front exterior surface 151 of the housing member 150.

The housing member 150 includes planar upper and lower portions 152, 154 and a curved transition portion 156. This is one example of a shape of the housing member 150, but other shapes and curvatures are envisioned. For example, the housing member 150 may include multiple curved portions. In some embodiments, the housing member 150 includes one or more compound curves. For example, an upper portion may be curved (e.g., concave) about a vertical axis, a transition portion may be curved (e.g., concave) about a horizontal axis, and a lower portion may be curved or planar. In various embodiments, different portions of the housing member 150 may include planar regions and curved regions.

As discussed above, the electronic device 100 may include one or more displays. For example, a display area of the housing member 150 (e.g., display area 153) may be integrated with a display 163 for conveying visual information to a user, such as by displaying graphical user interfaces. The display 163 may include various display components, such as liquid crystal display (LCD) components, light source(s) (e.g., light emitting diodes (LEDs), organic LEDs (OLEDs)), filter layers, polarizers, light diffusers, covers (e.g., glass or plastic cover sheets), and the like.

In various embodiments, the display 163 may provide visual outputs at a display area (e.g., the display area 153). The display 163 may be positioned in any suitable arrangement so that an output of the display 163 is visible at the front exterior surface 151 of the electronic device 100 (e.g., within the display area 153). The display components may be positioned at various locations relative to the surface. For example, one or more display components may be positioned within the housing member 150, coupled to a surface of the housing member 150, between layers of the housing member 150, or some combination thereof. Positioning of display components with respect to the housing member 150 is discussed in more detail below with respect to FIGS. 6-10.

The electronic device 100 may include one or more input devices. For example, an input area of the housing member 150 (e.g., input area 155) may be integrated with one or more input devices (e.g., input device 165) for receiving touch inputs, force inputs, keyboard inputs, and the like. Touch inputs may include clicks, taps, gestures (e.g., swiping, pinching), multi-touch inputs, or the like. These inputs may be similar to or include inputs conventionally detected by a trackpad. For example, these inputs may include gesture inputs that may be used to control a cursor or element of a graphical user interface on a display of the electronic device 100. The electronic device 100 may use any suitable input device(s), such as buttons, keyboards, capacitive touch sensors, resistive touch sensors, acoustic wave sensors, cameras, optical sensors, or the like, to detect inputs. The input devices may additionally include a combination of multiple sensors (e.g., capacitive touch sensors, resistive touch sensors, acoustic wave sensors), for example arranged in an array (e.g., a touch array). Keyboard inputs may include touch inputs received at mechanical keys (e.g., keys of a mechanical keyboard) and/or a keyless surface of a virtual keyboard provided in the input area 155. A force input and/or a force component of an input may be detected using any suitable force sensors provided at the electronic device 100.

In various embodiments, input devices may detect inputs provided in input areas. Input devices may be positioned in any suitable arrangements by which inputs may be provided at the electronic device 100 (e.g., within the input area 155). The input devices that detect inputs may be positioned at various locations relative to the surface of the electronic device 100. For example, one or more input devices may be positioned within the housing member 150, coupled to a surface of the housing member 150, or some combination thereof. In some cases, the entire exterior surface of the housing member 150 (or substantially all of the exterior surface) may be touch and/or force sensitive, and may detect touch inputs substantially anywhere along its surface, including in a keyboard region as well as surrounding regions. Positioning of input devices with respect to the housing member 150 is discussed in more detail below with respect to FIGS. 6-10.

In some embodiments, the electronic device 100 may include one or more cameras such as a camera 180. The camera 180 may be coupled to the housing member 150. In some embodiments, the camera 180 may be positioned at least partially in an opening in the housing member, such as opening 181 in the upper portion 152 of the housing member 150. In some embodiments, the camera 180 may be positioned between layers of the housing member 150. In some embodiments, the camera 180 may be affixed or otherwise coupled to a surface of the housing member 150, such as the front exterior surface 151 or the rear surface 161 of the housing member 150. In various embodiments, the camera may receive inputs (e.g., capture images). In some embodiments, inputs may be received through one or more components of the electronic device, including the housing member 150, one or more function layers, or the like.

Figure 3:
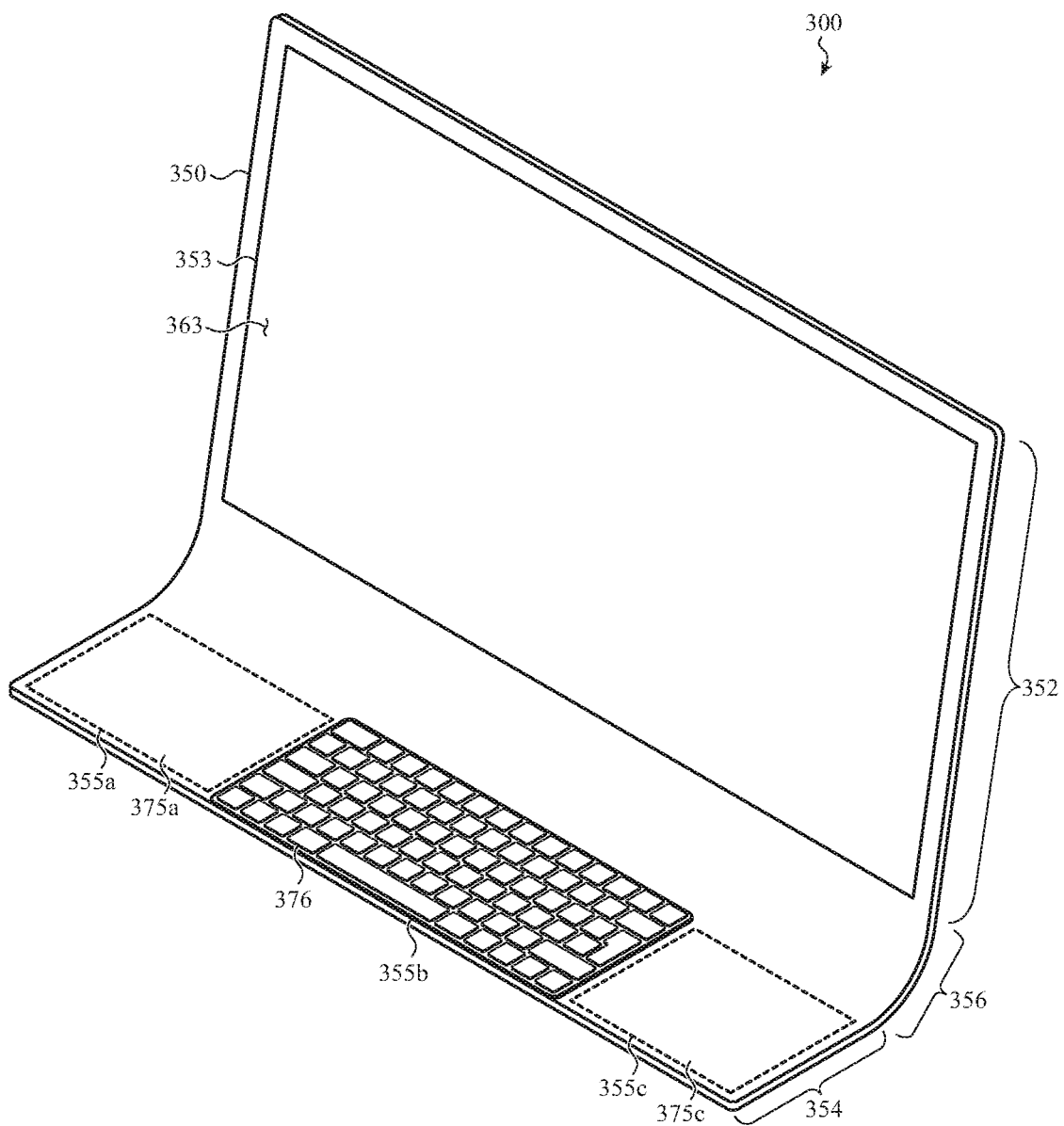
FIG. 3 illustrates an example electronic device.

FIG. 3 illustrates an example electronic device 300. The electronic device 300 may include the same or similar components and functionality as other electronic devices discussed herein (e.g., electronic device 100). The electronic device 300 includes a housing member 350 that includes an upper portion 352, a lower portion 354, and a transition portion 356. The transition portion 356 joins the upper portion 352 and the lower portion 354, and forms a continuous, curved surface between the upper portion and the lower portion. The upper portion defines a display area 353. A display 363 is coupled to and/or integrated with the upper portion 352 and is configured to provide visual outputs at the display area. The lower portion defines three input areas 355a, 355b, and 355c. One or more input devices may be coupled to and/or integrated with the lower portion 354 and configured detect inputs at the three input areas 355a-c. For example, a touch array 375a is configured to detect inputs in the input area 355a, a keyboard 376 is configured to detect inputs in the input area 355b, and a touch array 375c is configured to detect inputs in the input area 355c. The combination of input devices provided at the electronic device 100 allows users to provide multiple types of input. For example, a user may type using the keyboard 376 and provide touch inputs, such as gesture-based inputs using the touch arrays 375a, b.

Figure 4A:
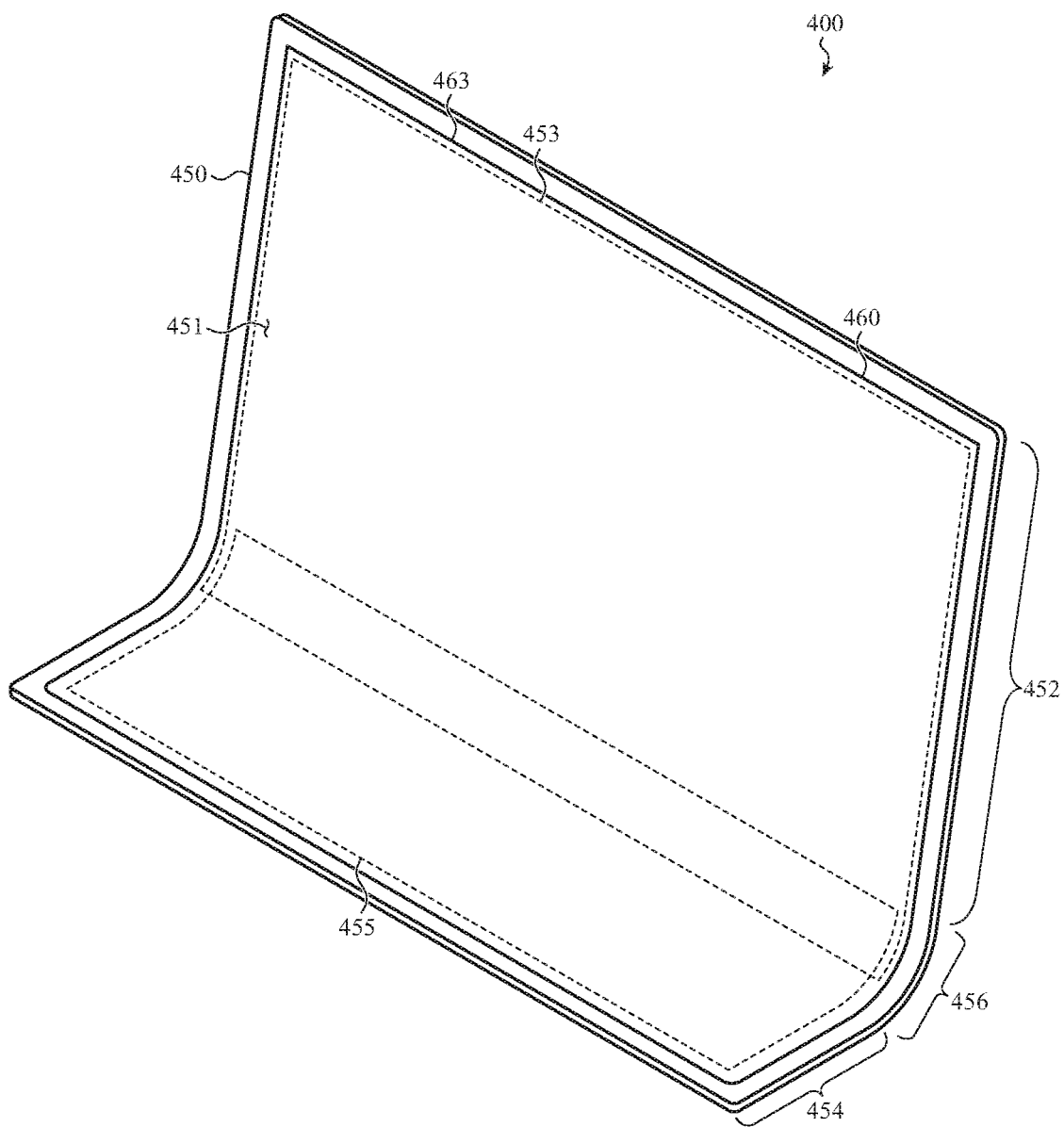
FIGS. 4A-4B illustrate example electronic devices.

FIG. 4A illustrates an example electronic device 400. The electronic device 400 may include the same or similar components and functionality as other electronic devices discussed herein (e.g., electronic devices 100, 300). The electronic device 400 includes a housing member 450 that includes an upper portion 452, a lower portion 454, and a transition portion 456. The transition portion 456 joins the upper portion 452 and the lower portion 454, and forms a continuous, curved surface between the upper portion and the lower portion.

In some embodiments, the upper portion, 452, the transition portion 456, and/or the lower portion 454 define an interface area 460. The interface area 460 may include a display area 453 and an input area 455. In some embodiments, the display area 453 may be defined in a first region of the front exterior surface 451 and the input area 455 may be defined in a second region of the front exterior surface 451. In various embodiments, the display area 453 and the input area 455 may be defined in several overlapping or non-overlapping configurations. As shown in FIG. 4A, the display area 453 and the input area 455 may be defined within overlapping regions of the interface area 460. In various embodiments, the display area 453 and the input area 455 may overlap to form a touchscreen-style display across some or all of the interface area 460. For example, the input area 455 may be positioned along a part of the lower portion 454 to define a touchscreen-style display for use as a keyboard and/or trackpad. In such cases, the input area 455 may not extend over the upper portion 452 or the transition portion 456. In various embodiments, the input area 455 extends beyond the display area. For example, the input area 455 may include portions of the front exterior surface 451 of the housing member 450 between the display area 453 and one or more edges of the housing member 450 (e.g., the bezel or frame region of the device 400).

In some embodiments, the interface area 460 may encompass all, substantially all, or a large portion of the front exterior surface 451 of the electronic device 400. In some embodiments, the interface area 460 extends to one or more edges of the front exterior surface 451 such that the interface area 460 encompasses all of the front exterior surface 451. In some embodiments, the interface area 460 is surrounded by a frame or bezel region, and the interface area 460 and the frame or bezel region together encompass all of the front exterior surface 451. The interface area 460 may be curved to conform to the shape of the housing member 450.

The electronic device 400 may include one or more displays or display components configured to provide visual output at the display area 453. For example, a display 463 configured to provide visual output at the display area 453 may be coupled to and/or integrated with the upper portion, 452, the transition portion 456, and/or the lower portion 454. In some embodiments, the display 463 may be curved and/or flexible to conform to the shape of the housing member 450. For example, a curvature of the display 463 may correspond to a curvature of the housing member 150. The electronic device 400 may further include one or more input components for receiving inputs at the input area 455. In various embodiments, the input components include touch and/or force sensors. As discussed above, the display components and input components may be combined to form a touchscreen-style display across some or all of the interface area 460. In some embodiments, the input area 455 may include other types of input devices, such as mechanical input devices. For example, in some embodiments, the input area 455 includes a mechanical keyboard.

Figure 4B:
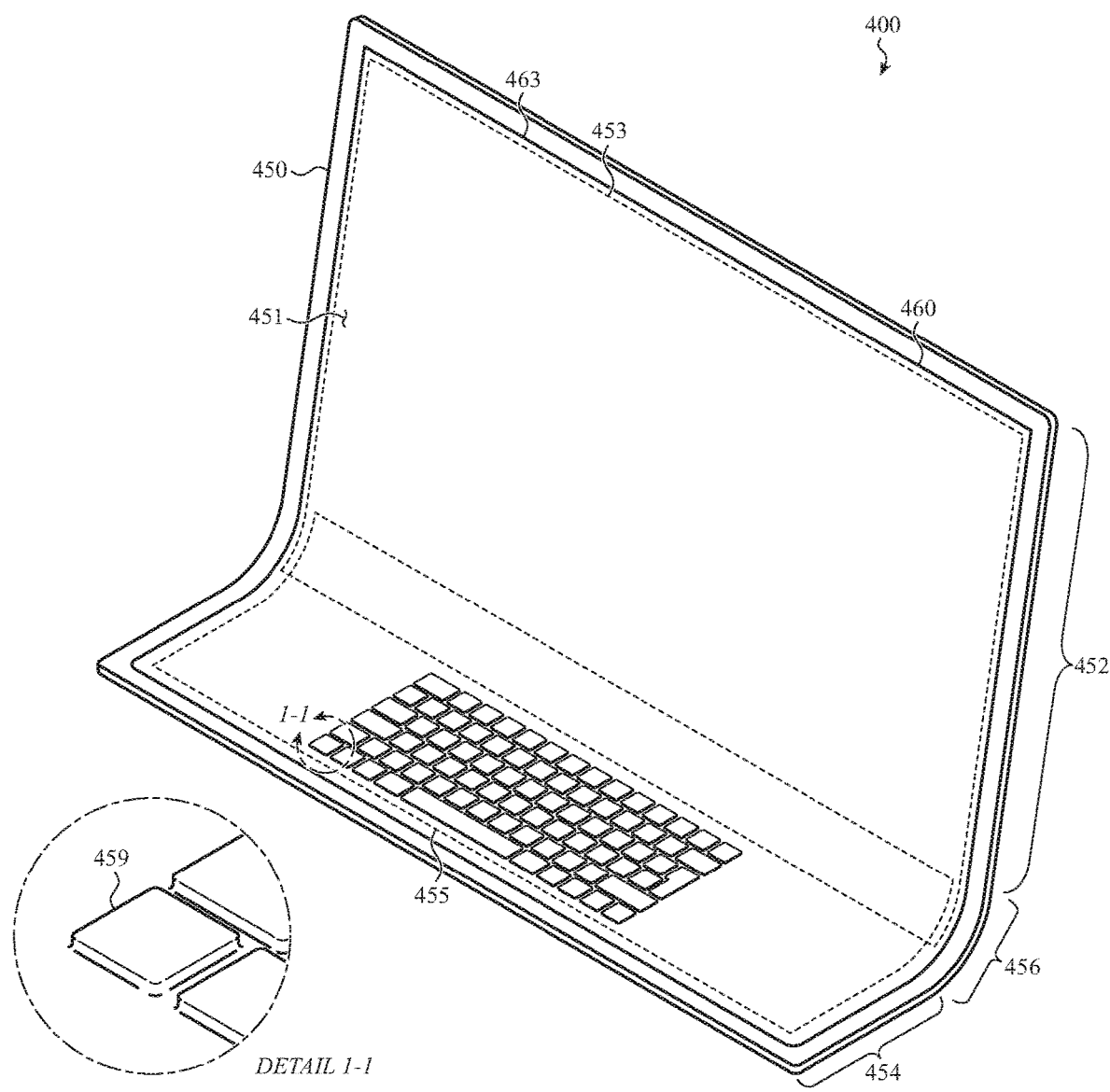

In some cases, the housing member 450, and in particular the portion of the input area 455 in the lower portion 454, may be shaped to define physically distinctive key regions. FIG. 4B illustrates an embodiment of the example electronic device 400 in which the housing member 450 is shaped to define physically distinctive key regions 459. In various embodiments, the housing member 450 may include recesses, protrusions, borders, or other physical features on its exterior surface that define and/or delineate distinct key regions 459 and that can be felt by a user when typing on or otherwise touching the input area 455. For example, a glass housing member may be thermoformed, slumped, heat-pressed or otherwise processed to form an array of raised key regions (e.g., protrusions, contoured key regions, etc.) that define the key regions of a keyboard. Raised key regions may provide a more familiar-feeling keyboard surface to users, as the individual key regions may have a similar shape and feel to conventional movable keys. Moreover, a user may be able to type faster and with fewer errors because they can feel the borders and boundaries of each key region and do not need to look at the keyboard to align their fingers with the keys. The ability to feel distinct key regions may also help prevent a user's hands from unintentionally drifting out of position during typing.

In some embodiments, at least a portion of the housing member 450 where one or more key regions is located is flexible. For example, the glass may be thinner than about 100 μm, thinner than about 40 μm, or thinner than about 30 μm. The housing member 450 may be configured to locally deflect or deform any suitable amount in response to a typing force. For example, the housing member 450 may be configured to locally deflect about 0.1 mm, about 0.2 mm, about 0.3 mm, about 0.4 mm, about 0.5 mm, or any other suitable amount, in response to a sample typing force (e.g., 100 g, 250 g, 500 g, 1 kg, etc.). Further, due to the flexibility of the housing member 450, the raised key regions may be configured to deform in response to typing inputs. Such deformations may provide a similar tactile feeling to conventional movable-key keyboards. Further, the raised key regions may be configured to provide various types of tactile responses.

In some embodiments, the input area 455 may lack raised or otherwise protruding key regions (e.g., it may be smooth and/or substantially planar). In such cases, key regions may be differentiated using ink, paint, dyes, textures, displays, or any other suitable technique.

Figure 5:
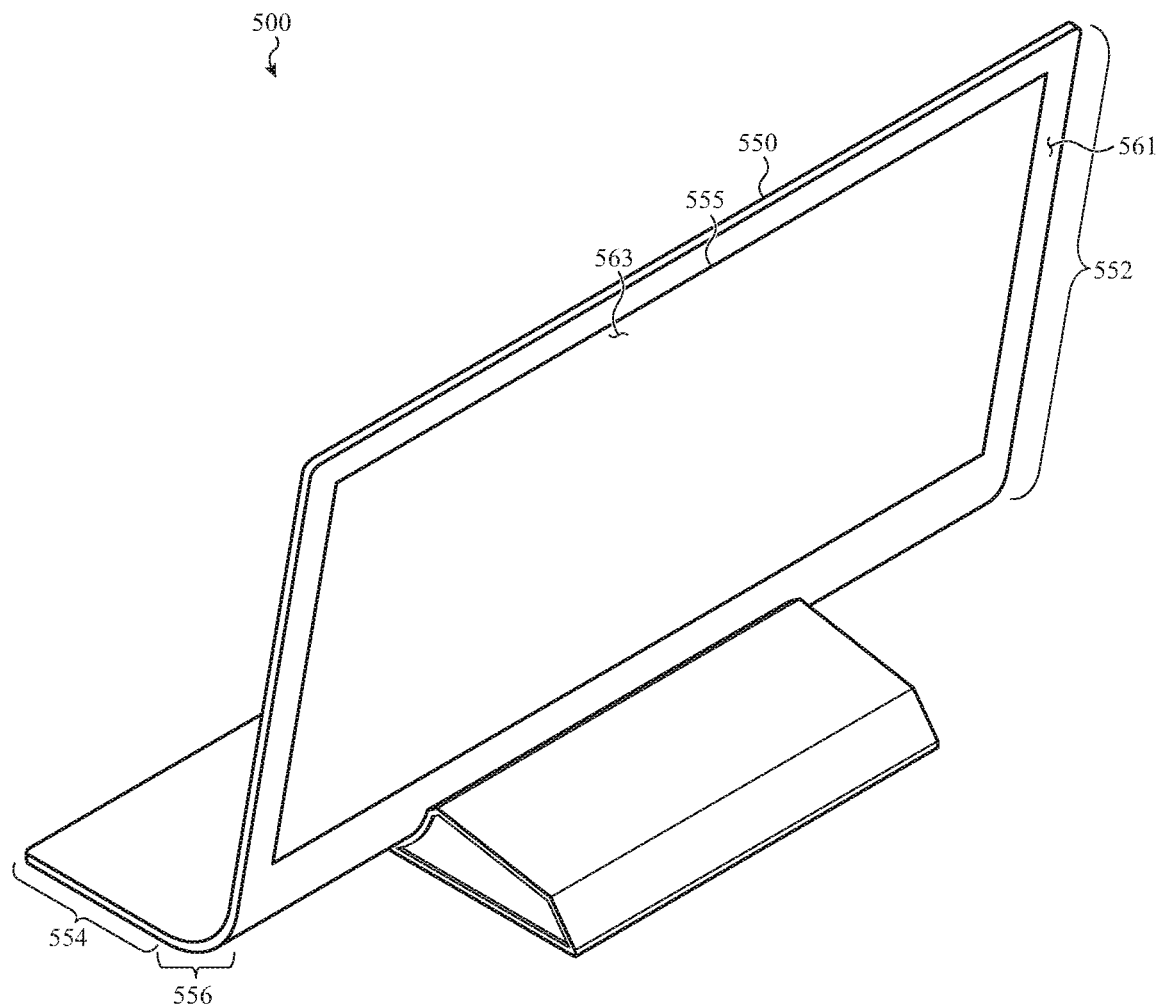
FIG. 5 illustrates an example electronic device.

FIG. 5 illustrates an example electronic device 500. The electronic device 500 may include the same or similar components and functionality as other electronic devices discussed herein (e.g., electronic devices 100, 300, 400). The electronic device 500 includes a housing member 550 that includes an upper portion 552, a lower portion 554, and a transition portion 556. The transition portion 556 joins the upper portion 552 and the lower portion 554, and cooperates with the upper portion 552 and the lower portion 554 to form a continuous rear surface 561. In some embodiments, the electronic device 500 includes a display 563 coupled to and/or integrated with the housing member 550 and configured to provide visual outputs at an interface area 555 defined on the rear surface 561. The display 563 may be an additional display in addition to a display configured to provide visual outputs at a display area on the front of the device (e.g., display 163). In some cases, the display 563 shares one or more components with another display of the electronic device 500, such as a display configured to provide visual outputs at a display area defined on a front exterior surface of the electronic device. For example, the display 563 may share a light source, light guide panels or sheets, filters, and the like with one or more additional displays.

Additionally or alternatively, in some embodiments, the electronic device 500 includes one or more input components coupled to and/or integrated with the housing member 550 and configured to receive inputs at the interface area 555. In some embodiments, the electronic device 500 includes input components and display components that cooperate to form a touchscreen-style display on the rear surface 561.

As discussed above, input and display functionality may be provided at and/or through a surface of the housing member (e.g., surfaces 151, 161), but display and input components may be positioned at various positions relative to the surfaces. FIGS. 6-10 illustrate examples of the arrangement and positioning of display and input components.

Figure 6A:
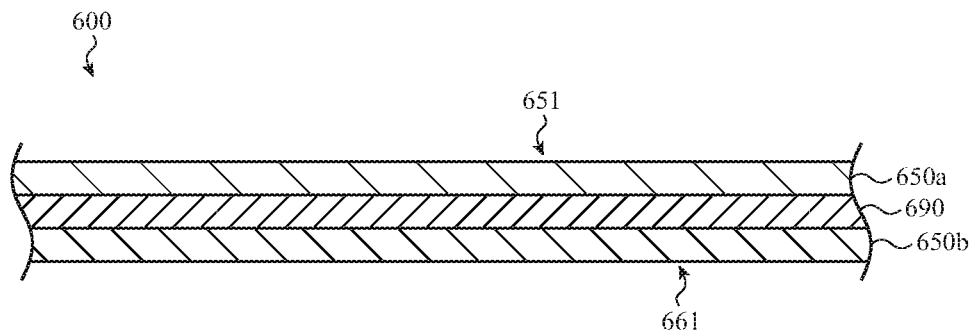
FIGS. 6A-6C illustrate example partial cross-section views of an electronic device.
Figure 6B:
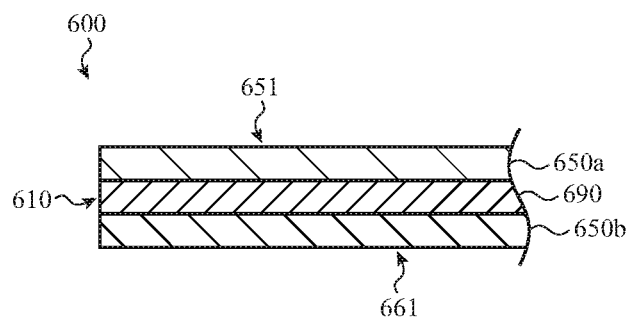
Figure 6C:
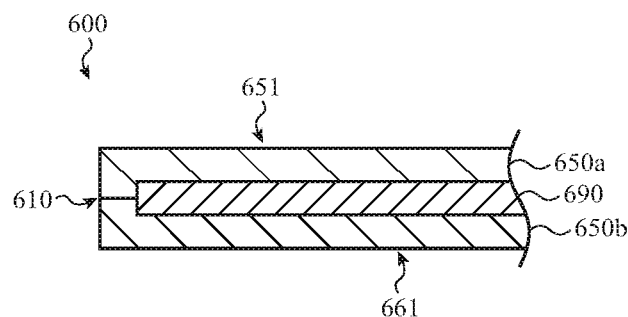

FIGS. 6A-6C illustrate example partial cross-section views of an electronic device 600. The views of FIGS. 6A-6C are similar to views indicated by section line A-A of FIG. 1A. The electronic device 600 may include the same or similar components and functionality as other electronic devices discussed herein (e.g., electronic devices 100, 300, 400, 500). FIG. 6A illustrates an example structure of the electronic device 600 in which layers 650a and 650b of a housing member (e.g., which may correspond to the housing member 150) are positioned on opposite sides of a display 690. The housing member defines a front exterior surface 651 and a rear surface 661, which may correspond to front exterior surface 151 and rear surface 161, respectively. The electronic device 600 includes a display 690 between the housing member layers 650a and 650b. The display 690 may include any combination of display components, such as those discussed herein.

In various embodiments, the display 690 may provide display functionality through the housing member layer 650a, the housing member layer 650b and/or additional layers or components of the electronic device 600. For example, the display 690 may provide a graphical output that is visible through the housing member layer 650a and/or the housing member layer 650b. The display 690 is shown as a single layer for purposes of illustration, but it may include multiple layers and/or components. The housing member layers 650a and 650b and the display 690 may be attached or otherwise coupled to one another by any proper means, including adhesives, fasteners, pressure fitting, fusion, or the like. In some embodiments, the electronic device 600 may include additional components to attach and/or support the display 690 and/or the housing member layers 650a and 650b. For example, the electronic device 600 may include spacers, compliant members, and the like. Similarly, the electronic device 600 may include one or more gaps between layers (e.g., between the display 690 and the housing member layers 650a and 650b).

FIG. 6B illustrates a partial cross-section view of a region of the electronic device 600 that includes a side surface 610. FIG. 6B illustrates an example structure of the electronic device 600 in which the display 690 extends to the side surface 610. In some embodiments, the display 690 may define a portion of the side surface 610. In various embodiments, the arrangement shown in FIG. 6B may allow the display area defined by the display to extend either all the way or substantially all the way to one or more edges of the housing member, which may provide an improved user experience by obviating the need for a bezel or other border around the display 690.

FIG. 6C illustrates a partial cross-section view of a region of the electronic device 600 that includes a side surface 610. FIG. 6C illustrates an example structure of the electronic device 600 in which the display 690 does not extend to or define a portion of the side surface 610. In some embodiments, the housing member layers 650a and 650b cooperate to at least partially surround the display 690 and define the side surface 610. In some embodiments, a separate component (e.g., a housing member component) may define the side surface 610. In some embodiments, the housing member layers 650a and 650b are joined or fused to form a single part that at least partially surrounds the display 690 and defines the side surface 610.

The display 690 is one example device that may be arranged relative to the housing member layer 650a and 650b as shown in FIGS. 6A-6C. Other devices, layers and/or components may be included instead or in addition to the display 690. For example, the electronic device 600 may include one or more input devices arranged similarly to the display 690 that receives inputs through the housing member layer 650a and/or the housing member layer 650b. Similarly, the electronic device 600 may include biometric sensors, output devices, charging components, data transfer components, and the like that are arranged similarly to the display 690.

Figure 7A:
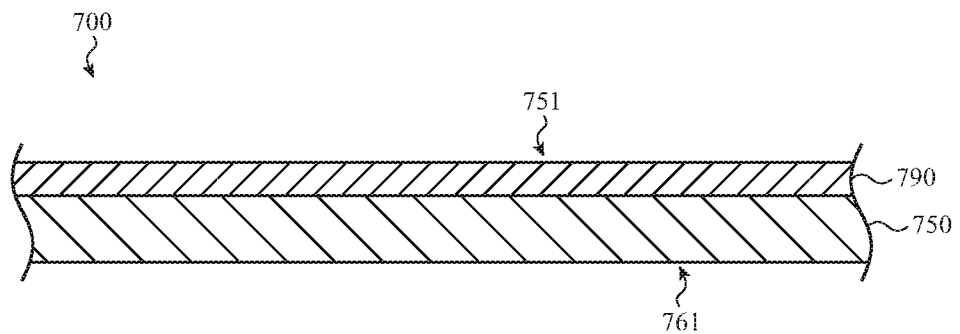
FIGS. 7A-7C illustrate example partial cross-section views of an electronic device.
Figure 7B:
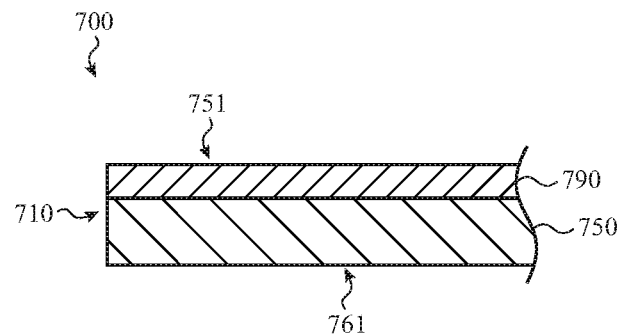
Figure 7C:
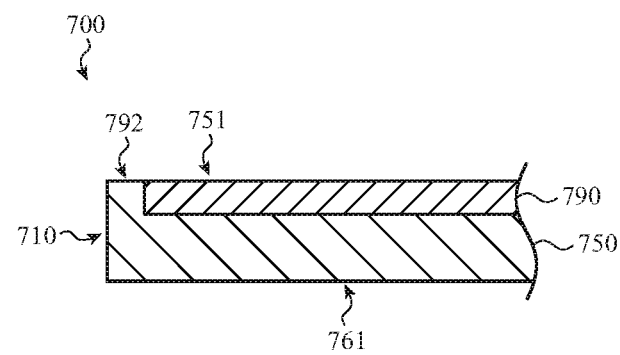

FIGS. 7A-7C illustrate example partial cross-section views of an electronic device 700. The views of FIGS. 7A-7C are similar to views indicated by section line A-A of FIG. 1A. The electronic device 700 may include the same or similar components and functionality as other electronic devices discussed herein (e.g., electronic devices 100, 300, 400, 500, 600). FIG. 7A illustrates an example structure of the electronic device 700 in which a display 790 is positioned adjacent to a housing member 750. The electronic device 700 defines a front exterior surface 751 and a rear surface 761, which may correspond to front exterior surface 151 and rear surface 161, respectively. The display 790 may define at least a portion of the front exterior surface 751. The housing member 750 may define at least a portion of the rear surface 761. The housing member 750 and the display 790 may be attached or otherwise coupled to one another by any proper means, including adhesives, fasteners, pressure fitting, fusion, or the like.

FIG. 7B illustrates a partial cross-section view of a region of the electronic device 700 that includes a side surface 710. FIG. 7B illustrates an example structure of the electronic device 700 in which the display 790 extends to the side surface 710. In some embodiments, the display 790 may define a portion of the side surface 710. In various embodiments, the arrangement shown in FIG. 7B may allow the display area defined by the display 790 to extend either all the way or substantially all the way to one or more edges of the housing member, which may provide an improved user experience by obviating the need for a bezel or other border around the display 790.

FIG. 7C illustrates a partial cross-section view of a region of the electronic device 700 that includes a side surface 710. FIG. 7C illustrates an example structure of the electronic device 700 in which the display 790 does not extend to the side surface 710. In some embodiments, the housing member 750 at least partially surrounds the display 790 and defines the side surface 710. In some embodiments, a flange 792 at least partially surrounds the display 890 and defines the side surface 810. For example, the display 790 may be partially or completely inset in the housing member 750. In some embodiments, a separate component (e.g., a housing member component) may define the side surface 710. For example, the flange 792 may be a separate piece from other pieces of the housing member 750 (e.g., a polymer, glass, or other material member that is adhered or otherwise secured to the housing member 750).

As described above, in various embodiments, the display 790 defines at least a portion of the front exterior surface 751. In some embodiments, the display 790 may include a cover sheet or other cover layer that defines the front exterior surface 751 and/or the side surface 710. In some embodiments, the portion of the front exterior surface defined by the display 790 (e.g., a display area) is flush with one or more portions of the exterior surface defined by the housing member 750 and/or other components, as illustrated in FIG. 7C. In some embodiments, the portion of the front exterior surface defined by the display 790 may not be flush with one or more portions of the exterior surface defined by the housing member 750 and/or other components. For example, the display 790 may protrude or be recessed with respect to additional portions of the exterior surface, such as a flange 792.

The display 790 is one example device that may be arranged relative to the housing member 750 as shown in FIGS. 7A-7C. Other devices, layers and/or components may be included instead or in addition to the display 790. For example, the electronic device 700 may include one or more input devices arranged similarly to the display 790 that receives inputs. Similarly, the electronic device 700 may include biometric sensors, output devices, charging components, data transfer components, and the like that are arranged similarly to the display 790.

Figure 8A:
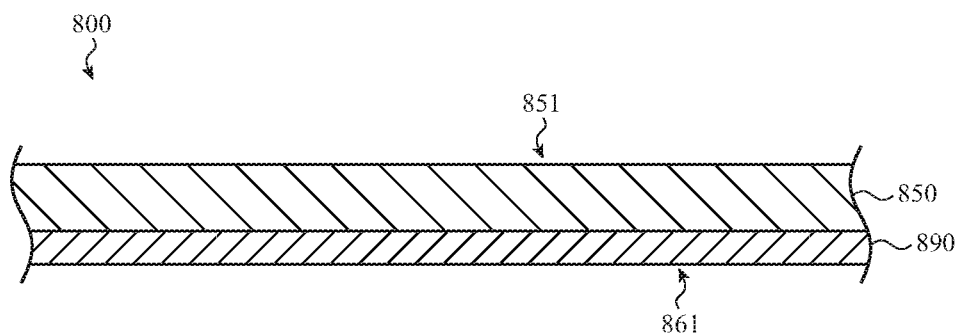
FIGS. 8A-8C illustrate example partial cross-section views of an electronic device.
Figure 8B:
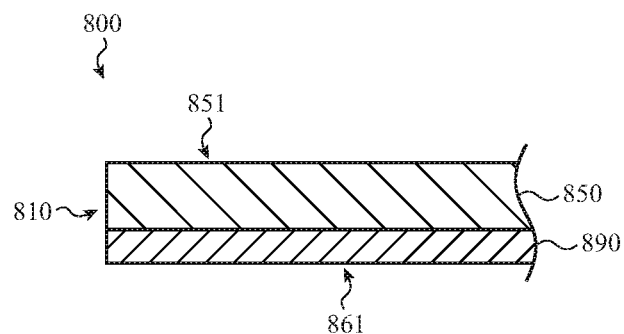
Figure 8C:
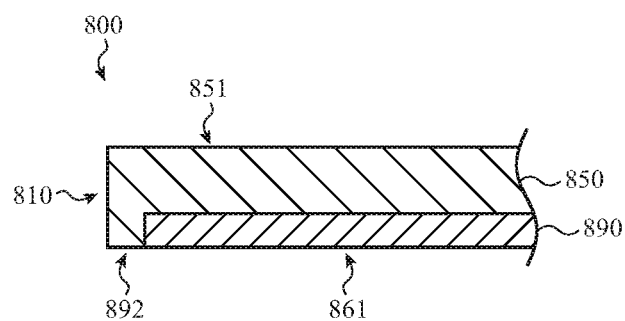

FIGS. 8A-8C illustrate example partial cross-section views of an electronic device 800. The views of FIGS. 8A-8C are similar to views indicated by section line A-A of FIG. 1A. The electronic device 800 may include the same or similar components and functionality as other electronic devices discussed herein (e.g., electronic devices 100, 300, 400, 500, 600, 700). FIG. 8A illustrates an example structure of the electronic device 800 in which a display 890 is positioned adjacent to a housing member 850. The electronic device 800 defines a front exterior surface 851 and a rear surface 861, which may correspond to front exterior surface 151 and rear surface 161, respectively. The display 890 may define at least a portion of the rear surface 861. The housing member 850 may define at least a portion of the front exterior surface 851. The housing member 850 and the display 890 may be attached or otherwise coupled to one another by any proper means, including adhesives, fasteners, pressure fitting, fusion, or the like.

FIG. 8B illustrates a partial cross-section view of a region of the electronic device 800 that includes a side surface 810. FIG. 8B illustrates an example structure of the electronic device 800 in which the display 890 extends to the side surface 810. In some embodiments, the display 890 may define a portion of the side surface 810. In various embodiments, the arrangement shown in FIG. 8B may allow the display area defined by the display 890 to extend either all the way or substantially all the way to one or more edges of the housing member, which may provide an improved user experience by obviating the need for a bezel or other border around the display 890.

FIG. 8C illustrates a partial cross-section view of a region of the electronic device 800 that includes the side surface 810. FIG. 8C illustrates an example structure of the electronic device 800 in which the display 890 does not extend to the side surface 810. In some embodiments, the housing member 850 at least partially surrounds the display 890 and defines the side surface 810. In some embodiments, a flange 892 at least partially surrounds the display 890 and defines the side surface 810. For example, the display 890 may be partially or completely inset in the housing member 850. In some embodiments, a separate component (e.g., a housing member component) may define the side surface 810. For example, the flange 892 may be a separate piece from other pieces of the housing member 850 (e.g., a polymer, glass, or other material member that is adhered or otherwise secured to the housing member 850).

As described above, in various embodiments, the display 890 defines at least a portion of the rear surface 861. In some embodiments, the display 890 may include a cover sheet or other cover layer that defines the rear surface 861 and/or the side surface 810. In some embodiments, the portion of the rear surface defined by the display 890 (e.g., a display area) is flush with one or more portions of the exterior surface defined by the housing member 850 and/or other components, as illustrated in FIG. 8C. In some embodiments, the portion of the rear surface defined by the display 890 may not be flush with one or more portions of the exterior surface defined by the housing member 850 and/or other components. For example, the display 890 may protrude or be recessed with respect to additional portions of the exterior surface, such as the flange 892.

The display 890 is one example device that may be arranged relative to the housing member 850 as shown in FIGS. 8A-8C. Other devices, layers and/or components may be included instead or in addition to the display 890. For example, the electronic device 800 may include one or more input devices arranged similarly to the display 890 that receives inputs through the housing member 850. Similarly, the electronic device 800 may include biometric sensors, output devices, charging components, data transfer components, and the like that are arranged similarly to the display 890.

Figure 9A:
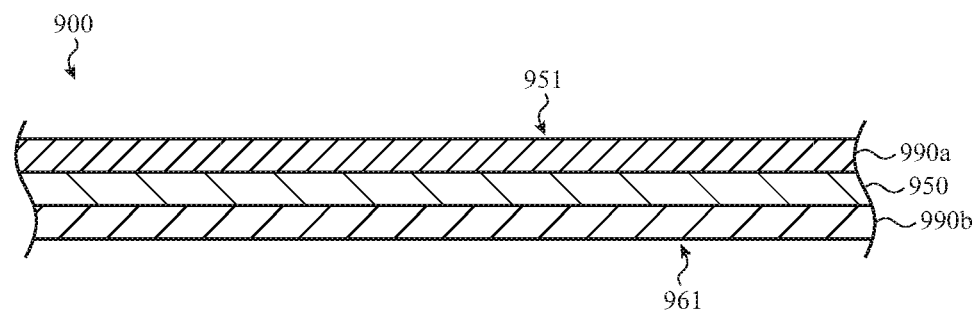
FIGS. 9A-9D illustrate example partial cross-section views of an electronic device.

FIGS. 9A-9D illustrate example partial cross-section views of an electronic device 900. The views of FIGS. 9A-9D are similar to views indicated by section line A-A of FIG. 1A. The electronic device 900 may include the same or similar components and functionality as other electronic devices discussed herein (e.g., electronic devices 100, 300, 400, 500, 600, 700, 800). FIG. 9A illustrates an example structure of the electronic device 900 in which a display 990a and an input device 990b are positioned adjacent to a housing member 950. The electronic device 900 defines a first exterior surface 951 and a second exterior surface 961, both of which may correspond to a front exterior surface and/or a rear surface (e.g., front exterior surface 151 and rear surface 161). The display 990*a* may define at least a portion of the first exterior surface 951. The input device 990*b* may define at least a portion of the second exterior surface 961.

In various embodiments, functionality of the display 990*a* and/or the input device 990*b* may be provided through the housing member 950 and/or additional layers or components of the electronic device 900. For example, the display 990*a* and the input device 990*b* may cooperate to form a touch-screen-style display of the electronic device. The housing member 950, the display 990*a*, and/or the input device 990*b* may be attached or otherwise coupled to one another by any proper means, including adhesives, fasteners, pressure fitting, fusion, or the like. The display 990*a* and the input device 990*b* are each shown as a single layer for purposes of illustration, but it may include multiple layers and/or components.

Figure 9B:
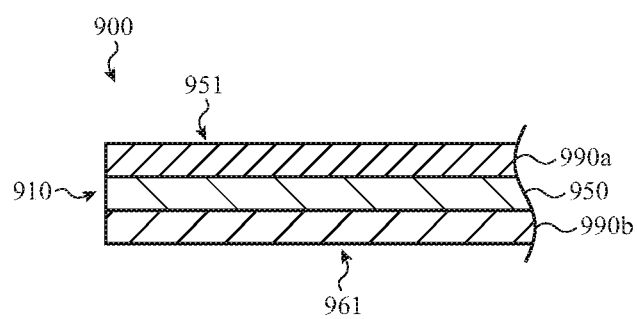

FIG. 9B illustrates a partial cross-section view of a region of the electronic device 900 that includes a side surface 910. FIG. 9B illustrates an example structure of the electronic device 900 in which the display 990*a* and the input device 900*b* extend to the side surface 910. In some embodiments, the display 990*a* and the input device 900*b* may define a portion of the side surface 910. In various embodiments, the arrangement shown in FIG. 9B may allow the display and/or input areas defined by the display and input device to extend either all the way or substantially all the way to one or more edges of the housing member, which may provide an improved user experience by obviating the need for a bezel or other border around the display and/or input device.

Figure 9C:
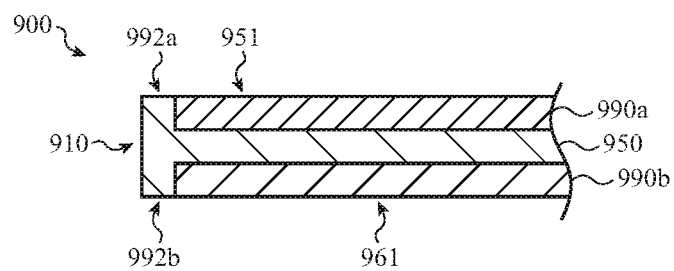

FIG. 9C illustrates a partial cross-section view of a region of the electronic device 900 that includes the side surface 910. FIG. 9C illustrates an example structure of the electronic device 900 in which the display 990*a* and the input device 990*b* do not extend to the side surface 910. In some embodiments, the housing member 950 at least partially surrounds the display 990*a* and/or the input device 990*b* and defines the side surface 910. In some embodiments, flanges 992*a* and 992*b* at least partially surround the display 990*a* and/or the input device 990*b* and defines the side surface 910. For example, the display 990*a* and/or the input device 990*b* may be partially or completely inset in the housing member 950. In some embodiments, a separate component (e.g., a housing member component) may define the side surface 910. For example, the flanges 992*a* and 992*b* may be separate pieces from other pieces of the housing member 950 (e.g., a polymer, glass, or other material member that is adhered or otherwise secured to the housing member 950).

Figure 9D:
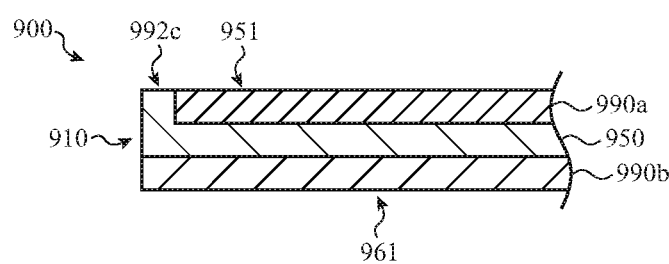

FIG. 9D illustrates a partial cross-section view of a region of the electronic device 900 that includes the side surface 910. FIG. 9D illustrates an example structure of the electronic device 900 in which the display 990*a* does not extend to the side surface 910 and the input device 990*b* does extend to the side surface 910. In some embodiments, the housing member 950 at least partially surrounds the display 990*a* and the input device 990*b* and defines the side surface 910. In some embodiments, a flange 992*c* at least partially surrounds the display 990*a* and/or the input device 990*b* and defines the side surface 910. For example, the display 990*a* and/or the input device 990*b* may be partially or completely inset in a recess or cavity defined (at least partially) by the housing member 950. In some embodiments, a separate component (e.g., a housing member component) may define the side surface 910. For example, the flange 992*c* may be a separate piece from other pieces of the housing member 950 (e.g., a polymer, glass, or other material member that is adhered or otherwise secured to the housing member 950).

As described above, in various embodiments, the display 990*a* and/or the input device 990*b* define at least a portion of the exterior surfaces 951, 961. In some embodiments, one or both of the display 990*a* and the input device 990*b* may include a cover sheet or other cover layer that defines the exterior surface(s) 861, 961 and/or the side surface 910. In some embodiments, the portion(s) of the exterior surface(s) 861, 961 defined by the display 990*a* and/or the input device 990*b* are flush with one or more portions of the exterior surface defined by the housing member 950 and/or other components, as illustrated in FIGS. 9C and 9D. In some embodiments, the portion(s) of the exterior surface(s) defined by the display 990*a* and/or the input device 990*b* may not be flush with one or more portions of the exterior surface defined by the housing member 950 and/or other components. For example, the display 990*a* and/or the input device 990*b* may protrude and/or be recessed with respect to additional portions of the exterior surface, such as the flange 992*c*.

The display 990*a* and the input device 990*b* are example devices that may be arranged relative to the housing member 950 as shown in FIGS. 9A-9D. Other devices, layers and/or components may be included instead or in addition to the display 990*a* and/or the input device 990*b*. For example, the electronic device 900 may include biometric sensors, output devices, charging components, data transfer components, and the like that are arranged similarly to the display 990*a* and/or the input device 990*b*.

Figure 10A:
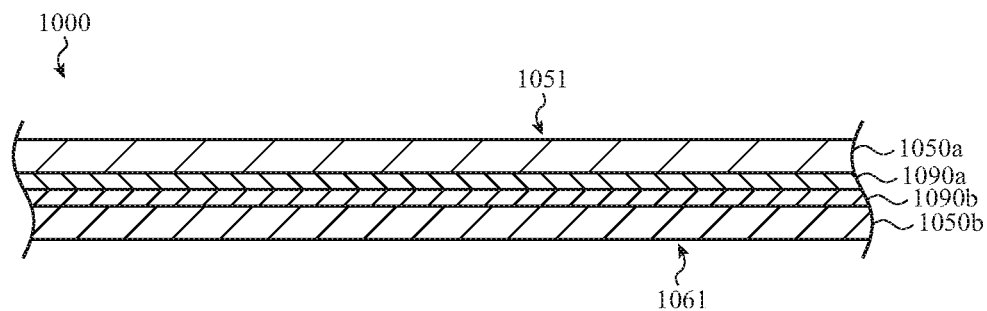
FIGS. 10A-10E illustrate example partial cross-section views of an electronic device.

FIGS. 10A-10E illustrate example partial cross-section views of an electronic device 1000. The views of FIGS. 10A-10E are similar to views indicated by section line A-A of FIG. 1A. The electronic device 1000 may include the same or similar components and functionality as other electronic devices discussed herein (e.g., electronic devices 100, 300, 400, 500, 600, 700, 800, 900). FIG. 10A illustrates an example structure of the electronic device 1000 in which layers 1050*a* and 1050*b* of a housing member (e.g., housing member 150) are positioned on opposite sides of a display 1090*a* and an input device 1090*b*. The electronic device 1000 defines a first exterior surface 1051 and a second exterior surface 1061, either of which may correspond to a front exterior surface and/or a rear surface (e.g., front exterior surface 151 and rear surface 161). The housing member layer 1050*a* may define at least a portion of the first exterior surface 1051. The housing member layer 1050*b* may define at least a portion of the second exterior surface 1061. The electronic device 1000 a display 1090*a* and an input device 1090*b* between the housing member layers 1050*a* and 1050*b*.

In various embodiments, functionality of the display 1090*a* and the input device 1090*b* may be provided through the housing member layer 1050*a*, the housing member layer 1050*b*, and/or additional layers or components of the electronic device 1000. For example, a graphical output of the display 1090*a* may be visible through the housing member layer 1050*a* and/or the housing member layer 1050*b*. As another example, the input device 1090*b* may receive inputs through the housing member layer 1050*a* and/or the housing member layer 1050*b*. The display 1090*a* and the input device 1090*b* are each shown as a single layer for purposes of illustration, but each may include multiple layers and/or components. The housing member layers 1050A, B the display 1090*a*, and the input device 1090*b* may be attached or otherwise coupled to one another by any proper means, including adhesives, fasteners, pressure fitting, fusion, or the like.

Figure 10B:
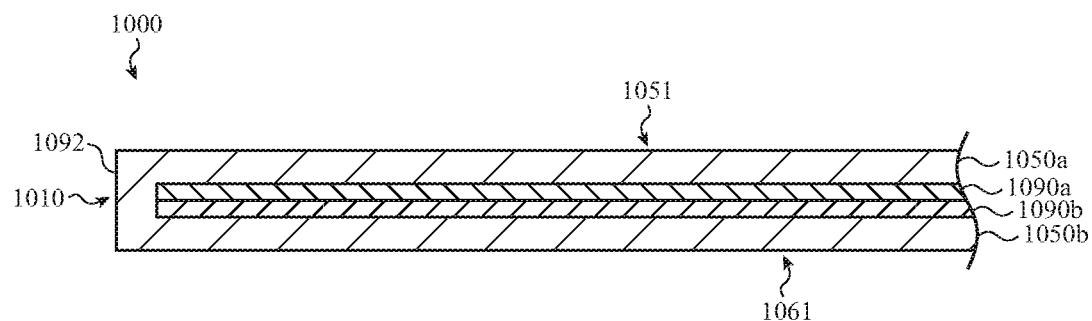

FIG. 10B illustrates a partial cross-section view of a region of the electronic device 1000 that includes a side surface 1010. FIG. 10B illustrates an example structure of the electronic device 1000 in which both the display 1090*a* and the input device 1090*b* extend to the side surface 1010. In some embodiments, the display 1090*a* and/or the input device 1090*b* may define a portion of the side surface 1010. In various embodiments, the arrangement shown in FIG. 10B may allow the display and input areas defined by the display and input device to extend either all the way or substantially all the way to one or more edges of the housing member, which may provide an improved user experience by obviating the need for a bezel or other border around the display and/or the input device.

Figure 10C:
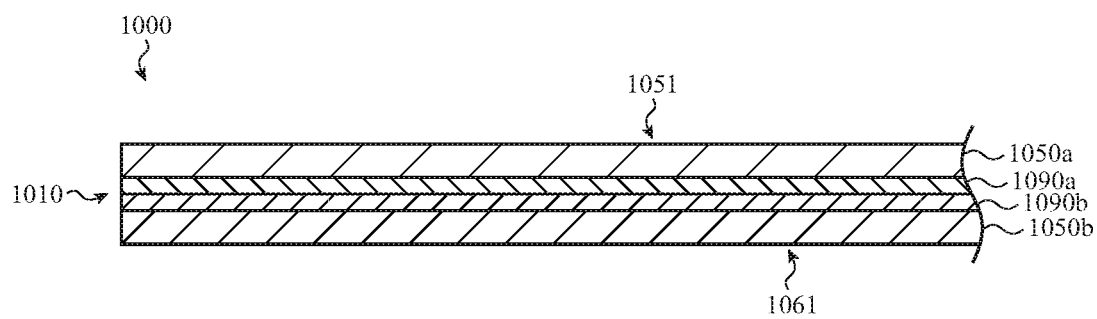

FIG. 10C illustrates a partial cross-section view of a region of the electronic device 1000 that includes a side surface 1010. FIG. 10C illustrates an example structure of the electronic device 1000 in which the display 1090*a* and the input device 1090*b* do not extend to the side surface 1010. In some embodiments, the housing member layers 1050*a* and 1050*b* cooperate to at least partially surround the display 1090*a* and the input device 1090*b* and define the side surface 1010. In some embodiments, a flange 1092 at least partially surrounds the display 1090*a* and/or the input device 1090*b* and defines the side surface 1010. In some embodiments, a separate component (e.g., a housing member component) may define the side surface 1010. For example, the flange 1092 may be a separate piece from other pieces of the housing member 1050 (e.g., a polymer, glass, or other material member that is adhered or otherwise secured to the housing member 1050). In some embodiments, the housing member layers 1050*a* and 1050*b* are joined or fused to form a single part (e.g., a flange 1092) that at least partially surrounds and/or encloses the display 1090*a* and the input device 1090*b* and defines the side surface 1010.

Figure 10D:
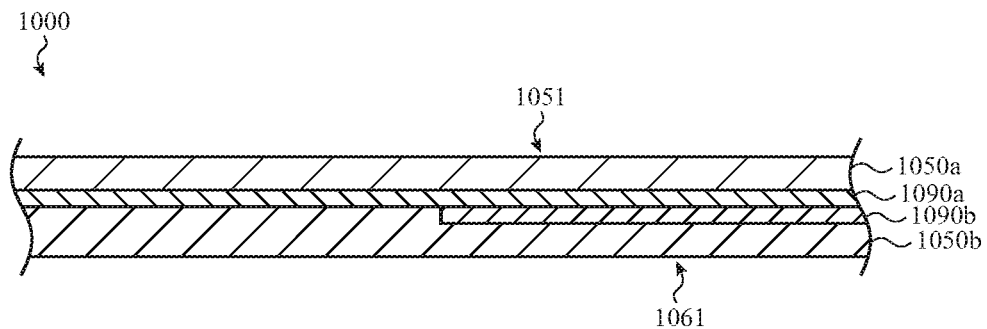

FIG. 10D illustrates a partial cross-section view of a region of the electronic device 1000 that includes the side surface 1010. FIG. 10D illustrates an example structure of the electronic device 1000 in which the input device 1090*b* partially overlaps with the display 1090*a*. In various embodiments that include multiple devices (e.g., a display and an input device), the devices may completely or substantially overlap, partially overlap, or not overlap at all. For example, a display may occupy a smaller region than a touch region defined by an input device, a fingerprint sensor may occupy a smaller region than a touch region defined by an input device, and the like.

The display 1090*a* and the input device 1090*b* are example devices that may be arranged relative to the housing member layers 1050*a*, *b* as shown in FIGS. 10A-10D. Other devices, layers and/or components may be included instead or in addition to the display 1090*a* and/or the input device 1090*b*. For example, the electronic device 1000 may include biometric sensors, output devices, charging components, data transfer components, and the like that are arranged similarly to the display 1090*a* and/or the input device 1090*b*.

Figure 10E:
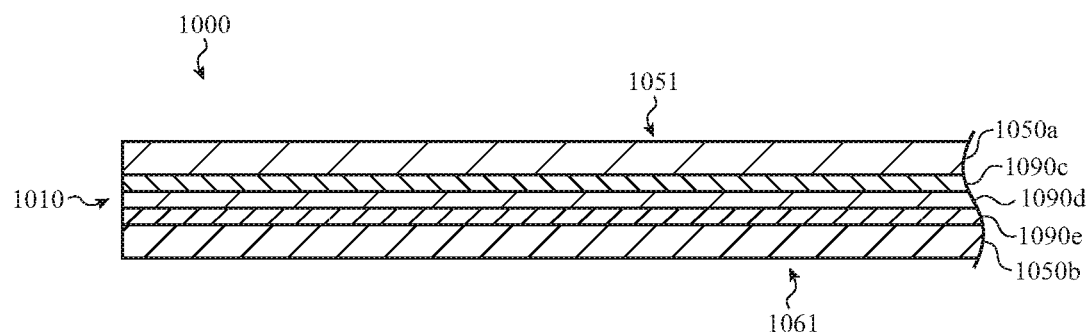

In various embodiments, multiple functional components of an electronic device (e.g., housing member layers, circuit boards, input devices, display components, keyboard or keypad substrates, and the like) may be layered in such a way that the peripheral sides of these components cooperate to define the side surfaces of the housing member of the electronic device. For example, FIG. 10E illustrates a partial cross-section view of a region of the electronic device 1000 that has three layers between the housing member layers 1050*a* and 1050*b*. The electronic device 1000 includes layers 1090*c*, 1090*d*, and 1090*e* that may be any combination of housing member layers, circuit boards, input devices, display components, keyboard or keypad substrates, and the like. In one embodiment, the layers 1090*c*, 1090*d*, and/or 1090*e* may include one or more haptic devices configured to provide a haptic output at a surface of the electronic device. For example, the electronic device may include a haptic actuator, such as a piezoelectric actuator, attached to or otherwise coupled to the a housing member layer 1050. The haptic actuator may cause a localized deflection in one or more housing member layers that corresponds to a haptic output provided at the surface of the device.

The multi-layered construction technique may have several advantages. For example, the laminate structure may be strong and stiff, thereby producing a robust and durable electronic device. Further, as the functional components also form the physical structure of the housing member, additional shells, covers, frames, or other conventional housing components may be omitted. Also, complex geometries can be formed without machining or other material removal operations by effectively building the geometries one layer at a time. Finally, the layered or laminate-style construction may result in a side surface in which each individual layer is visually distinct, producing visually appealing appearance to the device. In FIGS. 10A-10E, the electronic device 1000 is shown as having two and three layers between the housing member layers 1050*a* and 1050*b*, which are examples and not meant to be limiting. In various embodiments, the electronic device 1000 may have any suitable number of layers.

The examples of FIGS. 6-10 are similar to views indicated by section line A-A of FIG. 1A for purposes of illustration, but are generally applicable to any suitable portions of the electronic devices described herein, including, for example, suitable locations within the lower portion(s), transition portion(s) and upper portion(s) of the electronic devices described herein. For example, the display and input device may be used to form a touchscreen-style keyboard in a lower portion of an electronic device. As another example, an input device and a charging device may be used to define a combined input and charging area on a lower portion of an electronic device. Additionally, the examples of arrangements shown and described with respect FIGS. 6-10 may be combined with other examples shown in FIGS. 6-10 and their equivalents. Further, the arrangements described with respect to FIGS. 6-10 are applicable to electronic devices that include any suitable number of housing member layers and/or device components.

While the partial cross-sections shown in FIGS. 6-10 are viewed at one particular location on a housing member, these cross-sections may be representative of substantially an entire peripheral region of the device. For example, because the components forming the side surface of the device are layers that may extend to the perimeter of the device (e.g., they extend edge-to-edge), the same cross-section may exist at all (or most) locations around the periphery of the device. In some cases, the side surface may have openings formed therein, such as for speakers, microphones, charging ports, electrical/communication connectors (e.g., universal serial bus (USB) ports), heat sinks, cooling fans, disk drives, or other devices. In such cases, the cross-sections in those areas may differ from those shown herein, and the seams between layers may be broken or discontinuous at the openings. Apart from these discontinuities, the layered appearance and construction (e.g., the same, the side surfaces of each layer, etc.) may extend around substantially the entire periphery of the device. In some cases, the seams and/or sides of the layers extend around more than 80%, more than 90%, or more than 95% of the periphery of the device.

Where a device includes openings in a side surface, the openings may be integrally formed with one or more layers of the housing member. For example, a layer may include an opening or gap along a segment of the layer that otherwise forms a portion of the side of the housing member. The opening may be aligned with a component (e.g., a charging port, speaker, etc.) to facilitate the function of the component. In some cases, the opening may define a serpentine pattern through the layer. For example, a speaker or microphone opening (or pressure relief opening) may not be defined by a single linear opening extending perpendicularly through the layer. Rather, the opening may be defined by a first aperture opening to the exterior of the housing member, a second aperture offset from the first aperture and opening to the interior cavity of the housing member, and a channel through the material of the layer and connecting the first and second apertures along a path that is not perpendicular to the exterior surface. In this way, a path from the outside of the device to the inside of the device may be formed without visually or otherwise directly exposing an internal component through an opening in the housing.

Figure 11A:
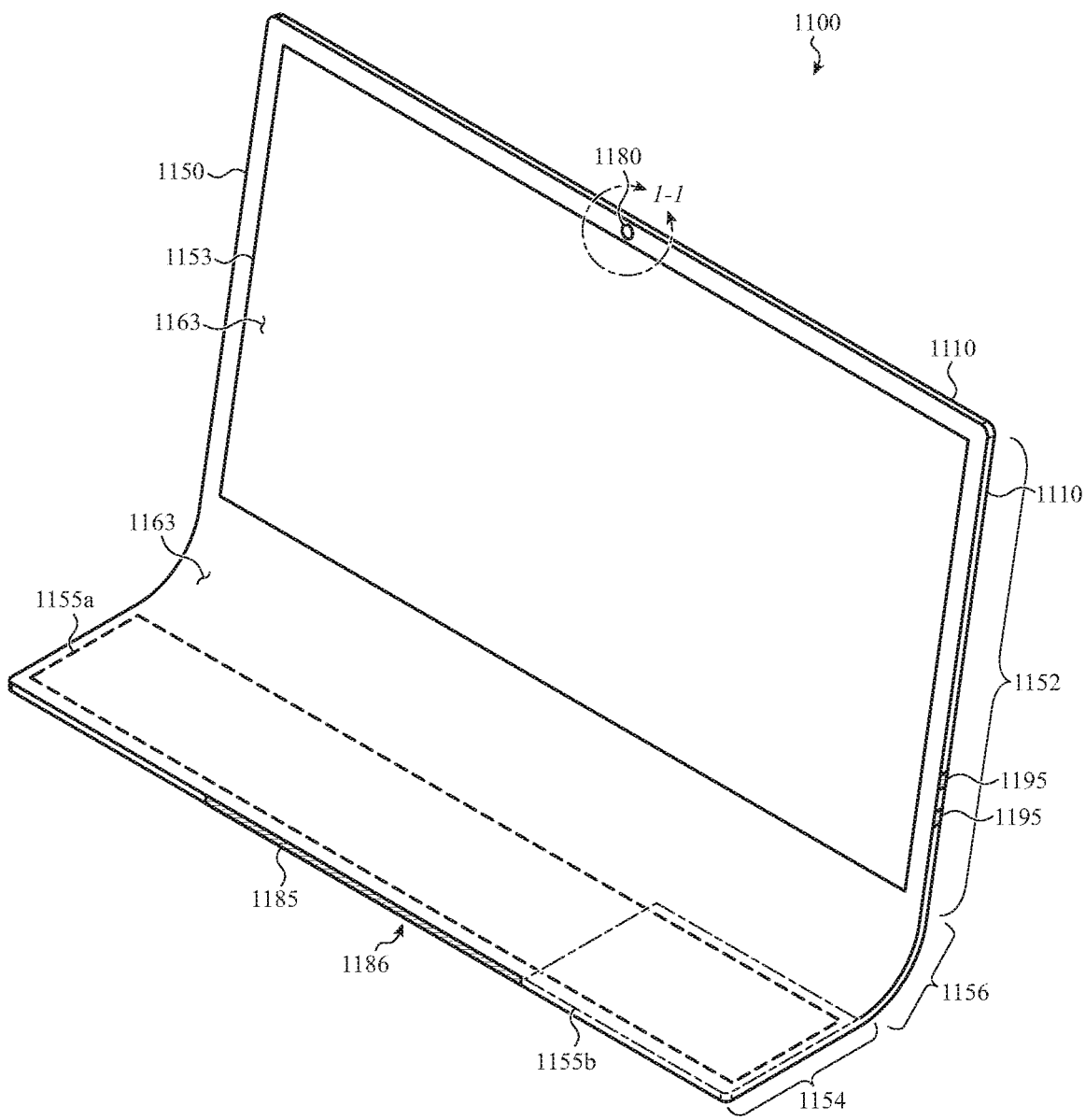
FIGS. 11A-11E illustrate an example electronic device.

FIG. 11A illustrates an example electronic device 1100. The electronic device 1100 may include the same or similar components and functionality as other electronic devices discussed herein (e.g., electronic devices 100, 300, 400, 500, 600, 700, 800, 900, 1000). The electronic device 1100 includes a glass housing member 1150 similar to those described herein (e.g., housing member 150). In some embodiments, the glass housing member 1150 is formed from a glass sheet. The glass housing member 1150 may be formed by molding all or a portion of a glass sheet, for example using a slumping process. The glass housing member 1150 includes an upper portion 1152, a lower portion 1154, and a transition portion 1156. The upper portion 1152, the lower portion 1154, and the transition portion 1156 cooperate to form a single continuous housing member that defines a shared front exterior surface 1151 of the glass housing member 1150. For example, as shown in FIG. 11A, the upper portion 1152 and the lower portion 1154 may be substantially planar (e.g., defining a planar surface). The transition portion 1156 may join the upper portion 1152 and the lower portion 1154 and may define a continuous, curved region of the exterior surface between the upper portion and the lower portion.

In some embodiments, the glass housing member 1150 defines a display area 1153 and a corresponding display 1163. In some embodiments, one or more additional areas (e.g., an input area) may partially or completely overlap with the display area 1153.

In some embodiments, the glass housing member 1150, and in particular, the lower portion 1154, defines an input area 1155a and an additional area 1155b. As shown in FIG. 11A, the input area 1155a and the additional area 1155b may partially or completely overlap. As described above, in various embodiments, the additional area may provide various functionality, including receiving inputs, device charging, data transfer, biometric sensing, providing outputs, and/or other device functionality.

In some embodiments, the area 1155b includes a device charging area configured to charge one or more devices. The electronic device 1100 may include components for providing charging functionality, including a wireless charger, inductive coils, and/or other wireless or wired charging hardware, which may be integrated with or otherwise coupled to the device charging area. The components for providing charging functionality may be integrated with and/or coupled to the housing member 1150 in the same or similar manner as the displays and input devices discussed above with respect to FIGS. 6-10. The component(s) in the device charging area may use wireless charging (e.g., inductive charging) to charge one or more devices wirelessly. For example, the electronic device 1100 may be configured to wirelessly charge a device placed on or near the surface at least partially within the device charging area. A wireless charger may be configured to transfer power to an exterior device (e.g., a smartphone, a music player, or the like), or receive power from an exterior source (e.g., a charger that is coupled to a power source, a portable battery, etc.).

In some embodiments, the area 1155b includes a data transfer area configured to facilitate data transfer between the electronic device 1100 and one or more additional devices. The electronic device 1100 may include components for providing data transfer functionality, which may be integrated with or otherwise coupled to the data transfer area. The components for providing data transfer functionality may be integrated with and/or coupled to the housing member 1150 in the same or similar manner as the displays and input devices discussed above with respect to FIGS. 6-10. For example, the data transfer components may facilitate unidirectional and/or bidirectional wireless data transfer between an auxiliary device and the electronic device 1100 placed on or near the surface at least partially within the data transfer area.

In some embodiments, the area 1155b includes a biometric sensing area for performing biometric sensing, such as capturing or detecting user biometrics. The electronic device 1100 may include components, including biometric sensors, for performing biometric sensing. For example, a biometric sensor may be configured to detect biometric information about the user at the biometric sensing area. For example, the biometric sensors may detect fingerprints, palm- or wrist-prints, detect a user's heart rate, blood oxygenation levels, temperature, and the like. Such information may be used for authentication purposes, to determine the user's hand position relative to the device, and/or to record health data for the user to track. As noted, the biometric sensors may use any suitable sensing techniques, such as optical sensors (e.g., photoplethysmographs, cameras, etc.), capacitive sensors, or the like. The biometric sensors may also include facial-recognition sensors, which may include cameras, lenses, projectors (e.g., microdot projectors), infrared sensors, and the like, to provide facial recognition functionality. The biometric sensors may also include fingerprint sensors. The fingerprint sensor may detect a user's fingerprint to authenticate the user to the device. The fingerprint sensor may use any suitable sensing technology, including optical, capacitive, inductive, ultrasonic and/or acoustic, or the like. The components for providing biometric sensing functionality may be integrated with and/or coupled to the housing member 1150 in the same or similar manner as the displays and input devices discussed above with respect to FIGS. 6-10.

In various embodiments, an exterior surface of the electronic device may have different properties than other portions of the exterior surface, such as the housing member. For example, the exterior surface in an area (e.g., a display area, an input area, and the like) may possess different optical, physical, material, tactile or other properties that are consistent with the functionality provided at the function area. For example, the exterior surface in the input area 1155a may include material properties consistent with providing inputs, including a different color, appearance, smoothness, friction coefficient, or the like. As another example, the exterior surface in the display area 1153 may include material properties consistent with providing visual outputs, including increased transparency or the like. In some embodiments, an area may be associated with a graphic, border, or other visual indicator of its location, allowing users to easily and quickly locate the components.

Figure 11B:
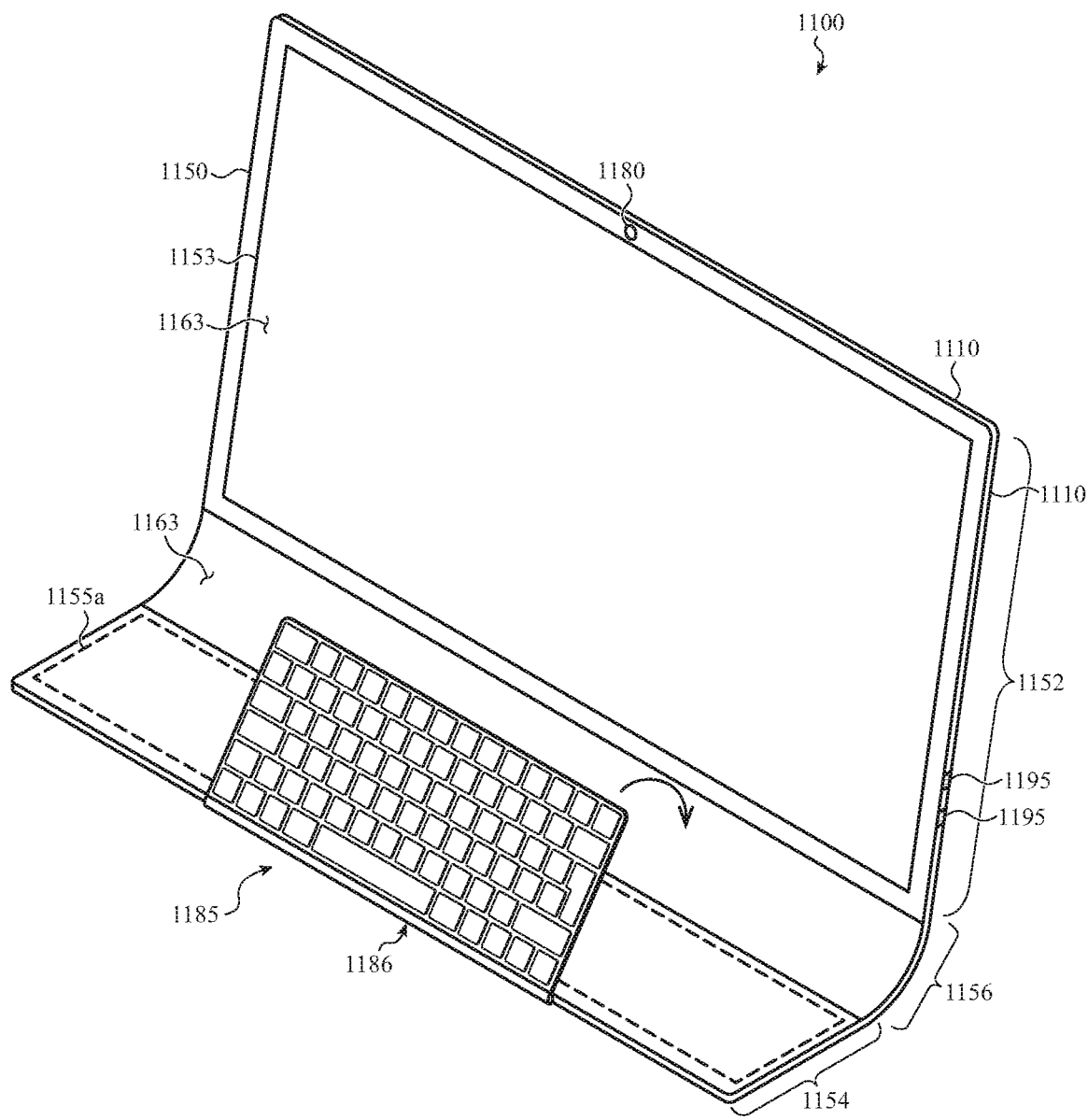

In some embodiments, the electronic device 1100 includes an input device (e.g., a keyboard 1185). The keyboard 1185 or other input device(s) may be configured to transition between a storage configuration in which the keyboard is at least partially hidden, retracted, or the like, and a use configuration in which the keyboard is positioned for use by a user. FIG. 11A shows the keyboard 1185 in a storage configuration in which the keyboard 1185 is positioned within an opening 1186 that is at least partially surrounded by the glass housing member 1150. FIG. 11B shows the keyboard 1185 transitioning to a use configuration in which the keyboard is positioned on or above the lower portion 1154 and is extended out of the opening 1186. The keyboard 1185 may be configured to slide out of the opening 1186 as part of the transition from the storage configuration to the use configuration, and slide into the opening 1186 as part of the transition from the use configuration to the storage configuration.

In various embodiments, the keyboard 1185 may be attached or otherwise coupled to the electronic device 1100 in the use configuration and/or the storage configuration. For example, the keyboard 1185 may be rotatably coupled to the electronic device 1100 such that the keyboard 1185 may slide out of the opening 1186 and flip onto the lower portion 1154 as part of the transition from the use configuration to the storage configuration and flip in front of the electronic device 1100 as shown in FIG. 11B. The keyboard 1185 may flip back down and slide into the opening 1186 as part of the transition from the use configuration to the storage configuration.

The keyboard 1185 may be operably coupled to the electronic device 1100 in a variety of ways, including a wired and/or wireless connection. The electronic device 1100 may be configured to receive inputs at the keyboard 1185. In some embodiments, the keyboard 1185 interacts with an input device of the electronic device 1100. In some embodiments, the keyboard 1185 may transmit inputs to the electronic device 1100 through an input device such as a touch input area. In some embodiments, the keyboard 1185 presents a set of mechanical keys and/or key mechanisms that contact or otherwise cause an input to be registered by a touch input device in response to an actuation of a key of the keyboard (e.g., when a user presses the key or the key is otherwise actuated). The electronic device 1100 may be configured to detect that the keyboard 1185 is in a use configuration such that inputs received at the input device are recognized as being provided through the keyboard 1185.

In some embodiments, the keyboard 1185 may be configured to detach from the electronic device 1100 such that it may be placed separately from the electronic device. For example, the keyboard 1185 may be releasably coupled to the housing member 1150. In various embodiments, the keyboard 1185 remains operably coupled to the electronic device 1100 when it is detached.

Figure 11C:
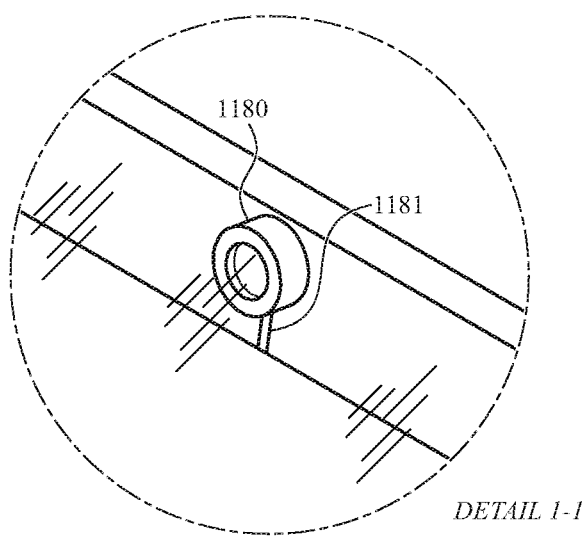

In some embodiments, as discussed above, the electronic device 1100 may include one or more cameras, such as camera 1180. FIG. 11C shows an enlarged view of area 1-1 of FIG. 11A, including the camera 1180 and a camera trace 1181. In various embodiments, the camera 1180 may be operably connected to one or more components of the electronic device 1100 by the camera trace 1181. The camera trace 1181 may carry signals from the camera to additional components of the device. For example, the camera trace 1181 may carry an image signal to a processing unit of the electronic device 1100. The camera trace 1181 may additionally receive signals from other components of the electronic device 1100. For example, the camera trace 1181 may carry signals from the processing unit of the electronic device to the camera 1180 to instruct the camera to capture image data. In some embodiments, the camera trace 1181 provides power to the camera 1180, for example from a power source of the device 1100. In some embodiments, the camera trace operably couples the camera 1180 with one or more components of the electronic device 1100, such as a display, an input device, or the like. In some embodiments, the camera 1180 receives power from one or more components of the electronic device 1100, such as the display 1163. In some embodiments, the camera 1180 communicates with a processing unit of the electronic device 1100 through a component of the electronic device 1100. For example, the camera 1180 may be coupled to the display 1163 by the trace 1181, and the display 1163 may be operably coupled to the processing unit, by an electrical connector (e.g., an additional trace), thereby operably coupling the processing unit to the camera 1180.

In some embodiments, the camera trace 1181 may be positioned at least partially within the glass housing member 1150, such as between layers of the glass housing member 1150 and/or within a channel defined in the glass housing member 1150. In some embodiments, the camera trace 1181 is at least partially positioned outside the glass housing member 1150, such as along an exterior surface of the glass housing member 1150. In some embodiments, the camera trace 1181 is positioned some combination of within the glass housing member 1150 and outside the glass housing member 1150. In various embodiments, the camera trace 1181 may be transparent, translucent, or opaque. For example, the camera trace 1181 may include an ITO/Silver nanowire or similar in a transparent implementation and a copper or other conductive metal wire or ribbon for opaque implementation. In some embodiments, some or all of the camera trace 1181 may be obscured from view by one or more components of the electronic device 1100. For example, all or a portion of the camera trace 1181 may pass behind the display 1163 such that it is not visible to a user of the device.

Figure 11D:
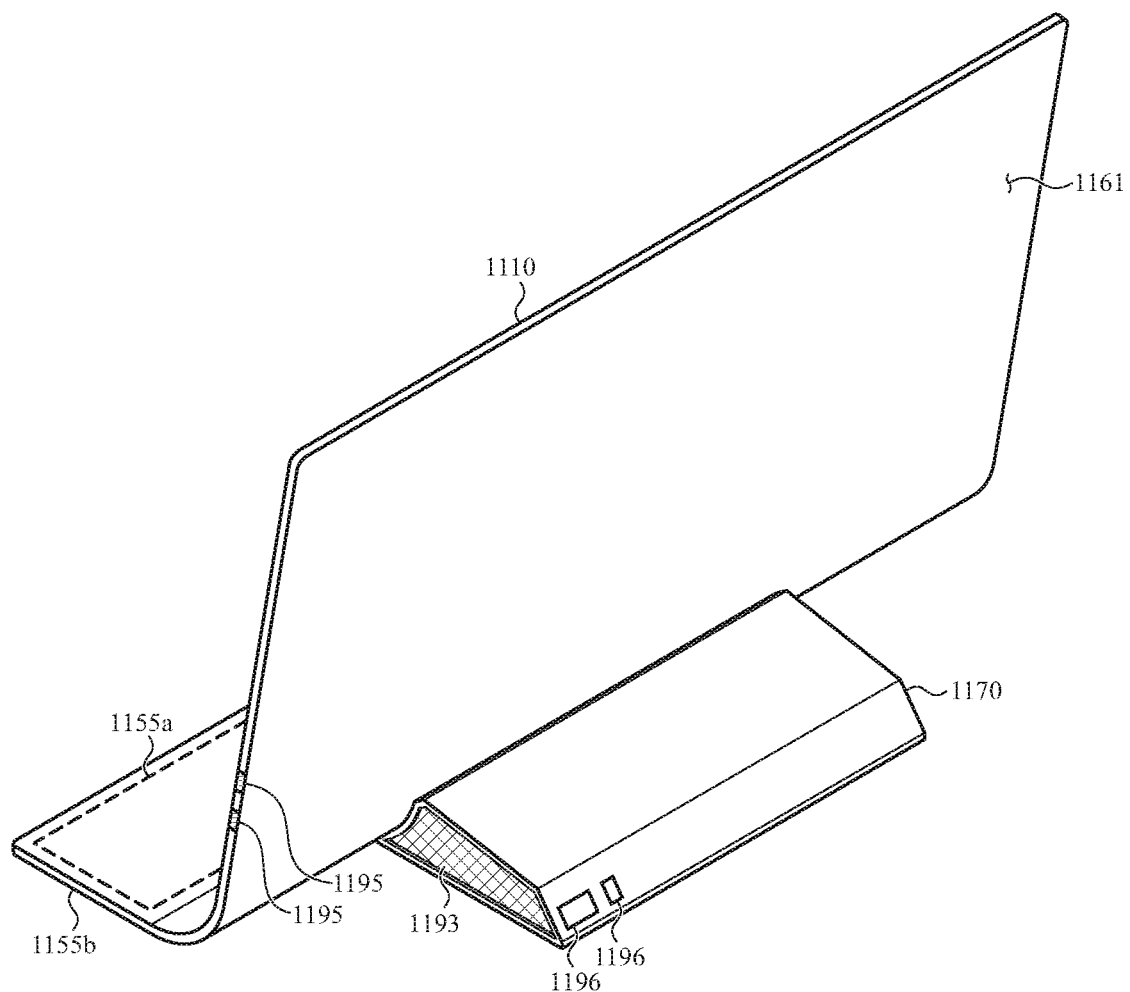

FIG. 11D illustrates a rear perspective view of the electronic device 1100. As discussed above, the electronic device defines a rear surface 1161 opposite the front exterior surface 1151 and includes a support structure 1170. In various embodiments, the portions of the glass housing member 1150 may cooperate to form a single continuous housing member with a shared rear surface 1161. In some embodiments, the electronic device 100 further includes one or more side surfaces 1110 between the front exterior surface 1151 and the rear surface 1161. In various embodiments, the glass housing member 1150 and/or the support structure 1170 house, carry, or are otherwise coupled to the various components of the electronic device 1100. For example, a processing unit of the electronic device 100 may be positioned within the support structure 1170.

The electronic device 1100 may include one or more speakers for providing audio output. In various embodiments, one or more speakers 1193 may be positioned within the support structure 1170 and configured to provide audio output. The speakers may be any suitable type of audio output device. In various embodiments, the speakers receive signals from other components of the electronic device 1100, such as a processing unit, and provide audio outputs in response to receiving the signals.

In various embodiments, the electronic device 1100 includes one or more openings to allow access to interior components of the electronic device. The glass housing member 1150 may include one or more openings 1195 in the sidewalls (e.g., the side surfaces 1110) to allow access to interior components of the device. Similarly, the support structure 1170 may include one or more openings 1196 to allow access to interior components of the device. For example, an electronic device 1100 device may include connectors (e.g., for charging, communications, and the like), and the side surfaces 1110 and/or the support structure 1170 may include openings 1195, 1196 to allow cables or other components to connect to the connectors. Example connectors include universal serial bus (USB) connectors, card readers, power cable connectors, and the like. The opening(s) may have other functions or be associated with other components as well. For example, an opening may correspond to a disk drive to allow a disk (e.g., a DVD or CD) to be inserted into the drive, or an opening may be used for a fastener (e.g., a screw, bolt, etc.) to secure the housing member to another component, such as the support structure 1170.

Openings may be formed in the electronic device 1100 in any suitable way. For example, openings may be machined, laser cut, plasma cut, sawed, chemically etched, or the like. Openings may also be formed into the glass housing member 1150 during a molding process, thus reducing or eliminating the need to form the openings after the glass housing member 1150 is formed and hardened.

Figure 11E:
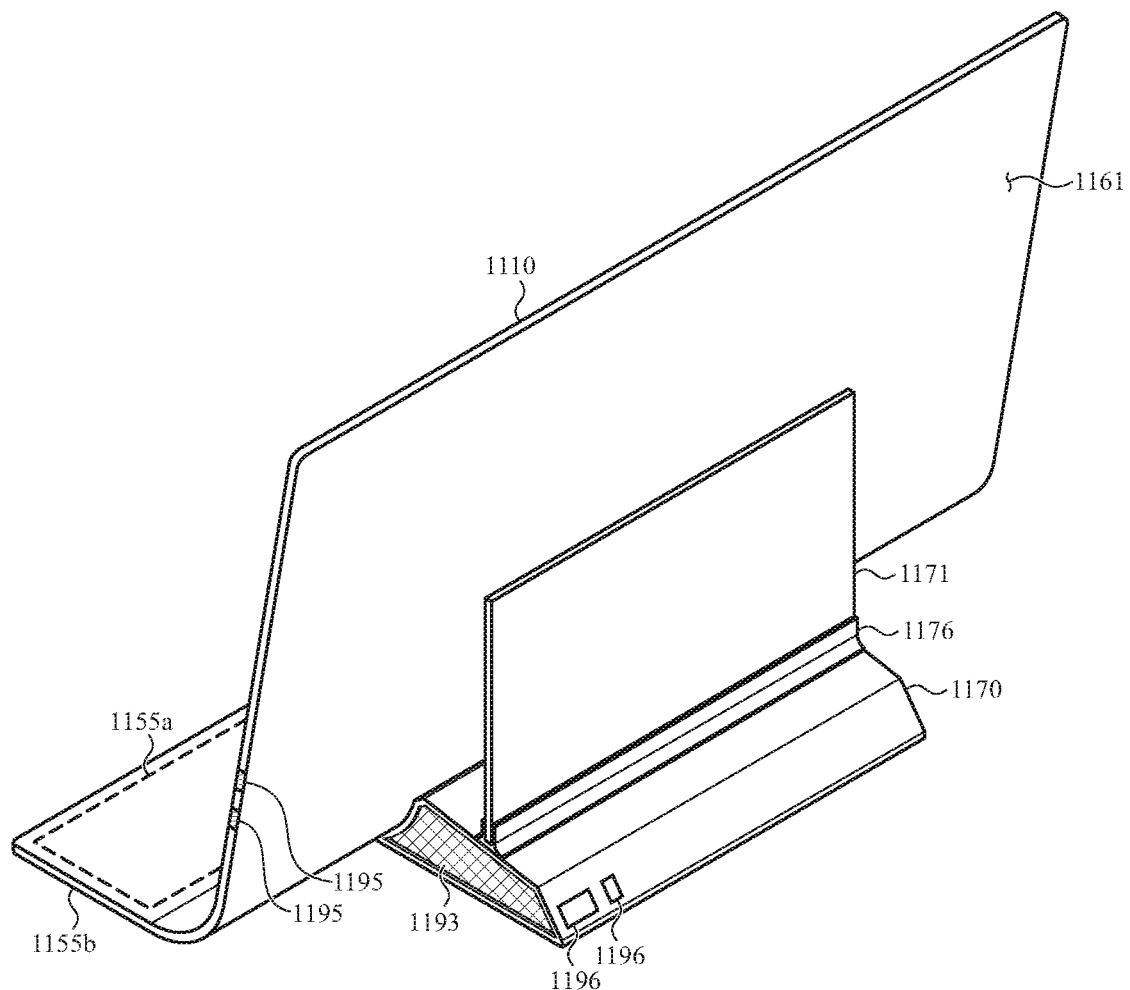

In various embodiments, the electronic device 1100 may provide functionality for connecting to an additional electronic device. FIG. 11E illustrates a rear perspective view of the electronic device 1100, in which the electronic device 1100 is coupled to an additional electronic device 1171. The additional electronic device 1171 may be substantially any computing device capable of coupling (e.g., physically and/or operably) with the electronic device 1100. Example additional electronic devices 1171 include, but are not limited to, a personal computer, a notebook or laptop computer, a tablet, a smart phone, a watch, a case for an electronic device, a home automation device, and so on.

In some embodiments, the additional electronic device 1171 may direct one or more operations at the electronic device 1100. For example, a processing unit of the additional electronic device 1171 may control some or all of the operations of the electronic device 1100, either instead of or in addition to a processing unit positioned in the electronic device 1100. For example, the processing unit of the additional electronic device 1171 may be operably coupled to one or more displays, input devices, output devices, and the like of the electronic device 1100 and configured to provide functionality associated with the coupled devices (e.g., providing a graphical output on a display, receiving inputs from an input device). In some embodiments, the electronic device 1100 does not include a processing unit and a processing unit of the additional electronic device 1171 controls the operations of the electronic device 1100.

The electronic device 1100 and the additional electronic device 1171 may be operably coupled via one or more wireless and/or wired connections. For example, the electronic device 1100 may be paired with the additional electronic device 1171 using one or more connectors, ports, or the like. As another example, the electronic device 1100 may be paired with the additional electronic device 1171 using a short range wireless interconnection; however, other wireless connection techniques and protocols may be used.

In some embodiments, the electronic device 1100 includes a docking interface for physically and/or operably coupling the electronic device 1100 and the additional electronic device 1171. For example, as shown in FIG. 11E, the electronic device 1100 may include a docking interface 1176 for receiving one or more additional electronic devices 1171. In some embodiments, the docking interface 1176 operably couples (e.g., by a wireless connection, a wired connection, or the like) the electronic device 1100 to the additional electronic device 1171 to enable and/or facilitate data transfer, charging, or other inter-device communications.

In some embodiments, the docking interface 1176 is connected to the support structure 1170, but other positions are envisioned. For example, the docking interface may be connected to and/or positioned on the housing member 1150. The docking interface 1176 may physically support the additional electronic device 1171. For example, as shown in FIG. 11E, the docking interface 1176 may support the additional electronic device 1171 in a vertical configuration.

Figure 12A:
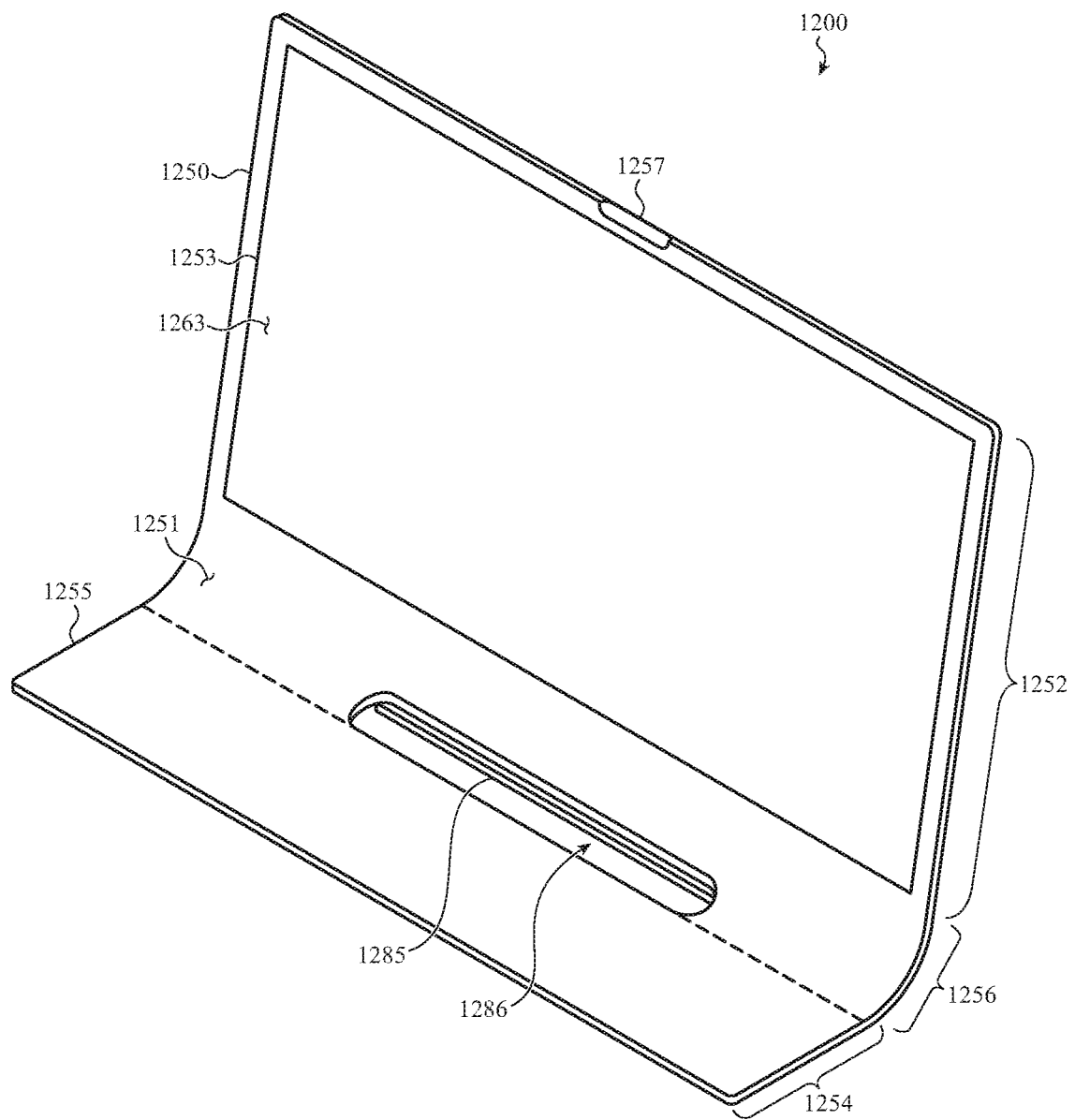
FIGS. 12A-12C illustrate an example electronic device.
Figure 12B:
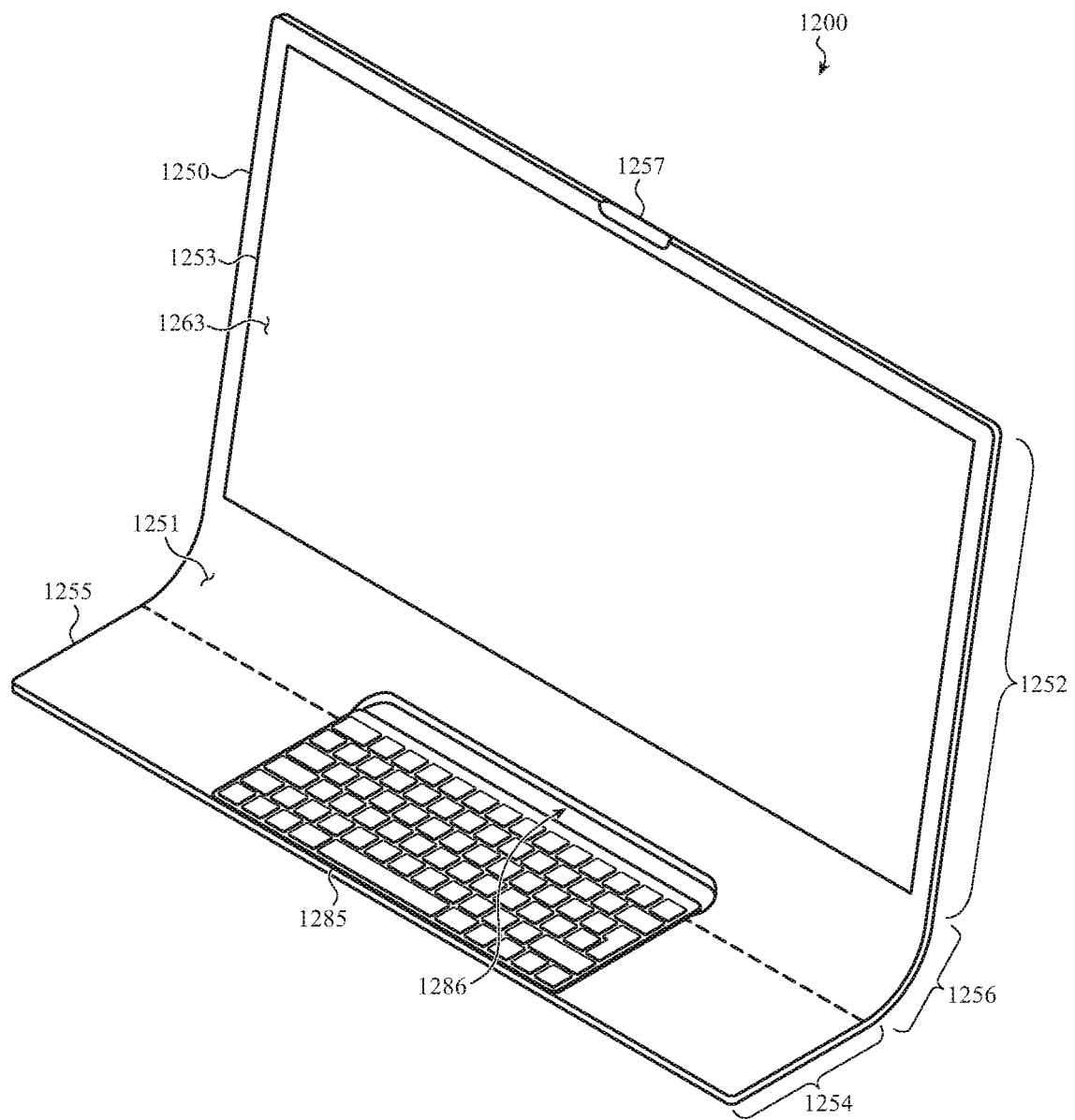
Figure 12C:
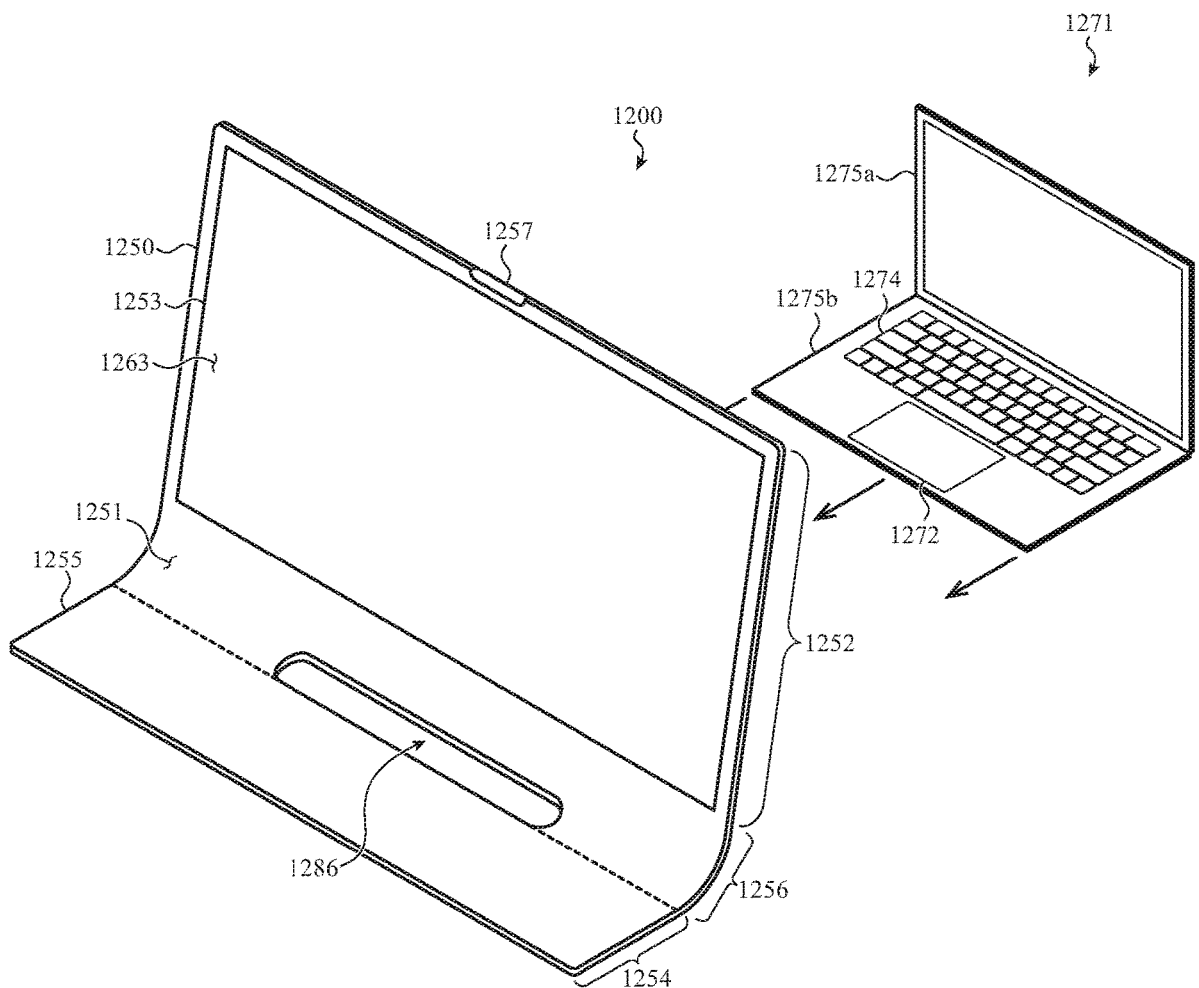

FIGS. 12A-12C illustrate an example electronic device 1200. The electronic device 1200 may include the same or similar components and functionality as other electronic devices discussed herein (e.g., electronic devices 100, 300, 400, 500, 600, 700, 800, 900, 1000, 1100). Turning to FIG. 12A, the electronic device 1200 includes a housing member 1250 similar to those described herein (e.g., housing member 150). The housing member 1250 includes an upper portion 1252, a lower portion 1254, and a transition portion 1256. The upper portion 1252, the lower portion 1254, and the transition portion 1256 cooperate to form a single continuous housing member that defines a shared front exterior surface 1251 of the housing member 1250.

In some embodiments, the housing member 1250 defines a display area 1253 and a corresponding display 1263. In some embodiments, one or more additional areas (e.g., an input area) may partially or completely overlap with the display area 1253. The housing member 1250 may define one or more biometric sensing areas, such as biometric sensing area 1257 defined in the upper portion of the housing member 1250, for performing biometric sensing. The electronic device 1100 may include components, including biometric sensors, for performing biometric sensing, such as capturing or detecting user biometrics. For example, one or more biometric sensors configured to perform sensing at the biometric sensing area 1257 may be configured to detect biometric information about a user. In some embodiments, the biometric sensors include facial-recognition sensors, which may include cameras, lenses, projectors (e.g., microdot projectors), infrared sensors, and the like, to provide facial recognition functionality. In some embodiments, the housing member 1250 defines one or more input areas, such as input area 1255.

The housing member 1250 may further define one or more openings that extend through the housing member 1250. For example, the housing member 1250 may define an opening 1286 as shown in FIG. 12A. The opening 1286 may enable a variety of functions of the electronic device 1200. For example, the opening 1286 may provide access to a support structure (e.g., support structure 170) and/or one or more components disposed in the support structure, such as those discussed above with respect to FIG. 11D. In some embodiments, one or more outputs of the electronic device 1200 pass through the opening 1286. For example, audio produced by speakers that are coupled to a support structure may travel through the opening 1286, which may allow the electronic device 1200 to provide a better audio output to a user of the device versus embodiments without an opening similar to the opening 1286.

As discussed above, in some embodiments, one or more components of the electronic device 1200 may be accessed through the opening 1286. In some embodiments, components and/or accessories (e.g., input devices, output devices, and the like) may extend through the opening 1286. For example, as shown in FIG. 12B, a keyboard 1285 may extend through the opening 1286 for access by a user. As another example, as shown in FIG. 12C, at least a portion of an additional computing device may extend through the opening 1286 for access by a user. The keyboard 1285 or other input device(s) may be configured to transition between a storage configuration in which the keyboard is at least partially hidden, retracted, or the like, and a use configuration in which the keyboard is positioned for use by a user. In some embodiments, the keyboard 1285 may be configured to detach from the electronic device 1200 such that it may be placed separately from the electronic device. In various embodiments, the keyboard 1285 remains operably coupled to the electronic device 1200 when it is detached.

FIG. 12A shows the keyboard 1285 in a storage configuration in which the keyboard 1285 is stored within a support structure (or otherwise positioned behind the opening 1286). The keyboard 1285 may be recessed and/or partially surrounded by a support structure, such as those described herein. FIG. 12B shows the keyboard 1285 in a use configuration in which the keyboard is positioned on or above the lower portion 1254. The keyboard 1285 may be configured to slide out of the opening 1286 as part of the transition from the storage configuration to the use configuration, and slide into the opening 1286 as part of the transition from the use configuration to the storage configuration.

The keyboard 1285 may be operably coupled to the electronic device 1200 in a variety of ways, including a wired and/or wireless connection. The electronic device 1200 may be configured to receive inputs at the keyboard 1285. In some embodiments, the keyboard 1285 interacts with an input device of the electronic device 1200. In some embodiments, the keyboard 1285 may transmit inputs to the electronic device 1200 through an input device such as a touch input area. In some embodiments, the keyboard 1285 presents a set of mechanical keys and/or key mechanisms that contact or otherwise cause an input to be registered by a touch input device in response to an actuation of a key of the keyboard (e.g., when a user presses the key or the key is otherwise actuated). The electronic device 1200 may be configured to detect that the keyboard 1285 is in a use configuration such that inputs received at the input device are recognized as being provided through the keyboard 1285.

FIG. 12C illustrates the example electronic device 1200 and an additional computing device 1271 configured to extend through the opening 1286. As noted above, n some embodiments, the opening 1286 may be configured to receive one or more additional computing devices for access by a user of the electronic device 1200. In the embodiment shown in FIG. 12C, the additional computing device 1271 includes an upper portion 1275a rotatably coupled to a lower portion 1275b. The computing device 1271 may be positioned relative to the electronic device 1200 such that the lower portion 1275b extends through the opening 1286 for access by a user of the electronic device 1200.

The lower portion 1275b of the additional computing device 1271 may include a keyboard 1274, a trackpad 1272, and/or one or more additional input or output devices. In various embodiments, the electronic device 1200 may provide functionality for connecting to the additional electronic device 1271. The additional electronic device 1271 may be substantially any computing device. Example additional electronic devices 1271 include, but are not limited to, a personal computer, a notebook or laptop computer, a tablet, a smart phone, a watch, a case for an electronic device, a home automation device, and so on.

In some embodiments, the additional electronic device 1271 may direct one or more operations at the electronic device 1200. For example, a processing unit of the additional electronic device 1271 may control some or all of the operations of the electronic device 1200, either instead of or in addition to a processing unit positioned in the electronic device 1200. For example, the processing unit of the additional electronic device 1271 may be operably coupled to one or more displays, input devices, output devices, and the like of the electronic device 1200 and configured to provide functionality associated with the coupled devices (e.g., providing a graphical output on a display, receiving inputs from an input device). In some embodiments, the electronic device 1200 does not include a processing unit and a processing unit of the additional electronic device 1271 controls the operations of the electronic device 1200.

The electronic device 1200 and the additional electronic device 1271 may be operably coupled via one or more wireless and/or wired connections. For example, the electronic device 1200 may be paired with the additional electronic device 1271 using one or more connectors, ports, or the like. As another example, the electronic device 1200 may be paired with the additional electronic device 1271 using a short range wireless interconnection; however, other wireless connection techniques and protocols may be used. In some embodiments, the electronic device 1200 includes a docking interface for physically and/or operably coupling the electronic device 1200 and the additional electronic device 1271.

Figure 13A:
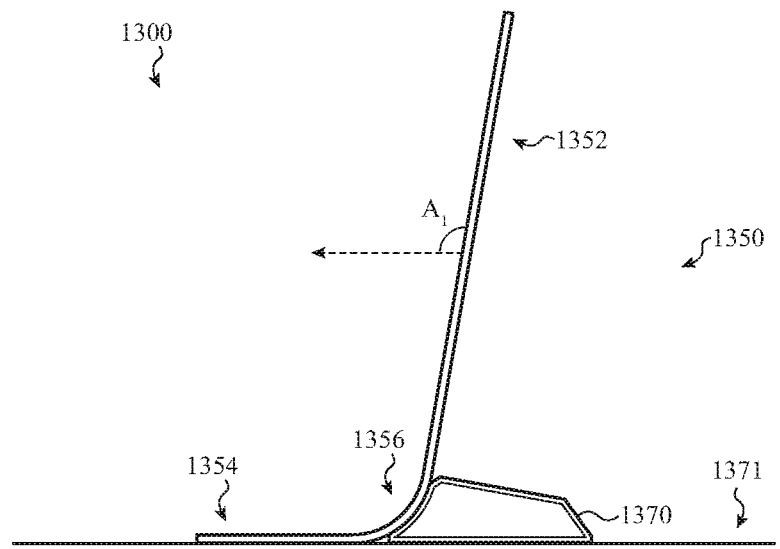
FIG. 13A-13B illustrate an example electronic device in which a housing member is configured to move relative to a support structure.
Figure 13B:
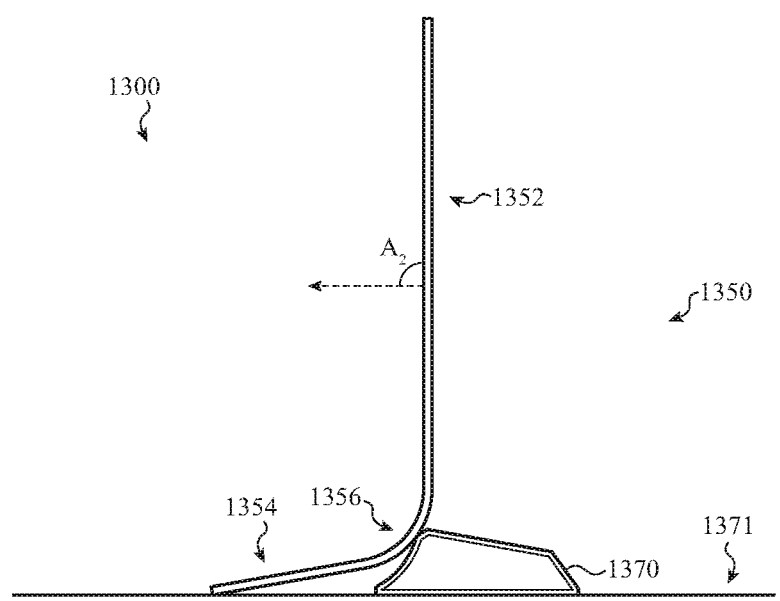

FIG. 13A-13B illustrate an example electronic device 1300 in which a housing member 1350 is configured to move relative to a support structure 1370. The electronic device 1300 may include the same or similar components and functionality as other electronic devices discussed herein (e.g., electronic devices 100, 300, 400, 500, 600, 700, 800, 900, 1000, 1100, 1171, 1200, 1271). In various embodiments, the electronic device 1300 includes a housing member 1350 and a support structure 1370. The housing member 1350 includes an upper portion 1352, a lower portion 1354, and a transition portion 1356. In some embodiments, the upper portion 1352 includes a display.

As discussed above with respect to FIG. 1, in some cases, the support structure 1370 supports the electronic device 1300. For example, in an operating configuration of the electronic device 1300, the electronic device may be positioned on a support surface 1371, such as a table, desk, or other surface. The support structure 1370 may contact the support surface 1371 to at least partially support the electronic device 1300. The support structure 1370 may cooperate with one or more additional components of the electronic device 1300 to provide support (e.g., to maintain the electronic device 100 in an upright position). For example in some cases, the support structure 1370 cooperates with the housing member 1350 to provide support. In various embodiments, the support structure 1370, the housing member 1350, or both may contact a support surface 1371 to support the electronic device 1300.

In some embodiments, the housing member 1350 is configured to move relative to the support structure 1370 to change an angle of one or more portions of the electronic device 1300. For example, the housing member 1350 (e.g., the transition portion 1356 of the housing member 1350) may be movably coupled to the support structure 1370 such that the housing member 1350 may move relative to the support structure 1370. In a first configuration shown in FIG. 13A, the upper portion 1352 that includes a display may have a first display angle A1, and in a second configuration shown in FIG. 13B, the upper portion 1352 may have a second display angle A2 different from the first display angle A1. The housing member 1350 may be configured to move continuously relative to the support structure 1370, for example between the first configuration and the second configuration, to provide a continuous range of different display angles. The ability to change between different display angles may allow a user to find an optimal viewing angle for the display.

As discussed above, in some embodiments, the housing member 1350 is rigid such that the portions do not move relative to one another under normal operating conditions and forces. As such, when the display angle changes, an input angle of the lower portion 1354 relative to a support surface 1371 may change. In some embodiments, an angular difference between a first display angle in a first configuration and a second display angle in a second configuration is equal to the angular difference between the first input angle in the first configuration and the second input angle in the second configuration. For example, in FIG. 13A, the lower portion 1354 may be substantially parallel to a support surface. In FIG. 13B, the lower portion 1354 may be offset from parallel to the support surface by an amount equal to the change in the display angle.

Figure 14A:
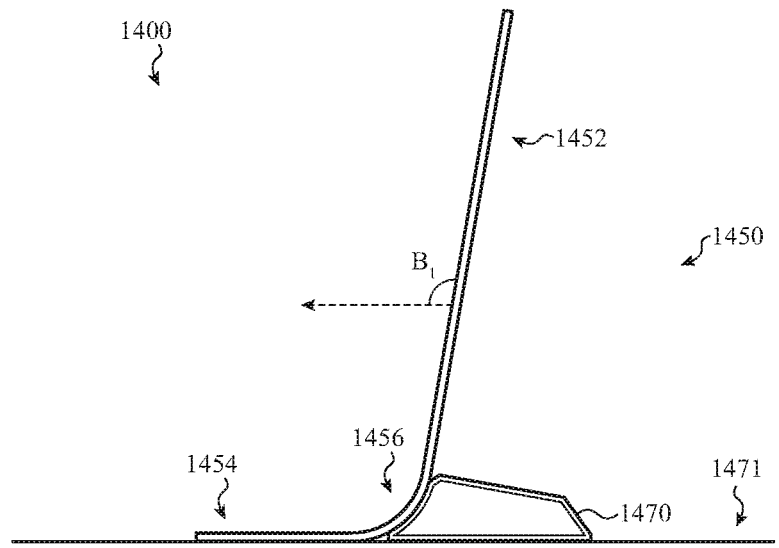
FIG. 14A-14B illustrate an example electronic device in which at least a portion of a housing member is configured to move relative to a support structure.
Figure 14B:
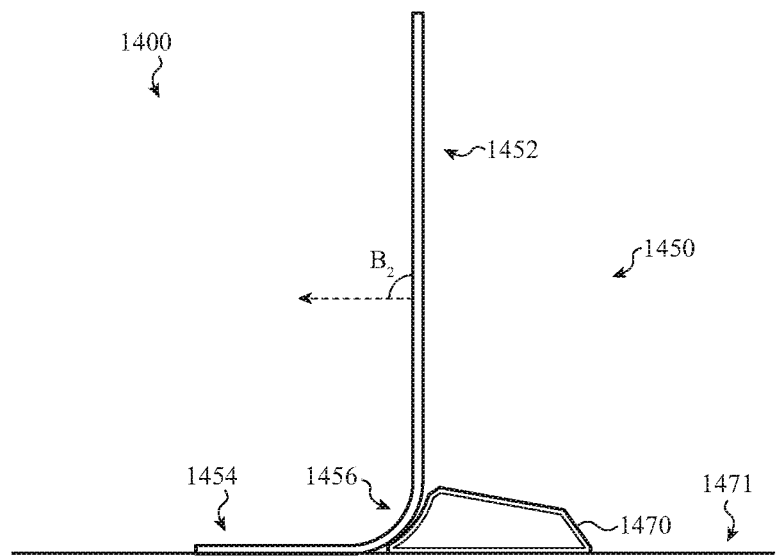

FIG. 14A-14B illustrate an example electronic device 1400 in which at least a portion of a housing member 1450 is configured to move relative to a support structure 1470. The electronic device 1400 may include the same or similar components and functionality as other electronic devices discussed herein (e.g., electronic devices 100, 300, 400, 500, 600, 700, 800, 900, 1000, 1100, 1171, 1200, 1271, 1300). In various embodiments, the electronic device 1400 includes a housing member 1450 and a support structure 1470. The housing member 1450 includes an upper portion 1452, a lower portion 1454, and a transition portion 1456. The upper portion 1452 may include a display.

In various embodiments, the one or more flexible portions of the housing member 1450 may be formed from any suitable materials, including ceramics, polymers, metals, and the like. In some embodiments, the flexibility of the housing member 1450 is enabled by one or more hinges or rotatable mechanisms. In some embodiments, a mechanism attached to the housing member and/or the support structure may maintain the desired angle.

Figure 15A:
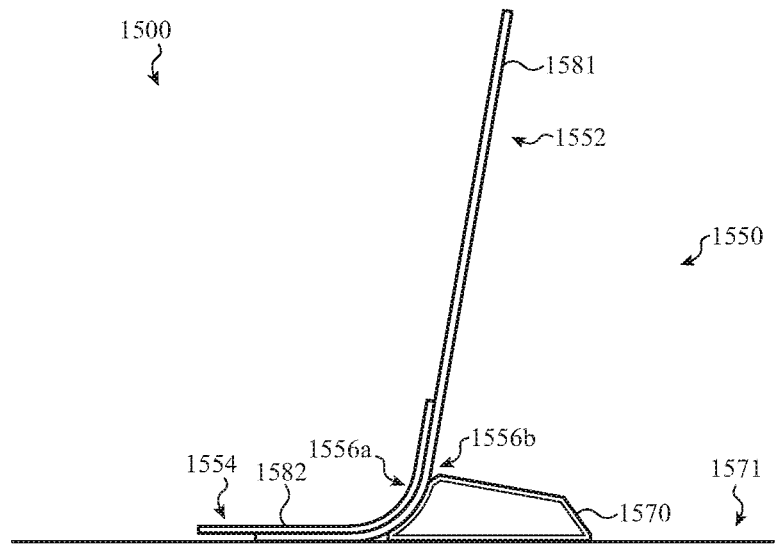
FIGS. 15A-15B illustrate an example electronic device in which a height of an upper portion of a housing member is adjustable.
Figure 15B:
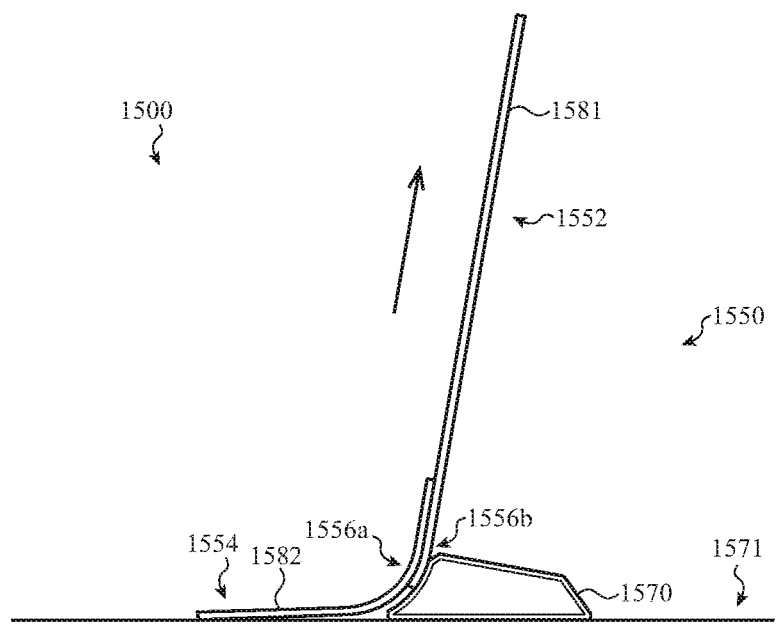

FIGS. 15A-15B illustrate an example electronic device 1500 in which a height of an upper portion 1552 of a housing member 1550 is adjustable. The electronic device 1500 may include the same or similar components and functionality as other electronic devices discussed herein (e.g., electronic devices 100, 300, 400, 500, 600, 700, 800, 900, 1000, 1100, 1171, 1200, 1271, 1300, 1400). In various embodiments, the electronic device 1500 includes a housing member 1550 and a support structure 1570. The housing member 1550 includes an upper portion 1552, a lower portion 1554, and a transition portion 1556. The upper portion 1552 may include a display. In some embodiments, the housing member 1550 includes multiple housing member components, such as an upper component 1581 and a lower component 1582. In the embodiment of FIGS. 15A-15B, the upper component 1581 forms the upper portion 1552, the lower component forms the lower portion, and the upper component 1581 and the lower component 1582 cooperate to form the transition portion 1556.

In some embodiments, the upper component 1581 is configured to move relative to the lower component 1582. For example, as shown in FIGS. 15A-15B, the upper component 1581 may move upward to change a height of the upper portion 1552. In various embodiments, changing the height may adjust a display height of a display, expand a display, adjust other areas (e.g., input areas), or some combination thereof. For example, in a first configuration shown in FIG. 15A, the upper portion 1552 may have a first height (e.g., a first display height). In a second configuration shown in FIG. 15B, the upper portion 1552 may have a second height (e.g., a second display height). The upper component 1581 may be configured to move continuously relative to the support structure 1570 and/or the lower component 1582, for example between the first configuration and the second configuration, to provide a continuous range of different display heights. The ability to change between different display heights may allow a user to find an optimal viewing height for the display.

In some embodiments, at least a portion of the housing member 1550 is flexible. For example, the upper component 1581 may be flexible and may conform to the lower component 1582 and/or the support structure 1570 as the upper component moves relative to the lower component and/or the support structure. As shown in FIG. 15A, the upper component 1581 may extend under the lower component 1582 in retracted configurations. In various embodiments, the one or more flexible portions of the housing member 1550 may be formed from any suitable materials, including ceramics, polymers, metals, and the like. In some embodiments, the flexibility of the housing member 1550 is enabled by one or more hinges or rotatable mechanisms. In some embodiments, a mechanism attached to the housing member and/or the support structure may maintain the desired display height.

Figure 16:
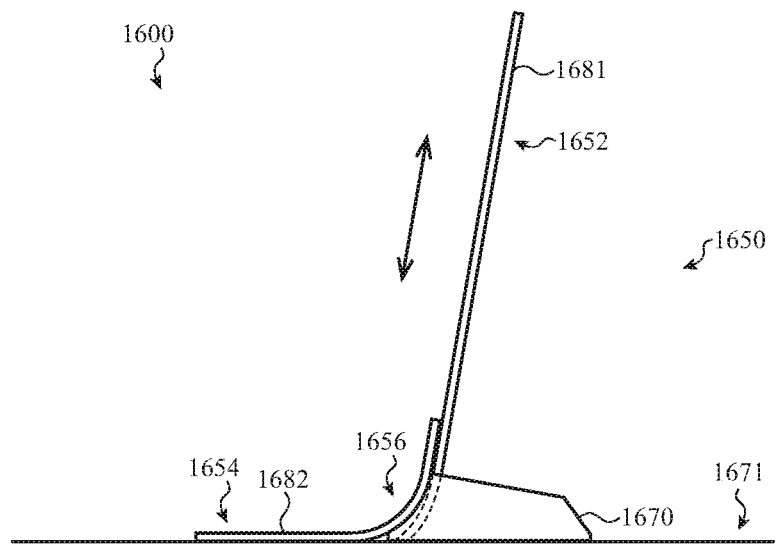
FIG. 16 illustrates an example electronic device in which a height of an upper portion of a housing member is adjustable.

FIG. 16 illustrates an example electronic device 1600 in which a height of an upper portion 1652 of a housing member 1650 is adjustable. The electronic device 1600 may include the same or similar components and functionality as other electronic devices discussed herein (e.g., electronic devices 100, 300, 400, 500, 600, 700, 800, 900, 1000, 1100, 1171, 1200, 1271, 1300, 1400, 1500). In various embodiments, the electronic device 1600 includes a housing member 1650 and a support structure 1670. The housing member 1650 includes an upper portion 1652, a lower portion 1654, and a transition portion 1656. The upper portion 1652 may include a display. In some embodiments, the housing member 1650 includes multiple housing member components, such as an upper component 1681 and a lower component 1682. In the embodiment of FIG. 16, the upper component 1681 forms the upper portion 1652, the lower component forms the lower portion, and the upper component 1681 and the lower component 1682 cooperate to form the transition portion 1656.

Similar to the electronic device 1500, in some embodiments, the upper component 1681 is configured to move relative to the lower component 1682. The upper component 1681 may move upward to change a height of the upper portion 1652. In various embodiments, changing the height may adjust a display height of a display, expand a display, adjust other areas (e.g., input areas), or some combination thereof. For example, in a first configuration shown in FIG. 16, the upper portion 1652 may have a first height (e.g., a first display height). In a second configuration, the upper portion 1652 may have a second height (e.g., a second display height). The upper component 1681 may be configured to move continuously relative to the support structure 1670 and/or the lower component 1682, for example between the first configuration and the second configuration, to provide a continuous range of different display heights. The ability to change between different display heights may allow a user to find an optimal viewing height for the display.

In some embodiments, at least a portion of the housing member 1650 is flexible. For example, the upper component 1681 may be flexible and may conform to the lower component 1682 and/or the support structure 1670 as the upper component moves relative to the lower component and/or the support structure. As shown in FIG. 16, the upper component 1681 may be at least partially disposed within the support structure 1670 in a retracted configuration. In various embodiments, the one or more flexible portions of the housing member 1650 may be formed from any suitable materials, including ceramics, polymers, metals, and the like. In some embodiments, the flexibility of the housing member 1650 is enabled by one or more hinges or rotatable mechanisms. In some embodiments, a mechanism attached to the housing member and/or the support structure may maintain the desired display height.

Figure 17:
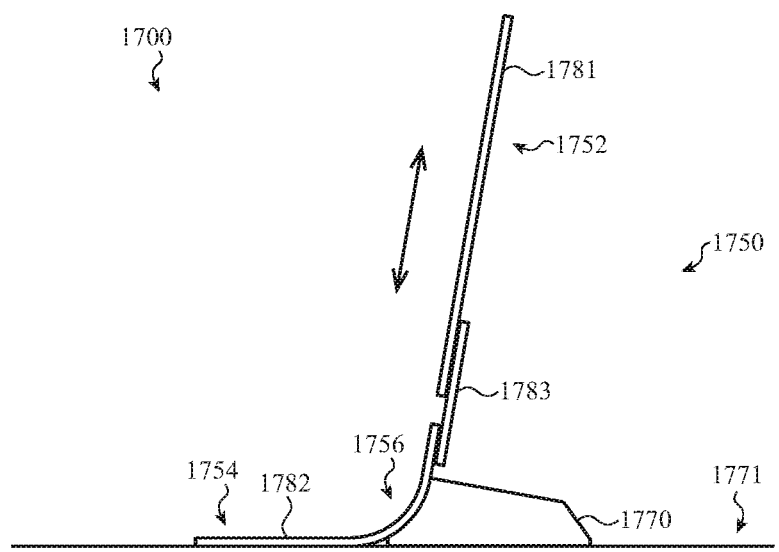
FIG. 17 illustrates an example electronic device in which a height of an upper portion of a housing member is adjustable.

FIG. 17 illustrates an example electronic device 1700 in which a height of an upper portion 1752 of a housing member 1750 is adjustable. The electronic device 1700 may include the same or similar components and functionality as other electronic devices discussed herein (e.g., electronic devices 100, 300, 400, 500, 600, 700, 800, 900, 1000, 1100, 1171, 1200, 1271, 1300, 1400, 1500, 1600). In various embodiments, the electronic device 1700 includes a housing member 1750 and a support structure 1770. The housing member 1750 includes an upper portion 1752, a lower portion 1754, and a transition portion 1756. The upper portion 1752 may include a display. In some embodiments, the housing member 1750 includes multiple housing member components, such as an upper component 1781 and a lower component 1782. In the embodiment of FIG. 17, the upper component 1781 forms the upper portion 1652 and the lower component forms the lower portion 1754 and the transition portion 1756.

Similar to the electronic devices 1500 and 1600, in some embodiments, the upper component 1781 is configured to move relative to the lower component 1782. The upper component 1781 may move upward to change a height of the upper portion 1752. In various embodiments, changing the height may adjust a display height of a display, expand a display, adjust other areas (e.g., input areas), or some combination thereof. For example, in a first configuration shown in FIG. 17, the upper portion 1752 may have a first height (e.g., a first display height). In a second configuration, the upper portion 1752 may have a second height (e.g., a second display height). The upper component 1781 may be configured to move continuously relative to the support structure 1770 and/or the lower component 1782, for example between the first configuration and the second configuration, to provide a continuous range of different display heights. The ability to change between different display heights may allow a user to find an optimal viewing height for the display.

The electronic device 1700 may further include a support member 1783 coupled to the upper component 1781 and the lower component 1782. The support member 1783 may facilitate movement of the upper component 1781. The support member 1783 may be movably coupled to the upper component 1781 such that the upper component may move relative to the support member 1783. For example, the upper component 1781 may be configured to slide up and down along the support member 1783. In some embodiments, a mechanism attached to the housing member, the support member, and/or the support structure may maintain the desired display height.

As discussed above, in various embodiments, one or more portions of the electronic device may be flexible. In some cases, a curvature of the electronic device may be adjustable, for example by a user. In some cases, the housing member and/or various other components of the electronic device are flexible to variably define and/or conform to a curvature of the device. For example, input devices, display components, and other device components may be flexible.

Figure 18A:
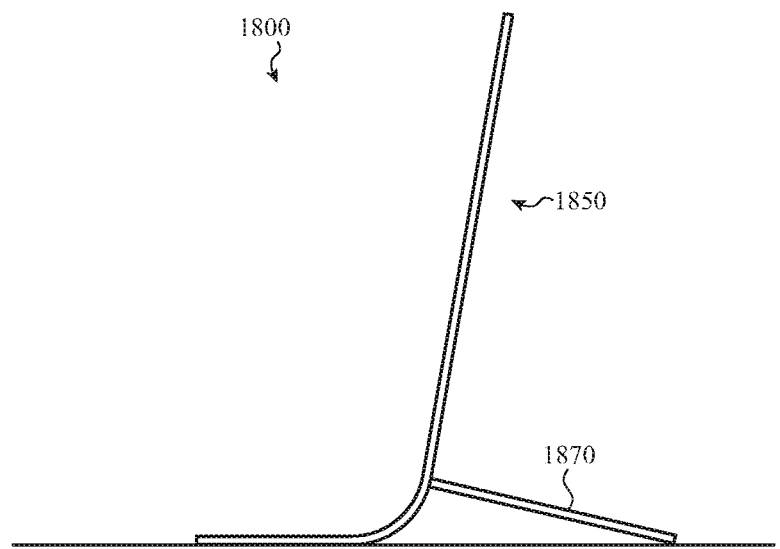
FIGS. 18A-18B illustrate an example electronic device in which a curvature of a housing member is adjustable.
Figure 18B:
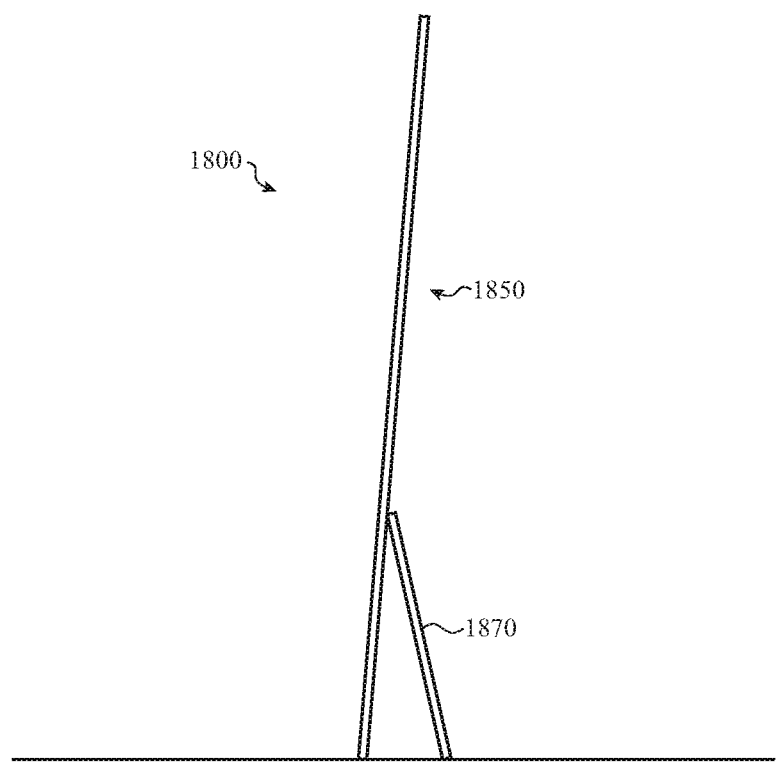

In some embodiments, the housing member is configured to transition between a first configuration in which the housing member is curved and a second configuration in which the housing member is substantially planar. FIGS. 18A-18B illustrate an example electronic device 1800 in which a curvature of a housing member 1850 is adjustable. The electronic device 1800 may include the same or similar components and functionality as other electronic devices discussed herein (e.g., electronic devices 100, 300, 400, 500, 600, 700, 800, 900, 1000, 1100, 1171, 1200, 1271, 1300, 1400, 1500, 1600, 1700). In various embodiments, the electronic device 1800 includes a housing member 1850 and a support structure 1870.

In some embodiments, a curvature of the housing member 1850 is adjustable. For example, the housing member 1850 may be flexible. For example, all or a portion of the housing member 1850 may flex to change a curvature of the housing member 1850. In a first configuration shown in FIG. 18A, the housing member 1850 has a first curvature, and in the second configuration shown in FIG. 18B, the housing member 1850 has a second curvature different from the first curvature. As shown in FIG. 18B, the different curvatures of the housing member 1850 may include the housing member 1850 being substantially planar or not having a curved shape. The housing member 1850 may be configured to move continuously, for example between the first configuration and the second configuration, to provide a continuous range of different curvatures. The support structure 1870 may move relative to the housing member 1850 to provide support to the housing member 1850 in various configurations.

Figure 19A:
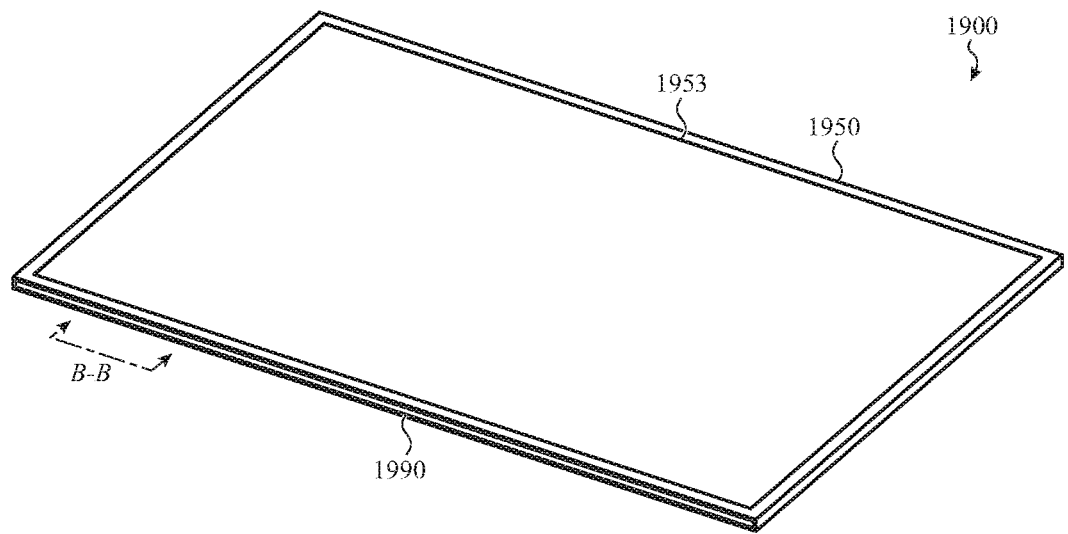
FIGS. 19A-19B illustrate an example electronic device in which a curvature of a housing member is adjustable.
Figure 19B:
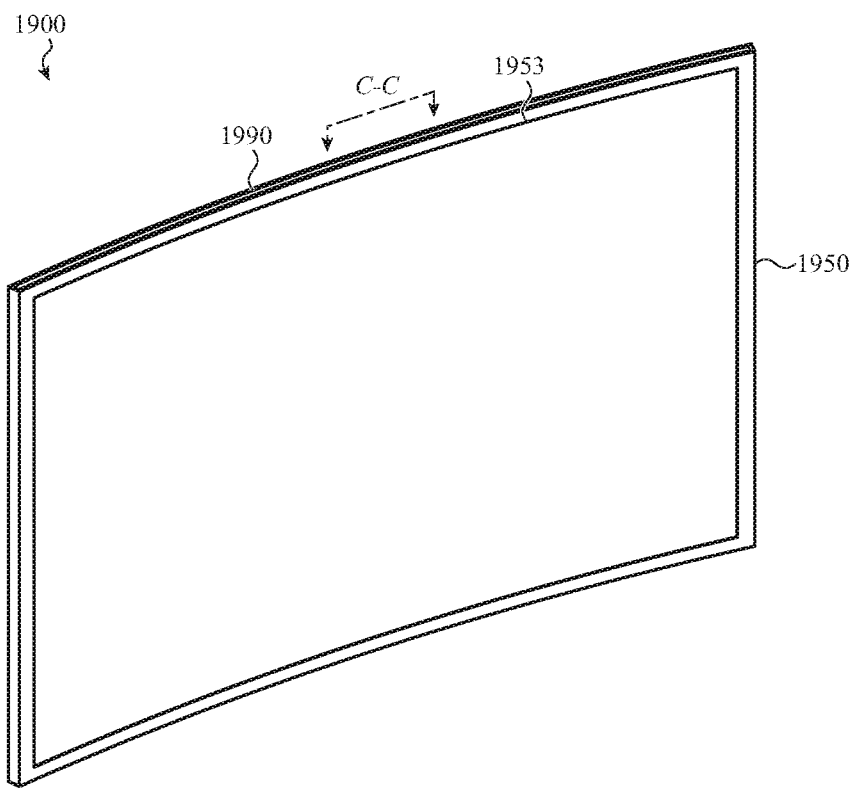

FIGS. 19A-19B illustrate an example electronic device in which a curvature of a housing member is adjustable. The electronic device 1900 may include the same or similar components and functionality as other electronic devices discussed herein (e.g., electronic devices 100, 300, 400, 500, 600, 700, 800, 900, 1000, 1100, 1171, 1200, 1271, 1300, 1400, 1500, 1600, 1700, 1800). In various embodiments, the electronic device 1900 may include a housing member 1950, and may define a display area 1953 that includes one or more displays and/or input devices. As shown in FIG. 19A, the electronic device 1900 may have a first configuration in which the electronic device 1900 and the display area 1953 are substantially planar. As shown in FIG. 19B, the electronic device 1900 may have a second configuration in which the electronic device 1900 and the display area 1953 are curved. The curvature of the electronic device 1900 in FIG. 19B is concave with respect to the front surface (i.e., the surface containing the display area 1953), but in some embodiments, the curvature may be convex. The curvature of the electronic device 1900 may vary between several configurations. The housing member 1950 and one or more additional components of the electronic device 1900 (e.g., display components, input devices, and the like) may be flexible to variably define and/or conform to the curvature of the electronic device 1900.

As shown in FIG. 19A, the electronic device 1900 may be placed horizontally on a surface in the planar configuration, which may allow for improved device functionality. For example, this positioning of the electronic device 1900 may be well-suited for illustration, note-taking, or other tasks in which the device may emulate paper or another horizontal working surface. As shown in FIG. 19B, the electronic device 1900 may be placed on its edge in a curved configuration. In some embodiments, the electronic device 1900 may support itself on its edge when it is in the curved configuration. This positioning of the electronic device 1900 may be well-suited for media functionality, such as watching videos or viewing images.

Figure 19C:
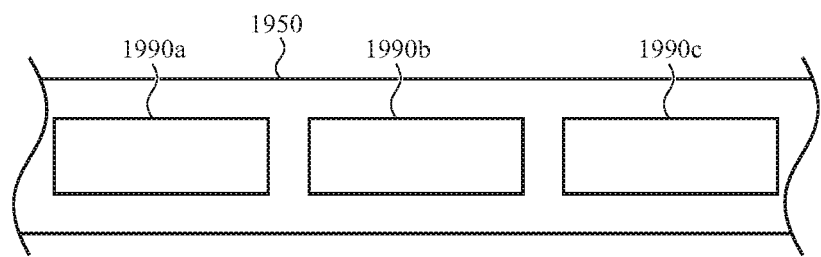
FIGS. 19C-19D illustrate an example curvature control mechanism.
Figure 19D:
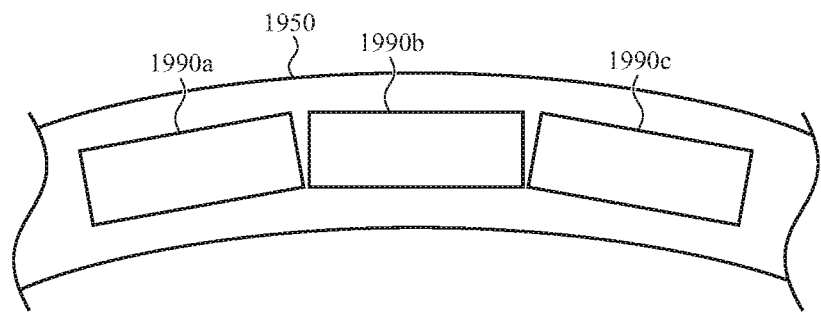

In some embodiments, the curvature of the electronic device 1900 varies along a length or width of the device. For example, one portion may exhibit more curvature than another. In some embodiments, the curvature of the electronic device is constant along a length or width of the device, that is, the curvature does not vary along the length or width of the device. In various embodiments, the electronic device 1900 may include a curvature control mechanism 1990, for example along a side of the device as shown in FIGS. 19A-19B. The curvature control mechanism 1990 may control the curvature of the electronic device 1900 in various ways. For example, the curvature control mechanism 1990 may define a maximum curvature of the electronic device 1900 by preventing the electronic device from flexing past a certain amount. As another example, the curvature control mechanism may ensure that a curvature of the electronic device 1900 is constant along a length or width of the device, or a long a portion of a length or a width of the device. FIGS. 19C-19D illustrate an example curvature control mechanism. FIG. 19C shows a view of the housing member 1950 (corresponding to the view indicated by line B-B of FIG. 19A) in which the electronic device 1900 is in a planar configuration (e.g., not curved). FIG. 19D shows a view of the housing member 1950 (corresponding to the view indicated by line C-C of FIG. 19B) in which the electronic device 1900 is in a curved configuration. The curvature control mechanism 1990 may include components (e.g., components 1990*a-c*) that control the curvature of the electronic device 1900. For example, as shown in FIG. 19C, the components 1990*a-c* may be spaced apart such that they are not in contact in the planar configuration and in some curved configurations. The components 1990*a-c* contact one another when the curvature of the electronic device 1900 reaches a certain amount as shown in FIG. 19D. When the components 1990*a-c* contact one another, they prevent the electronic device 1900 from further flexing and define a maximum curvature of the electronic device 1900. In various embodiments, the components 1990*a-c* define a consistent curvature along the length or width of the electronic device, which may improve the user experience by providing a uniform appearance of the display area 1953.

In various embodiments, the electronic device 2000 may include additional and/or alternative curvature control mechanisms. In some embodiments, the curvature control mechanism may variably control a flexibility of the electronic device 2000. For example, in a first configuration, the electronic device 2000 may have a first flexibility and in a second configuration, the electronic device 2000 may have a second flexibility different from the first flexibility. In some cases, for example, the electronic device may utilize electromagnetic ferrofluid braking, in which an electroactive fluid (e.g., a ferrofluid) is disposed in gaps in the housing member (e.g., gaps between components 1990*a-c*) to variably control the friction in the gaps and thereby variably control the flexibility of the housing member.

In the embodiments shown in FIGS. 18A-19D, additional components of the electronic device besides the housing member may be flexible to conform to the curvature of the device. For example, input devices, display components, and other device components may be flexible.

Figure 20A:
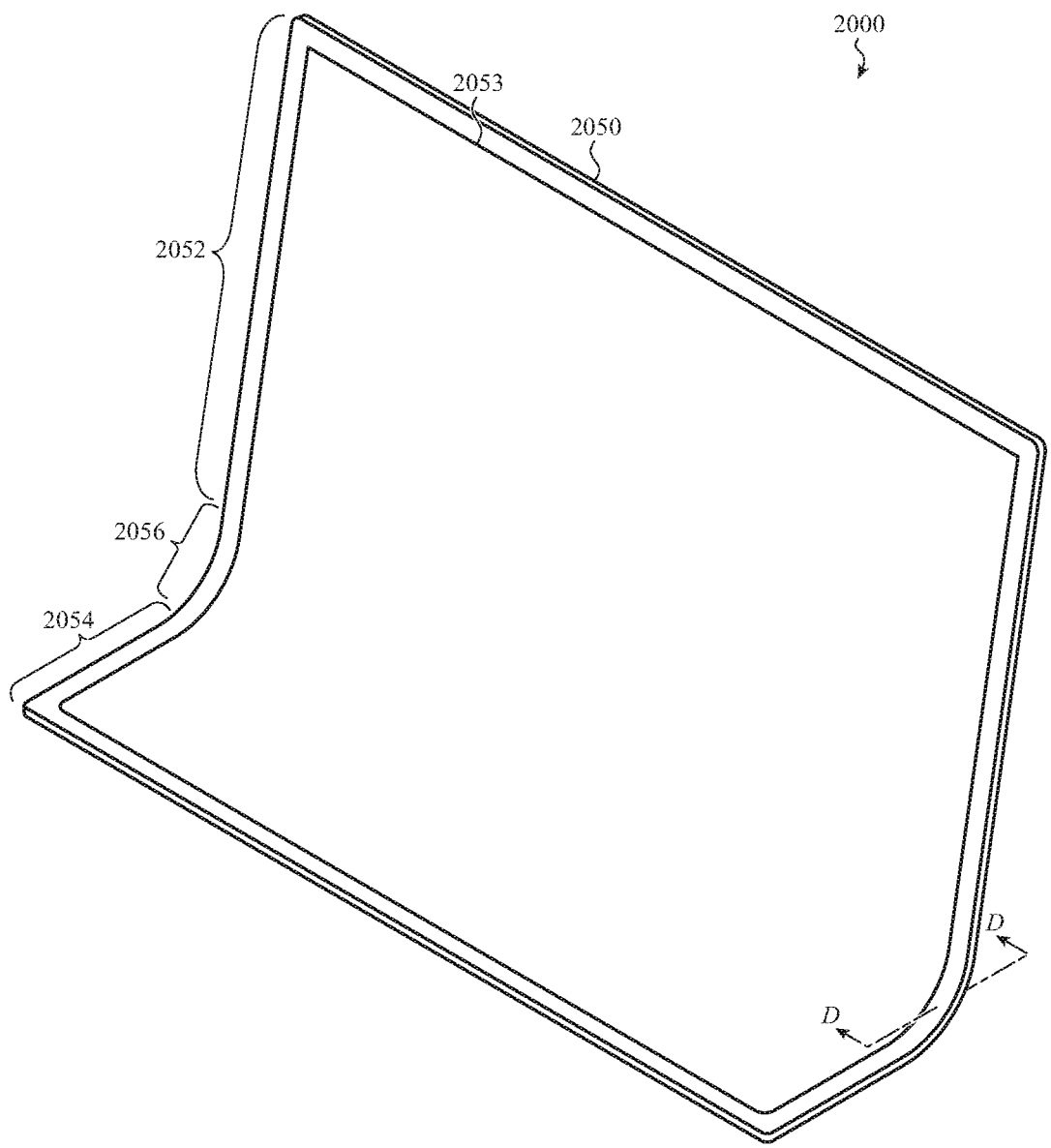
FIGS. 20A-20B illustrate an example electronic device.
Figure 20B:
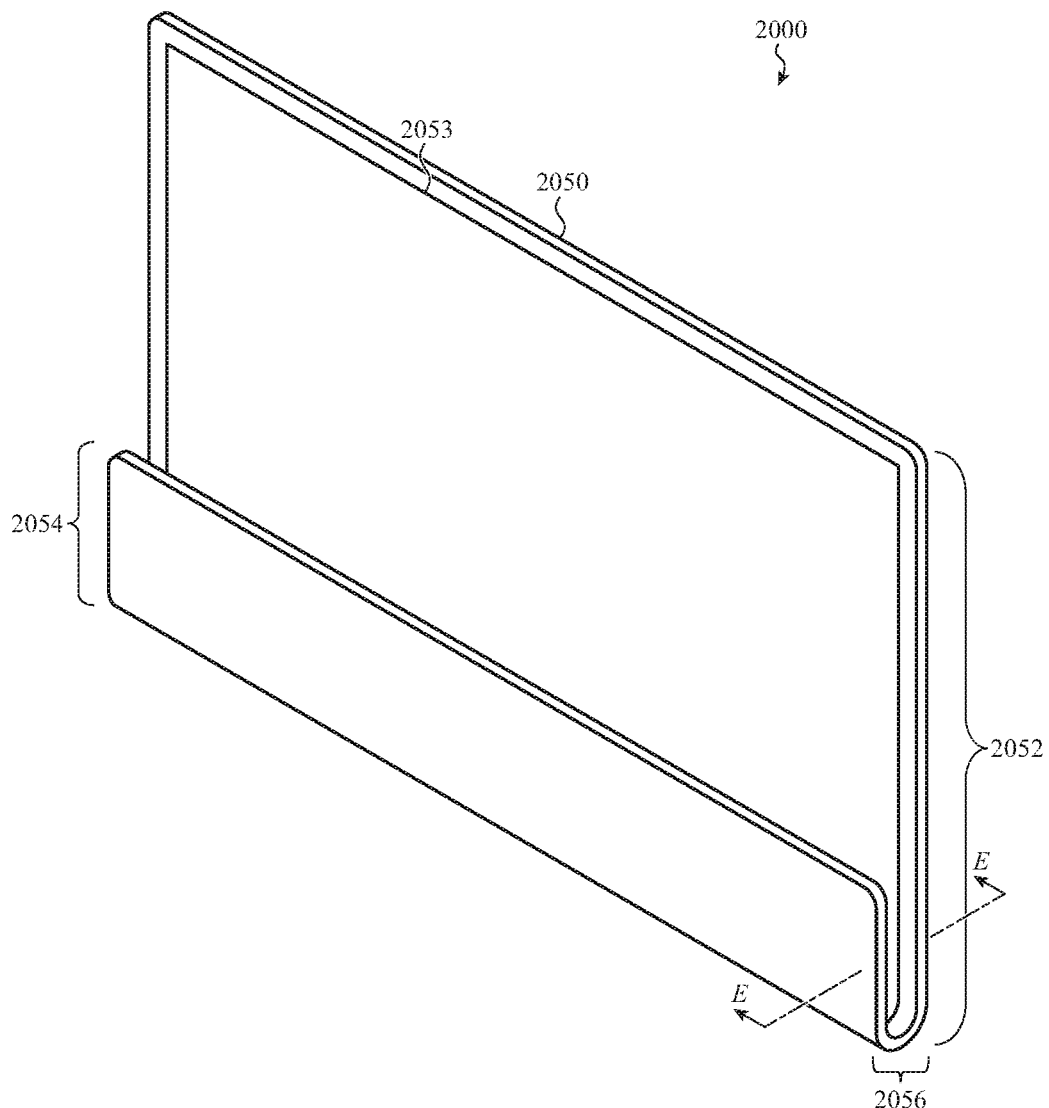

FIGS. 20A-20B illustrate an example flexible electronic device 2000. The electronic device 2000 may include the same or similar components and functionality as other electronic devices discussed herein (e.g., electronic devices 100, 300, 400, 500, 600, 700, 800, 900, 1000, 1100, 1171, 1200, 1271, 1300, 1400, 1500, 1600, 1700, 1800, 1900). In various embodiments, the electronic device 2000 includes a housing member 2050 that defines a display area 2053. The housing member 2050 may include an upper portion 2052, a lower portion 2054, and a transition portion 2056.

In various embodiments, the electronic device 2000 may be configured to fold or otherwise flex for storage, transportation, or other functionality. For example, as shown in FIGS. 20A-20B, the electronic device 2000 may transition from a first configuration (e.g., FIG. 20A) to a second, folded configuration (e.g., FIG. 20B). In some cases, at least a portion of the housing member and/or various components of the electronic device are flexible to enable the transition to a folded configuration.

In some embodiments, the electronic device 2000 folds along the transition portion 2056, and the lower portion 2054 folds toward the upper portion 2052. The lower portion 2054 may contact the upper portion 2052. As discussed above, in various embodiments, the lower portion 2054 includes an input region, and may include various input devices such as a touch array and/or a keyboard. By folding the electronic device 2000 (e.g., folding the lower portion 2054 against the upper portion 2054), one or more portions of the electronic device may be protected from damage and/or inadvertent inputs (e.g., actuation of keyboard keys, contact with touch areas, and the like). In some cases, the folded configuration of the electronic device 2000 may also allow the device to be carried (e.g., held in a user's hands) without marking or smudging a display screen. In some embodiments, at least a portion of a display may be covered or not visible when the electronic device 2000 is in the folded configuration.

Figure 20C:
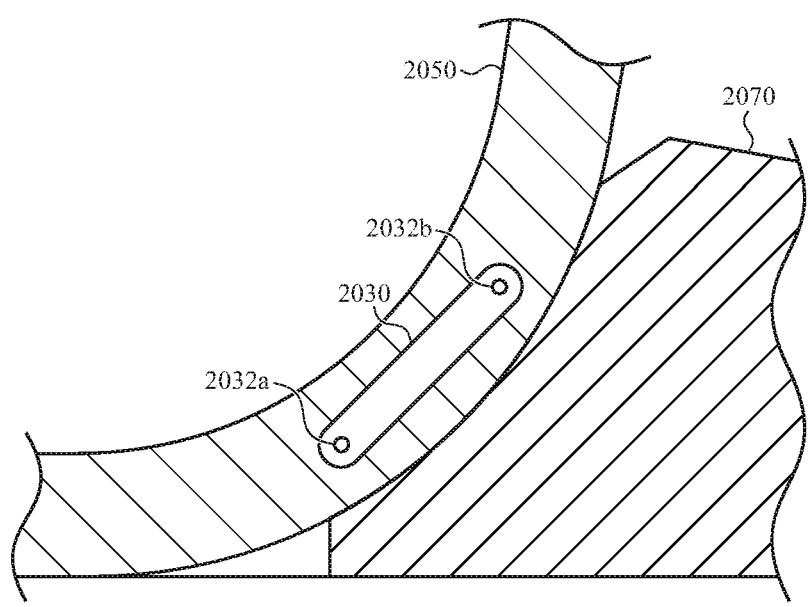
FIGS. 20C-20E illustrate example partial cross-section views of an electronic device, taken through section line D-D of FIG. 20A.
Figure 20D:
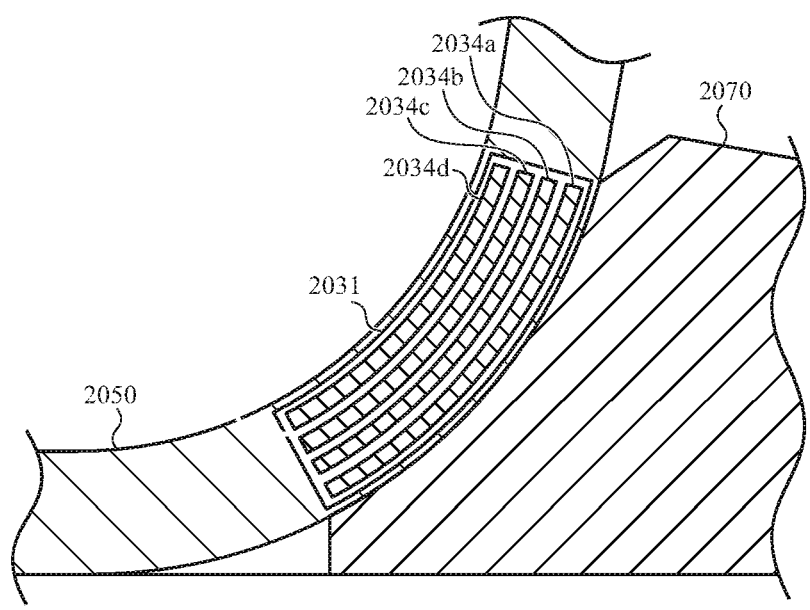
Figure 20E:
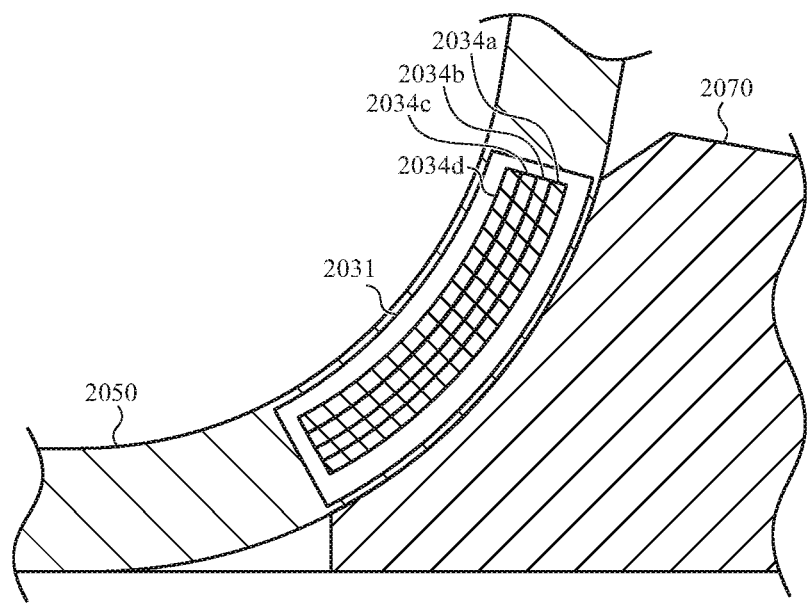

Additionally or alternatively, the electronic device may include one or more flexure mechanisms, such as hinges or other mechanisms. In some cases, the flexure mechanisms may define and/or maintain a curvature of the electronic device. For example, a flexure mechanism may be configured to allow flexure of at least a portion of the electronic device 2000 in one state and prevent flexure of at least a portion of the electronic device 2000 in another state. FIGS. 20C-20E illustrate example partial cross-section views of the electronic device 2000, taken through section line D-D of FIG. 20A. As shown in FIG. 20C, the flexure mechanism may be a hinge 2030 positioned within the housing member

2050. The hinge 2030 may have one or more pivot points (e.g., pivot points 2032a and 2032b) about which various portions of the housing member 2050 may rotate. The hinge 2030 may define a curvature of the housing member 2050, for example by fixing a curvature of at least a portion of the housing member 2050. In some embodiments, the hinge 2030 have a first state in which the housing member 2050 may move with about the pivot points and a second state in which the housing member is prevented from moving about the pivot points.

As shown in FIGS. 20D and 20E, the flexure mechanism may be a layer jamming mechanism 2031 positioned within the housing member 2050 and having a variable or tunable stiffness.

In one embodiment, the tunable stiffness is achieved using layer jamming, in which the layers 2034a-d form a flexure mechanism 2031 with multiple states corresponding to varying stiffness. In one embodiment, the flexure mechanism 2031 has a free state and a jammed state. In some cases, a jammed state or jamming the stack of layers refers to a state in which a normal force is applied between two or more adjacent stacked layers to increase the friction or resistance to shear between the two layers. FIGS. 20D and 20E illustrate example layers 2034 in different states corresponding to varying stiffness. FIG. 20D corresponds to a free state, and FIG. 20E corresponds to a jammed state.

In the free state shown in FIG. 20D, the layers 2034 may move in shear relative to one another (e.g., slide relative to one another) responsive to a force being applied to the layers. In the jammed state shown in FIG. 20E, a jamming mechanism prevents the layers from moving in shear in response to the force. For example, the jamming mechanism may result in a normal force that compresses the layers together, thereby increasing the friction between the layers and not allowing the layers to move in shear relative to one another. As a result, the bending stiffness of the flexure mechanism formed by the layers is greater in the jammed state than in the free state.

In one embodiment, the bending stiffness in the jammed state is proportional to the square of the number of layers of the flexure mechanism. For example, if the flexure mechanism has three layers, it is nine times stiffer in the jammed state than in the free state. If the flexure mechanism has ten layers, it is one hundred times stiffer in the jammed state than in the free state.

The jamming mechanism may be a vacuum pump, piston, or other mechanism capable of applying a vacuum between the layers. In some embodiments, the jamming mechanism is operably coupled to the flexure mechanisms (for example by a connector). In another embodiment, the jamming mechanism is integrated with the layers themselves. For example, in some cases, the jamming is performed using electroactive layers such as electroactive polymer layers. The size and/or shape of the layers may be adjusted based on the introduction of electrical current and/or an electric field, resulting in the layers transitioning between states. In one embodiment, the flexure mechanism is in the jammed state when no electrical field and/or current are present, and in the free state when an electrical field and/or current are present. In another embodiment, the flexure mechanism is in the free state when no electrical field and/or current are present, and in the jammed state when an electrical field and/or current are present.

The layers 2034 may be formed of a flexible material, such as fabric, polymer, leather, rubber, polycarbonate, acrylonitrile butadiene styrene (ABS), polyethylene terephthalate (PET), silicone, aluminum, steel, and so on. In the embodiment of FIGS. 20D-20E, four layers 2034 are shown. In various embodiments, the flexure mechanism may include more or fewer layers 2034.

The state of the flexure mechanism 2031 may be changed to facilitate changing a curvature of the electronic device 2000. For example, the tunable flexure mechanism 2031 may be in a jammed state during normal use of the electronic device 2000 to provide a stiff exterior surface similar to that of traditional computing devices. In one embodiment, when the flexure mechanism 2031 is transitioned from a first configuration (e.g., the configuration shown in FIG. 20E) to a second configuration (e.g., the configuration shown in FIG. 20D), the layers transition to the free state (e.g., the layers are "unjammed"). As a result, the flexure mechanism 2031 is more flexible and the curvature of the electronic device 2000 may be adjusted. Once the adjustment is complete, the layers transition to the jammed state (e.g., the layers are jammed), thereby increasing the stiffness of the electronic device 2000, for example to prepare the device for normal use.

In various embodiments, the position of the flexure mechanism may vary. For example, the flexure mechanism may be positioned along a surface of the housing member 2050, such as a front or rear surface or a side surface. Similarly, the flexure mechanism may be positioned between components of the housing member 2050. The flexure mechanisms discussed above are for illustrative purposes. In various embodiments, the electronic device 2000 may include additional and/or alternative flexure mechanisms, and flexure mechanisms may include and/or be used in combination with one or more curvature control mechanisms, such as those described with respect to FIGS. 19C and 19D.

Figure 20F:
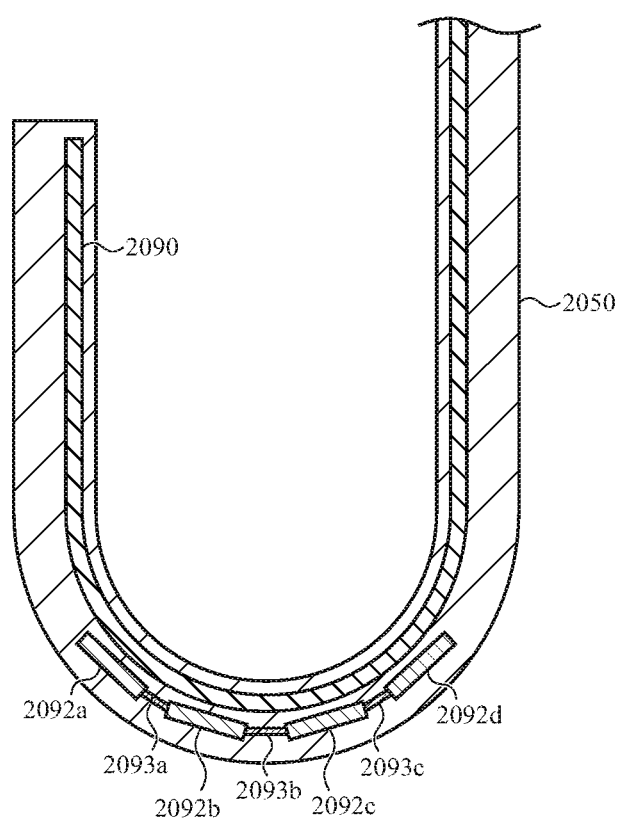
FIGS. 20F and 20G illustrate an electronic device in a folded configuration.
Figure 20G:
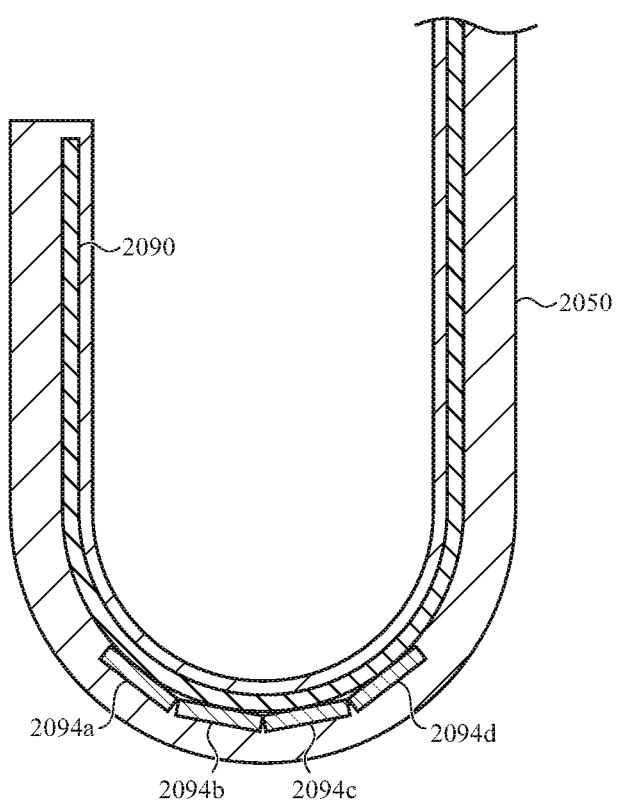

As discussed above, the housing member 2050 and/or components thereof may be flexible to variably define and/or conform to the shape of the electronic device 2000. FIGS. 20E-20G illustrate example partial cross-section views of the electronic device 2000, taken through section line E-E of FIG. 20B. FIGS. 20F and 20G illustrate the curvature of the electronic device 2000 in the folded configuration. In various embodiments, the housing member 2050 is formed of a flexible material (e.g., flexible glass) to facilitate the variable curvature. The electronic device may further include a flexible component 2090 that conforms to the curvature of the housing member. In some embodiments, the flexible component 2090 may be a display component, an input device, or some combination thereof. The electronic device 2000 may include multiple flexible components.

In some embodiments, the electronic device 2000 includes one or more additional flexible components, such as a processing unit, logic board, battery, or the like. For example, a component of the electronic device, such as a logic board, processing unit, or battery may be segmented into multiple segments 2092a-d and the segments may be connected by flexible connectors 2093a-c to variably conform to the curvature of the electronic device 2000. In some embodiments, such as shown in FIG. 20G, a component of the electronic device may be segmented into multiple segments 2094a-d, which are configured to flex or otherwise move relative to one another to variably conform to the curvature of the electronic device. In various embodiments, the segments 2094a-d remain operably coupled as they move.

Figure 21:
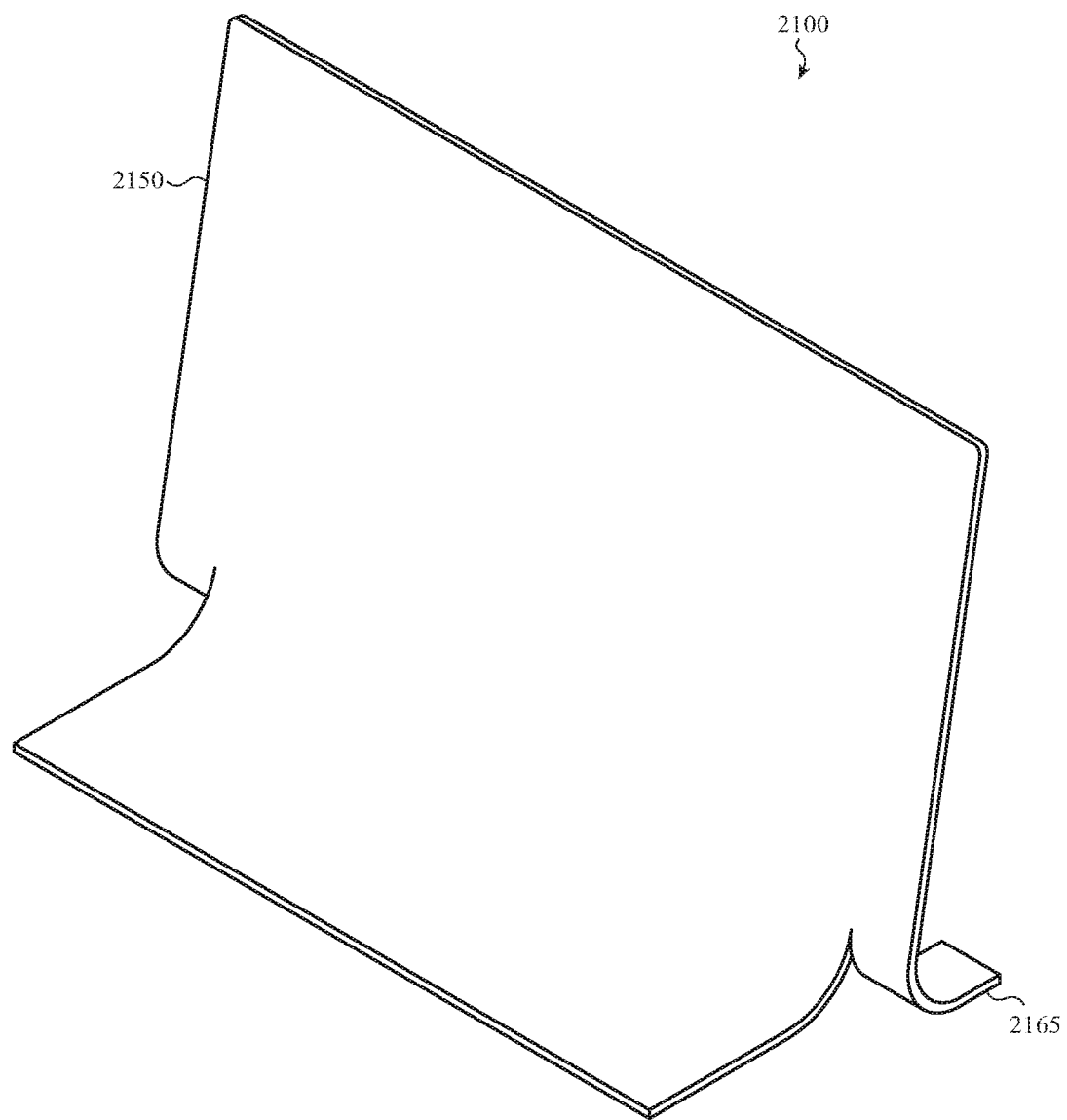
FIG. 21 illustrates an example electronic device.

FIG. 21 illustrates an example electronic device 2100. The electronic device 2100 may include the same or similar components and functionality as other electronic devices discussed herein (e.g., electronic devices 100, 300, 400, 500,

600, 700, 800, 900, 1000, 1100, 1171, 1200, 1271, 1300, 1400, 1500, 1600, 1700, 1800, 1900, 2000). In various embodiments, the electronic device 2100 may include a housing member 2150. The housing member may define one or more display and/or input areas and may include one or more display components, input devices, and the like. In some embodiments, the housing member 2150 is shaped or otherwise formed to support the electronic device 2100. For example, the housing member 2150 may include one or more legs 2165 that support the electronic device. The legs 2165 may be formed similarly to the housing members discussed herein. For example, the legs 2165 may be formed of slumped glass. In various embodiments, the legs 2165 are formed from a common workpiece (e.g., piece of glass) as other portions of the housing member 2150. For example, a single sheet of glass may be cut and bent to form the housing member 2150 and legs 2165.

Figure 22:
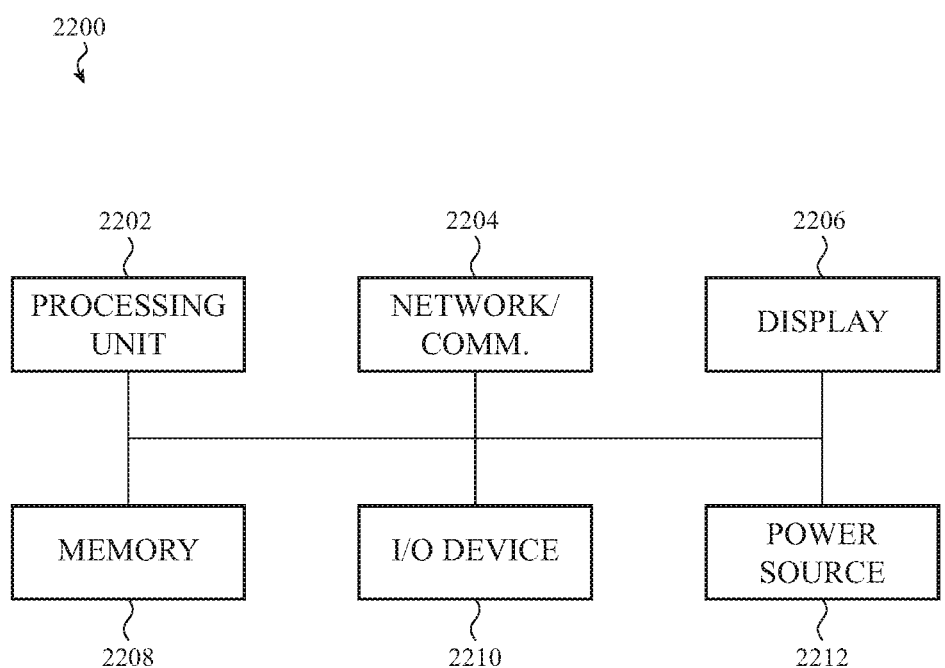
FIG. 22 is an illustrative block diagram of an electronic device.

FIG. 22 is an illustrative block diagram of an electronic device 2200 as described herein (e.g., electronic devices 100, 300, 400, 500, 600, 700, 800, 900, 1000, 1100, 1171, 1200, 1271, 1300, 1400, 1500, 1600, 1700, 1800, 1900, 2000, 2100). The electronic device can include a display 2216, one or more processing units 2208, memory 2202, one or more input/output (I/O) devices 2204, a power source 2206, and a network communication interface 2210.

The display 2216 may provide an image or graphical output (e.g., computer-generated image data) for the electronic device. The display may also provide an input surface for one or more input devices, such as, for example, a touch sensing device and/or a fingerprint sensor. The display 2216 may be substantially any size and may be positioned substantially anywhere on the electronic device. The display 2216 can be implemented with any suitable technology, including, but not limited to liquid crystal display (LCD) technology, light emitting diode (LED) technology, organic light-emitting display (OLED) technology, organic electroluminescence (OEL) technology, or another type of display technology. The display 2216 provides a graphical output, for example associated with an operating system, user interface, and/or applications of the electronic device 2200. In some embodiments, the display 2216 is configured as a touch-sensitive (e.g., single-touch, multi-touch) and/or force-sensitive display to receive inputs from a user. In some embodiments, the touch-sensitive display includes one or more sensors (e.g., capacitive touch sensors, ultrasonic sensors, or other touch sensors) positioned above, below, or integrated with the display. In various embodiments, a graphical output of the display 2216 is responsive to inputs provided to the electronic device 2200.

The processing unit 2208 can control some or all of the operations of the electronic device. The processing unit 2208 can communicate, either directly or indirectly, with substantially all of the components of the electronic device. For example, a system bus or signal line 2212 or other communication mechanisms (e.g., electronic connectors) can provide communication between the processing unit(s) 2208, the memory 2202, the I/O device(s) 2204, the power source 2206, and/or the network communication interface 2210. The one or more processing units 2208 can be implemented as any electronic device capable of processing, receiving, or transmitting data or instructions. For example, the processing unit(s) 2208 can each be a microprocessor, a central processing unit, an application-specific integrated circuit, a field-programmable gate array, a digital signal processor, an analog circuit, a digital circuit, or combination of such devices. The processor may be a single-thread or multi-thread processor. The processor may be a single-core or multi-core processor.

Accordingly, as described herein, the phrase "processing unit" or, more generally, "processor" refers to a hardware-implemented data processing unit or circuit physically structured to execute specific transformations of data including data operations represented as code and/or instructions included in a program that can be stored within and accessed from a memory. The term is meant to encompass a single processor or processing unit, multiple processors, multiple processing units, analog or digital circuits, or other suitably configured computing element or combination of elements.

The memory 2202 can store electronic data that can be used by the electronic device. For example, a memory can store electrical data or content such as, for example, audio and video files, documents and applications, device settings and user preferences, timing signals, signals received from the one or more sensors, one or more pattern recognition algorithms, data structures or databases, and so on. The memory 2202 can be configured as any type of memory. By way of example only, the memory can be implemented as random access memory, read-only memory, flash memory, removable memory, or other types of storage elements, or combinations of such devices.

The one or more I/O devices 2204 can transmit and/or receive data to and from a user or another electronic device. The I/O device (s) 2204 can include any components discussed such as display components, input devices, and the like. The I/O device(s) 2204 can further include a display, a touch or force sensing input surface such as a trackpad, one or more buttons, one or more microphones or speakers, one or more ports such as a microphone port, one or more accelerometers for tap sensing, one or more optical sensors for proximity sensing, and/or a keyboard.

The power source 2206 can be implemented with any device capable of providing energy to the electronic device. For example, the power source 2206 can be one or more batteries or rechargeable batteries, or a connection cable that connects the electronic device to another power source such as a wall outlet.

The network communication interface 2210 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, IR, and Ethernet.

It should be noted that FIG. 22 is for illustrative purposes only. In other examples, an electronic device may include fewer or more components than those shown in FIG. 22. Additionally or alternatively, the electronic device can be included in a system and one or more components shown in FIG. 22 are separate from the electronic device but included in the system. For example, an electronic device may be operatively connected to, or in communication with a separate display. As another example, one or more applications can be stored in a memory separate from the electronic device. The processing unit in the electronic device can be operatively connected to and in communication with the separate display and/or memory.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An electronic device comprising:
    a glass housing member comprising:
        an upper portion defining a first region of a continuous exterior surface of the electronic device;
        a lower portion defining a second region of the continuous exterior surface of the electronic device; and
        a transition portion extending between the upper portion and the lower portion and defining a third region of the continuous exterior surface of the electronic device, the transition portion configured to bend in response to the lower portion being articulated between a first angular position relative to the upper portion and a second angular position relative to the upper portion;
    a display coupled to the glass housing member and configured to provide a graphical output at a display area extending from the upper portion and at least partially through the transition portion; and
    an input device coupled to the glass housing member and configured to detect an input at an input area extending from the lower portion and at least partially through the transition portion.

2. The electronic device of claim 1, wherein:
    in the first angular position, the first region, the second region, and the third region of the continuous exterior surface are coplanar; and
    in the second angular position, the first region, the second region, and the third region of the continuous exterior surface are not coplanar.

3. The electronic device of claim 2, wherein, in the second angular position:
    the input area is substantially parallel to a support surface; and
    the upper portion is positioned at a non-parallel orientation with respect to the support surface.

4. The electronic device of claim 3, wherein in the second angular position, the upper portion is orientated at an angle that is between a parallel and an orthogonal orientation with respect to the support surface.

5. The electronic device of claim 2, wherein in the second angular position, a front of the display is oriented toward the input device.

6. The electronic device of claim 5, wherein in the second angular position, the lower portion is parallel to the upper portion.

7. The electronic device of claim 1, wherein the glass housing member is a single piece of glass.

8. The electronic device of claim 1, wherein the display area extends from the upper portion, through the transition portion, to the lower portion.

9. The electronic device of claim 1, wherein the input area extends from the lower portion, through the transition portion, to the upper portion.

10. An electronic device comprising:
    a glass housing member comprising:
        a first glass sheet defining a continuous front exterior surface of the glass housing member; and
        a second glass sheet defining a rear exterior surface of the glass housing member, the first and second glass sheets defining:
            an upper portion of the glass housing member;
            a lower portion of the glass housing member; and
            a transition portion of the glass housing member extending between the upper portion and the lower portion, the transition portion configured to bend to change an angular position between the upper portion and the lower portion;
    a display positioned between the first glass sheet and the second glass sheet and configured to provide a graphical output at the upper portion; and
    an input device positioned between the first glass sheet and the second glass sheet and configured to detect an input at the lower portion.

11. The electronic device of claim 10, further comprising a flexure mechanism positioned within the transition portion, wherein the flexure mechanism defines a curvature of the transition portion when the transition portion is in a bent configuration.

12. The electronic device of claim 11, wherein the flexure mechanism comprises a hinge that defines a pivot point of the flexure mechanism, wherein the upper portion and the lower portion articulate about the pivot point.

13. The electronic device of claim 11, wherein the flexure mechanism comprises a locking mechanism, wherein:
    in a first state the locking mechanism is configured to prevent the transition portion from bending; and
    in a second state the locking mechanism is configured to allow the transition portion to bend.

14. The electronic device of claim 11, wherein the flexure mechanism is positioned between the first glass sheet and the second glass sheet.

15. The electronic device of claim 10, wherein:
    the display extends at least partially through the transition portion; and
    the input device extends at least partially through the transition portion.

16. An electronic device comprising:
    a glass housing member comprising:
        a first portion at least partially defining a continuous exterior surface of the electronic device;
        a second portion at least partially defining the continuous exterior surface of the electronic device; and
        a third portion extending between the first portion and the second portion and at least partially defining the continuous exterior surface of the electronic device, the third portion configured to allow an angular position between the first portion and the second portion to be varied; and
    a touch-sensitive display coupled to the glass housing member, the touch-sensitive display comprising a first display portion positioned at the first portion of the glass housing member, a second display portion positioned at the second portion of the glass housing member, and a third display portion positioned at the third portion of the glass housing member.

17. The electronic device of claim 16, wherein the glass housing member comprises a flexible glass material that is configured to bend to change the angular position between the first portion and the second portion.

18. The electronic device of claim 16, wherein in a first operating mode:
- the first display portion of the touch-sensitive display is configured to provide a graphical output at the first portion of the glass housing member;
- the second display portion of the touch-sensitive display is configured to detect an input at the second portion of the glass housing member; and
- the first operating mode is activated in response to the third portion of the glass housing member being articulated to define a non-planar orientation between the first portion of the glass housing member and the second portion of the glass housing member.

19. The electronic device of claim 16, wherein in a second operating mode:
- the first portion of the glass housing member, the second portion of the glass housing member, and the third portion of the glass housing member are configured to provide a graphical output and detect an input; and
- the second operating mode is activated in response to the third portion of the glass housing member being articulated to define a planar orientation between the first portion of the glass housing member and the second portion of the glass housing member.

20. The electronic device of claim 16, wherein a processing unit, a logic board, a battery, or a combination thereof are positioned at the third portion of the glass housing member and configured to move in response to a change in the angular position between the first portion of the glass housing member and the second portion of the glass housing member.

* * * * *